United States Patent [19]

Forcier

[11] Patent Number: 5,231,698
[45] Date of Patent: Jul. 27, 1993

[54] SCRIPT/BINARY-ENCODED-CHARACTER PROCESSING METHOD AND SYSTEM

[76] Inventor: Mitchell D. Forcier, 2852 San Antonio Dr., Walnut Creek, Calif. 94598

[21] Appl. No.: 673,292

[22] Filed: Mar. 20, 1991

[51] Int. Cl.$^5$ .......................................... G06F 15/62
[52] U.S. Cl. .................................. 395/146; 395/155
[58] Field of Search .............................. 395/144–149, 395/155, 161, 117; 340/706, 723, 721

[56] References Cited

U.S. PATENT DOCUMENTS

| | | | |
|---|---|---|---|
| 3,676,856 | 7/1972 | Manly | 364/200 |
| 3,688,275 | 8/1972 | Fredrickson et al. | 395/146 |
| 3,714,636 | 1/1973 | Manly | 395/148 X |
| 3,739,348 | 6/1973 | Manly | 395/117 |
| 4,538,183 | 8/1985 | Kanno et al. | 395/146 X |
| 4,616,327 | 10/1986 | Rosewarne et al. | 395/147 X |
| 4,723,211 | 2/1988 | Barker et al. | 395/147 |
| 4,802,104 | 1/1989 | Oglso | 395/153 |

OTHER PUBLICATIONS

PenPoint TM Application Development Guide, GO Corporation, Foster City, Calif., pp. 27–29, published Jan. 1991.

Using PenPoint Developer Release, Beta Edition, pp. 34–64, GO Corporation, Foster City, Calif., published Jan. 1991.

Primary Examiner—Heather R. Herndon
Attorney, Agent, or Firm—Marger, Johnson, McCollom & Stolowitz

[57] ABSTRACT

A pen-based processor needs to be usable to input and edit script in the manner of a text-based computer but retain a resemblance to the user much like a pad and pencil. The pen-based computer implements enable input, editing and other manipulation of handwritten script, ASCII text and drawings in a common document using a compatible internal representation of the data and a simple, consistent set of user control functions. These functions are invoked by the user with an intuitive and interactive set of user gestures which do not distract the user from the task of inputting or editing the document. A two-step gesture method avoids confusion between strokes and command gestures and allows similar gestures to be used for different functions within the same and different contexts. The system infers from customary user writing conventions that certain relationships of data are to be preserved and maintains the relationships, subject to user override, during editing. The display document is formatted to contain both lined areas of script, text and imbedded drawings that can be edited, including word wrapping, and adjoining unlined drawing areas that remain unaffected by editing of lined area contents.

49 Claims, 41 Drawing Sheets

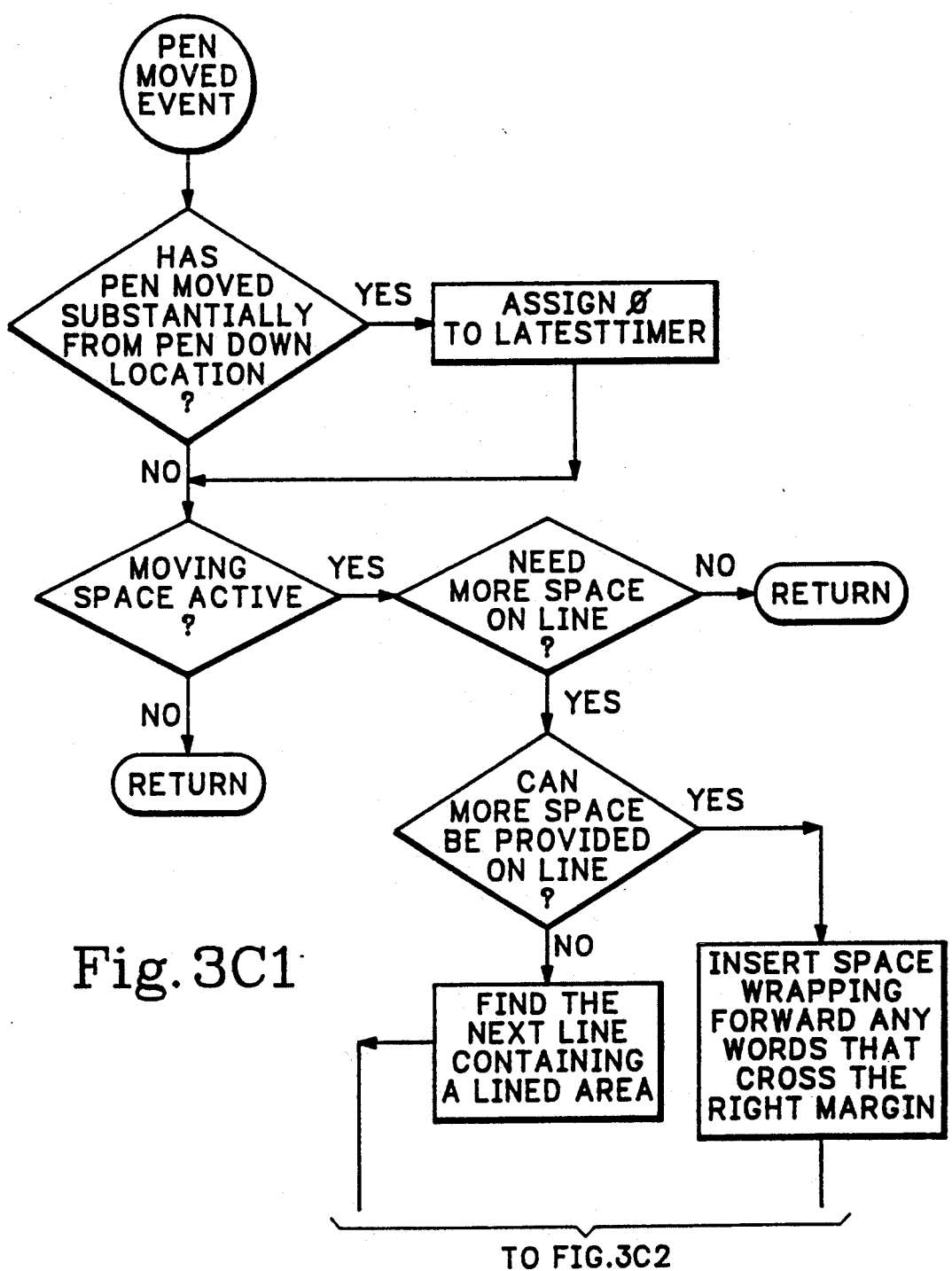
Fig. 3C1

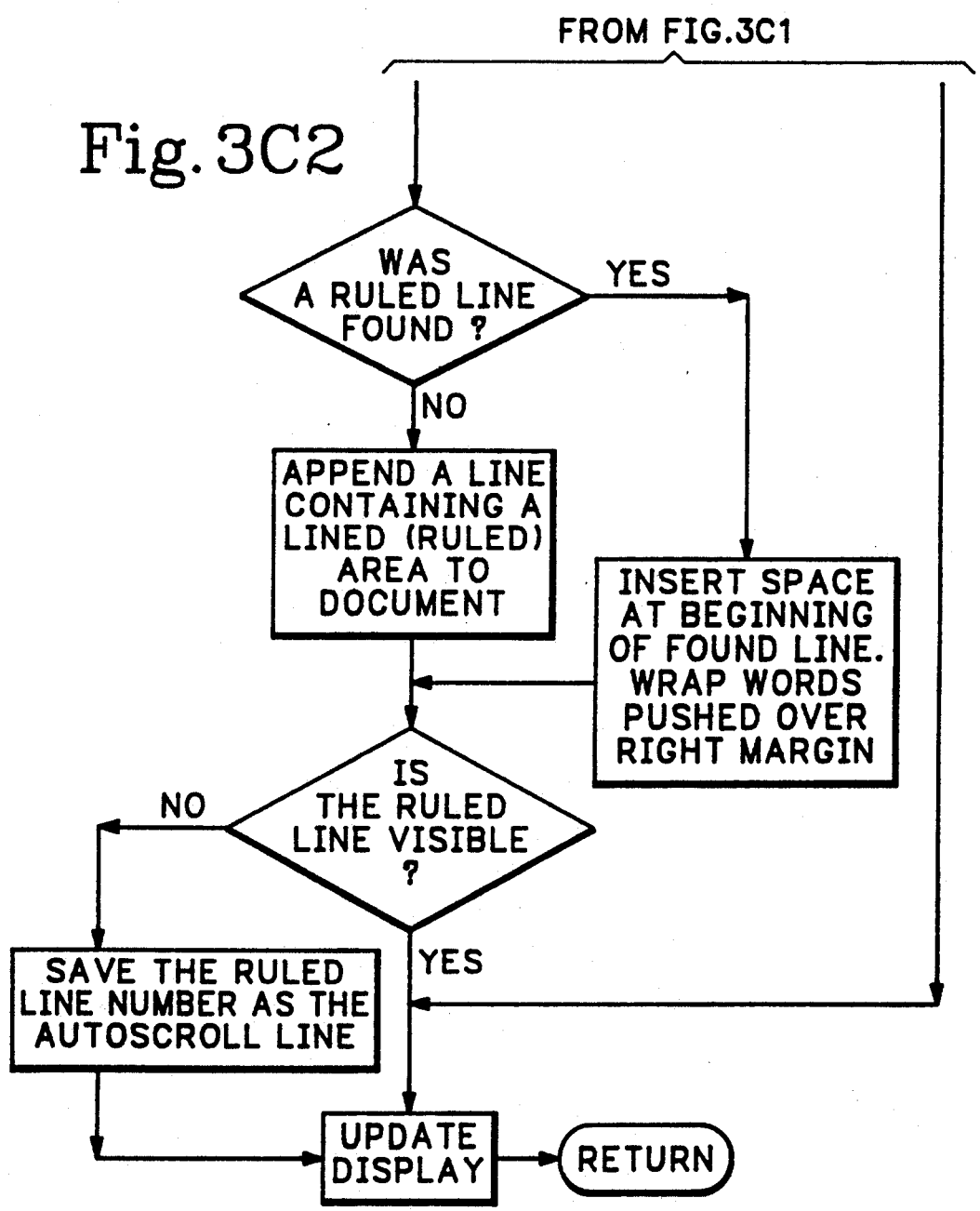
Fig. 3C2

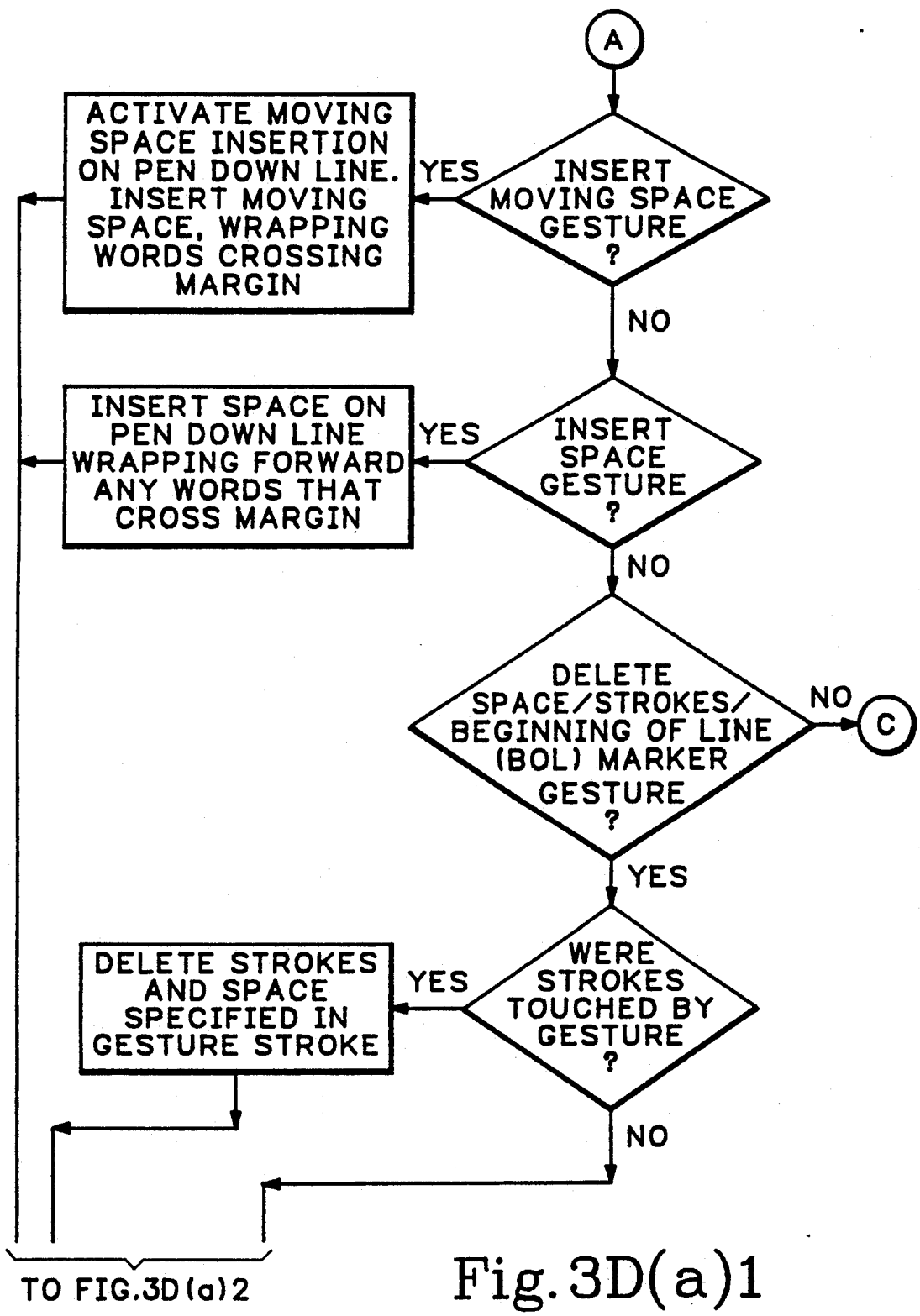
Fig. 3D(a)1

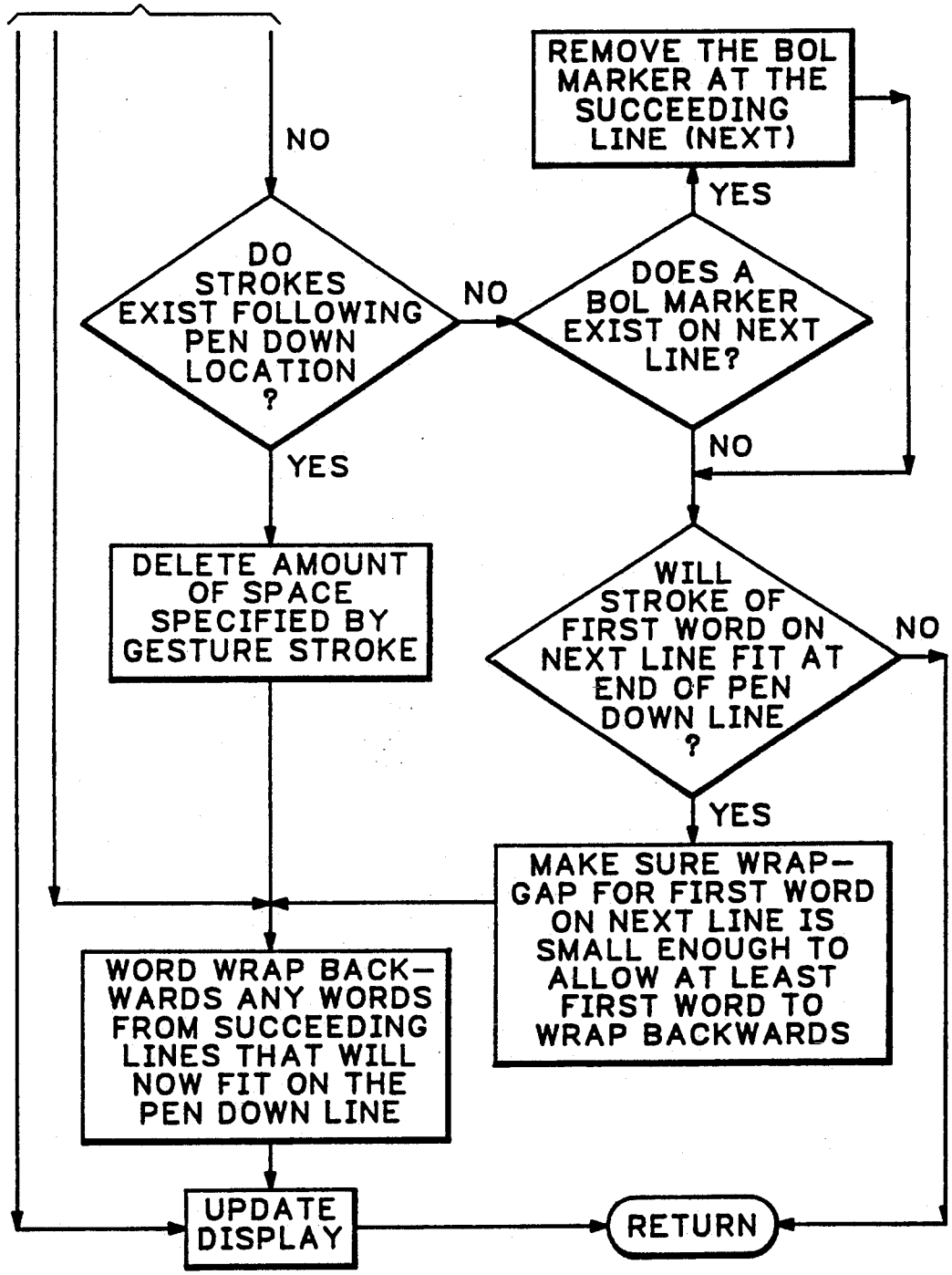
Fig. 3D(a)2

| GESTURE PROMPT | GESTURE | |
|---|---|---|
| EDIT ●↶ 50 | PEN UP | ROPE SELECT |
| | ○ | STRETCHING BOX SELECT |
| | ⌐ | MARK BLOCK |
| | ← | DELETE LINE CONTENTS/DELETE LINE |
| | → | INSERT BOL MARKER/INSERT LINE |
| | ↓ | DELETE SPACE/STROKES/BOL MARKER |
| | ↑ | INSERT SPACE |
| | | INSERT MOVING SPACE |
| SELECT ⋎ 52 | PEN UP | ROPE SELECT |
| | ○ | STRETCHING BOX SELECT |
| | ⌐ | MARK BLOCK |
| | ↑ | SELECT LINE UPWARD |
| | ↓ | SELECT LINE DOWNWARD |
| | ← | SELECT STROKES TO THE LEFT |
| | → | SELECT STROKES TO THE RIGHT |
| | | SELECT WORD/OBJECT |

Fig. 4I

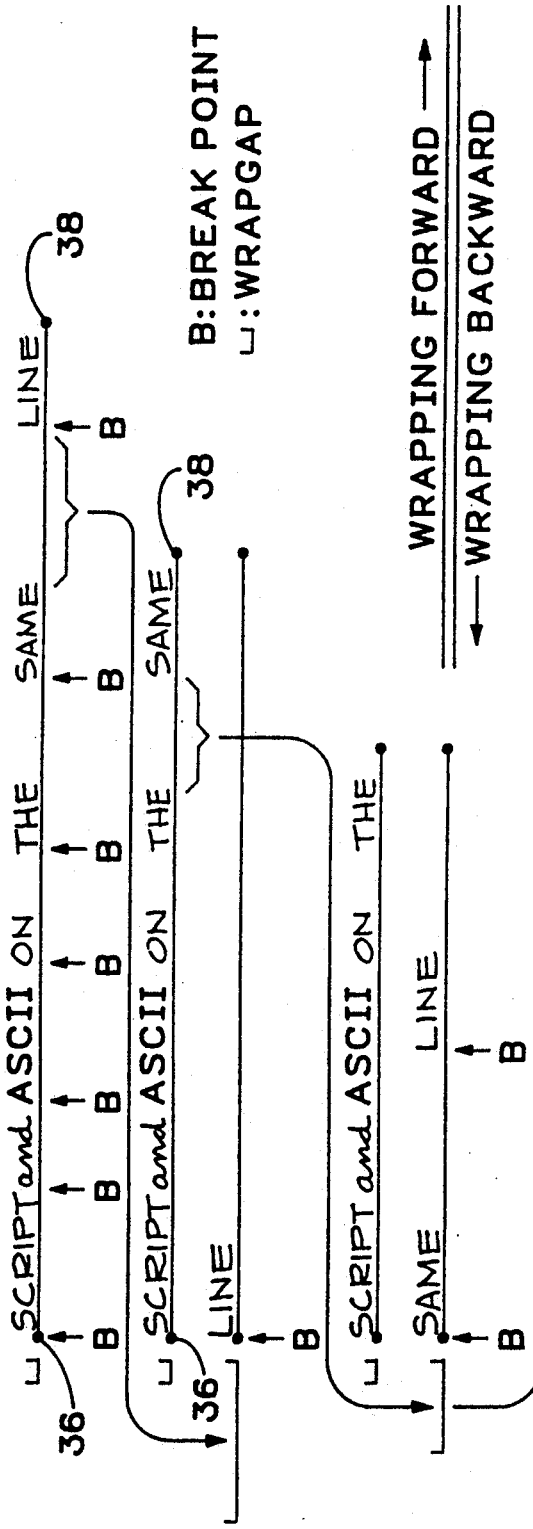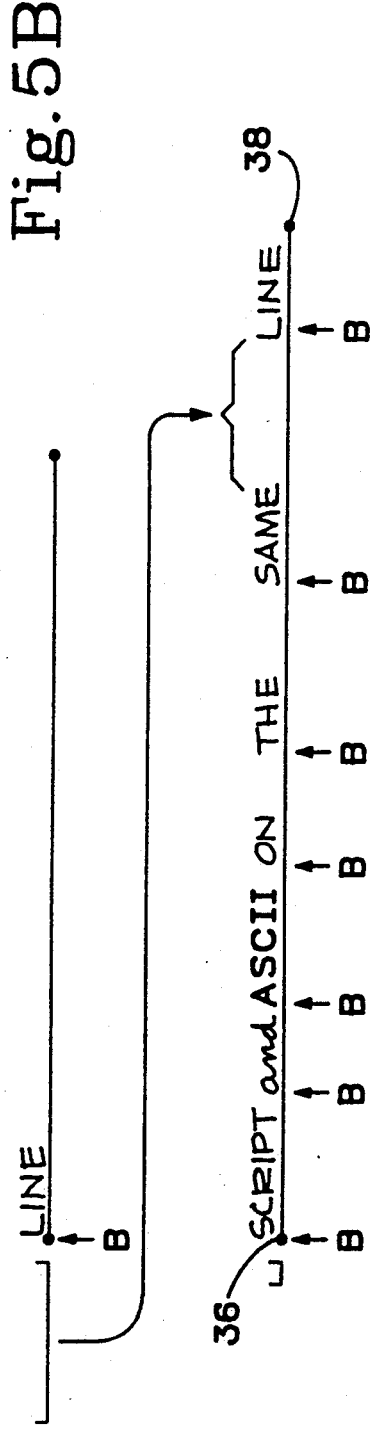
Fig. 5B

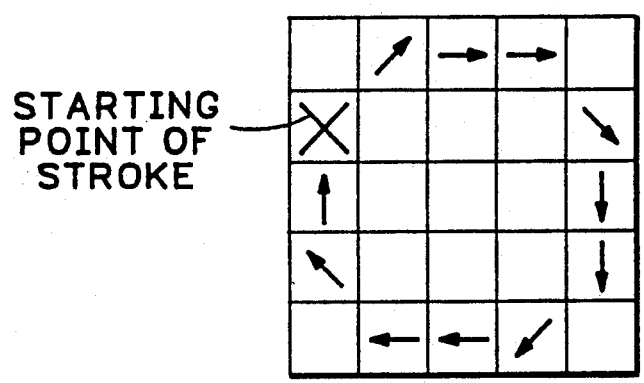
Fig. 6B
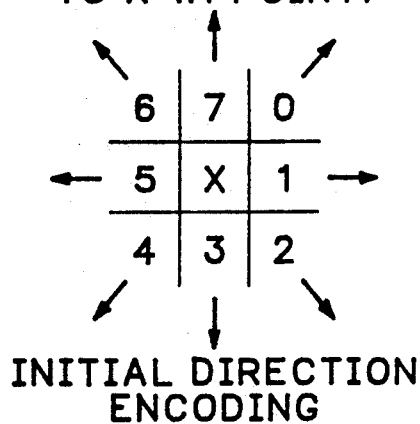
Fig. 6C
| 3 | 2 | 3 |
|---|---|---|
| 2 | 1 | 2 |
| 3 | 2 | 3 |
'L' FORMATION
DETECTION MATRIX
Fig. 6D THIS IS SOME PRINTED SCRIPT. DELETE BLANK LINE (BOL marker)
This is some cursive script. This script is included as a
feature of this drawing to illustrate the
principles of the SCRIPT (BINARY ENCODED) (ASCII)
PROCESSING METHOD.

SCRIPT/BINARY-ENCODED-CHARACTER PROCESSING METHOD AND SYSTEM

BACKGROUND OF THE INVENTION

This invention relates generally to pen-based computer systems and more particularly to an interactive method for entry and editing of script, text and drawings in a document display.

Script refers to handwritten characters and words. Text refers to typewritten characters and words and includes binary-encoded characters such as ASCII text. Drawings refers to hand drawn sketches but can also include imported drawings originally drawn by or on a machine.

Existing pen-based systems use gestures to edit exclusively script or ASCII text (i.e., not both interchangeably or simultaneously). They are limited, moreover, to gestures that by their form, context, or location can be distinguished from the data that they act upon. For instance, free-form gestures applied to ASCII text are recognizable because the ASCII exists in what can be termed a different plane. Free form gestures applied to selected script are recognizable because pen actions following a selection are assumed to be gestures OR because writing applied to a selected area is assumed to be a gesture. Free-form gestures occurring within a gesture sensitive area of the screen are easily recognized. Otherwise, prior systems require an explicit action to initiate gesture recognition especially within script such as selection of text or scrip or keyboard or similar input of a control command. One could alternatively designate a set of unique strokes to define gesture commands, but this approach requires interpretation of all strokes during script entry which is compute-intensive and virtually precludes mixing script, ASCII text and sketches.

Editing of untranslated script in existing systems is typically restricted to opening up space between characters or words, erasing characters or words, and applying enhancements to pieces of script (e.g., underline, bold, etc.). No known prior pen-based system enables script words to be word-wrapped, let alone doing it with mixed script and ASCII text. Developers have probably been reluctant to attempt script word wrap for the following reasons:

Processing strokes consumes a lot of CPU time making it difficult wrapping reflow and display in a timely manner.

Strokes consume a lot of memory.

A word wrapping algorithm for handwritten script is unheard of, to say nothing of one that can maintain the user's spacing of strokes (words).

Certain pieces of information that delimit paragraphs and preserve horizontal/vertical whitespace during word wrap must somehow exist within the script document. The common approach to adding this sort of information to a document involves explicitly delimiting paragraphs and specifying whitespace, neither of which is conducive to the free flow of thoughts while writing.

Mixing ASCII and script text with graphics requires a gesture set that functions the same with both types of text and is not confused with script writing or graphics drawing. Mixing ASCII with script text in the same edit plane is not known to have been done before, although systems are known in which a script annotation plane allows users to overlay existing ASCII documents with script comments.

ASCII text editing systems have typically been character-based, using a cursor to control positioning. Script, by its nature, makes character-based editing very difficult. A cursor is not needed with script because of the direct referencing characteristics of a pen. A system that mixes both script and ASCII text must be able to handle the character nature of ASCII as well as the free-form nature of script.

Script is composed of strokes; pen movements captured as the stylus traces a character outline on a digitizing tablet. A script character can contain one or more strokes. Each stroke must be captured and its characteristics maintained in a stroke database. The typical method for this is called the time-order method. The time-order method has limitations, however. This method can lead to misinterpreted characters, depending on how the characters are created. Accordingly, a new approach is required which would eliminate the ordering of strokes merely by the point in time in which they are created.

Another drawback to current art for capturing pen-based stroke data input is the inability of current systems to wrap words and maintain predesignated spacing between words that have wrapped on to a subsequent line. This causes a loss of the user's writing characteristics, resulting in material that is less readable to the person who wrote it. Accordingly, a method is required to maintain predesignated space between words after word wrapping to successive lines occurs.

A system could determine the amount of space between script words by monitoring stroke data input in real time; analyzing the data using pattern recognition techniques, and accordingly developing a method for identifying word separation space. This, however, requires complex software and hardware capability beyond that of the typical pen-based technology commercially available. Accordingly, a method is required which reliably captures word spacing without complex computer analysis of stroke data.

Accordingly, a need remains for a better way to enter, store, manage and edit handwritten script, or preferably script and binary-encoded text, in a pen-based computer system.

SUMMARY OF THE INVENTION

One object of the invention is to provide an improved pen-based computer system and script editing process.

Another object is to recognize stroke/ASCII character clusters or units that might represent words or embedded drawings.

A related object is to ascertain word boundaries in order to perform word editing functions such as word wrap while maintaining the user's word spacing.

Another object is to provide an intuitive interactive user interface for a pen-based computer.

A further object is to specify editing commands within freeform script/drawings such that the commands are not confused with the script/drawings and the user interface retains the look and feel of a piece of paper.

An additional object is to interpret the meaning of script/ASCII text positions within a document being written or a document that has been scanned or FAXed and to provide editing features without destroying the subtle information inherent in the layout of a page of text.

A script/binary-encoded-character processor (or simply script/text processor) preferably includes a script/ASCII text editor, support for creating drawings, and optionally an outliner. The processor also has simple page layout capabilities implemented through vertical and horizontal margin settings.

The basic script or script/text processing method can be implemented in a variety of software forms suited to different operating systems such as PenPoint from GO Corp. of Foster City, Calif., and PenWindows from Microsoft Corp. of Bellevue, Wash., or without an operating system but with similar program features for accessing and controlling hardware components. The processor can provide character/word translation into ASCII text using, e.g., GO Corp. software. A wide range of hardware configurations can be used to implement the processor of the invention.

Input to the script/text processor can take many forms: writing with a pen (stylus) on a digitizer connected to a computer; existing or stored documents; documents from character (keyboard) based word processors; FAX transmissions and scanned documents. A word processor specific program converts the character-based document to a form recognizable by the processor. The FAX contents are recognized by the script/text processor and converted to the processor document format. The same algorithm that recognizes FAX contents will recognize the contents of scanned images.

Output from the processor can likewise take many forms including: script/text documents; ASCII files; printed images; FAX transmissions.

Input/Output to the processor can be from/to a storage medium (e.g., a disk) or some sort of network connection (e.g., a LAN or telephone lines). The processor software can be implemented in a concurrent version that allows multiple computer users to interactively edit the same document.

One aspect of the invention is that an efficient stroke compression algorithm is provided, so that documents can contain many pages of untranslated script, as well as ASCII text. Since pen strokes can be captured at high resolutions (200+ dots per inch), the method of compressing strokes was devised so as to retain the information needed to perform translation of script into "ASCII" characters. A method was also devised for converting FAX or scanned documents into the script/text document format. The compression method commences with the "root" of each stroke, which is defined relative to the line space to which the stroke is connected. Strokes are preferably rooted in the line space where the pen first touched when the stroke was made, but a stroke "center of gravity" (or some similar type of algorithm) could also or alternatively be used to determine in which line a stroke should be rooted. The method also allows ascenders and descenders (e.g., tail on "g") to cross over line boundaries while still remaining rooted in a home line.

Another aspect of the invention is that the script/text processor recognizes word boundaries within the script text and, preferably, can also recognize the implicit layout of text lines within a document. This aspect enables the processor to provide editing/word processing features that prior to this invention were not available for handwritten documents. It can also facilitate outlining. Additionally, because the script/text processor of the invention can manipulate words as images, script or text containing more than one language (shorthand could be considered a different language) can be edited (provided both languages use similar editing conventions, such as word wrapping forward from the right end of a line of text).

The method for managing word wrapping presents a novel solution to the current technical problems associated with determining word boundaries and managing word spacing. One aspect of the method provides a default word spacing value called a break point gap which can be assigned through a plurality of mechanisms at the outset of stroke data capture. Another aspect of the method employs a comparative analysis of white space between points of stroke data with the default break point gap value. A third aspect employs a monitoring mechanism for maintaining word spacing regardless of whether word wrapping has occurred.

Another aspect of the invention is a method that enables the user to use a single gesture set to manipulate both script and ASCII text, and even drawings, all within a single document. Since word translation can occur in the background as the user writes, a document can contain both script and ASCII text. Or an ASCII document can be imported and edited, e.g., by addition of script.

Other pen-based systems are known to use a set of stylus gestures for editing functions. Rather than limiting gestures to editing only ASCII, or to gestures formed so as not to be construed as script (which interferes with embedding drawings in a document), however, the present invention uses a two-step interactive approach to inputting and interpreting an editing gesture. The first step is to initiate a transitory gesture mode prompt. Once that mode is initiated (and, preferably, but not essentially, a gesture prompt is displayed), a second step is to accept a following stylus movement or gesture as a command. Upon completion of the gesture, the gesture mode automatically terminates. This approach is functional for editing both script and ASCII (any binary encoded text or data), and drawings as well.

Also, rather than using compound or unique gestures (e.g., a caret, a pigtail, etc.), straightline vertical and horizontal gestures are preferred. The gesture set used in the invention is selected to implement an intuitive relationship between the gestures and the respective functions to be performed.

The gesture set is also context-sensitive as between text and graphical editing, depending on whether the stylus is in a lined writing area or an open (unlined) drawing area of the document. Furthermore, different initial pen actions can be used to obtain different gesture mode prompts. In each case, subsequent gestures initiate different functions, depending on location/context and form of gesture prompt. This allows a simple set of gestures to be used easily to perform a variety of functions. The gesture set allows quick and easy corrections of mistakes by the algorithms that recognize word boundaries and text layout.

Another aspect of the invention enables the user to enter script continually without having to explicitly request additional blank space or move existing script that is in the path of script to be entered. Alternatively, the user can select a mode to enter script without having to shift arm position. In other words, the user can continually write on a single physical line of the input device while the software keeps track of and provides new (blank) logical line spaces.

The invention also enables the user to perform simple page layout operations in order to intersperse free-form drawing areas (non-ruled blocks of lines) with text areas (ruled blocks of lines) on a document page. The processor of the invention further allows graphics images to be drawn and interspersed within line spaces among script-/ASCII text. These images can "word wrap" along with the text in which they are imbedded.

The script/text processor's feature set disclosed herein is tailored for the typical user. If an editing or script-entry error occurs, the user simply corrects it, using other editing functions. One can provide functionality desired by the less common user by adding self-teaching features to the algorithms. Typical users of the invention would be people who want to quickly jot down notes with/without drawings; people who need to make drawings along with descriptive text, e.g., engineers, lab workers, coaches; people who want to quickly record/revise ideas as discussions progress, e.g., students; writers that do not want to leave any trace of writing that has been revised, e.g., letter writers, confidential communications; and people who desire to represent their views of the world in a hierarchical manner through the use of an outline. The information being represented hierarchically can be script, text and/or drawings, including structured diagrams.

Another class of user is the writer who does not compose documents at the keyboard (e.g., doctors on rounds, shop-floor supervisors, executives, people who cannot or prefer not to type). Documents will typically be composed in script and handed off to a secretary for translation/typing into ASCII text. The secretary may then download the ASCII document into the script-/text processor for a round of revision by the author. Downloaded documents can be read, annotated, and edited before being electronically returned to the secretary or publisher.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is a state diagram of various events in the operation of the invention and FIGS. 3A-3F are flow charts of the process substeps responsive to each of the events of FIG. 3.

FIG. 4I shows the preferred set of gestures used in editing and select modes of gesture control.

FIG. 5A is a diagram illustrating word-separation concepts used in word wrapping and FIG. 5B is a diagram showing wrap-gap management in the invention.

FIGS. 6A-6D are diagrams of the script bit-mapping and compression process.

DETAILED DESCRIPTION

The following description outlines various hardware and software environments in which the handwritten script and text (e.g., ASCII) processing software of the invention can be implemented. Next described in subsequent sections are script/text document and page attributes; the event-driven process used to implement the method word boundaries and wrapping; beginning-of-line designation; processing of ASCII text; interword space management including break point gap analysis, word wrapping and wrap-gap manipulation; gesture-based editing; conversion of strokes to internal stroke format using an efficient script compression technique and representation of ASCII text in internal stroke format, concluding with an example showing a series of editing processes in an operational pen-based system according to the invention.

Preferred Hardware Environment

Figure 1:
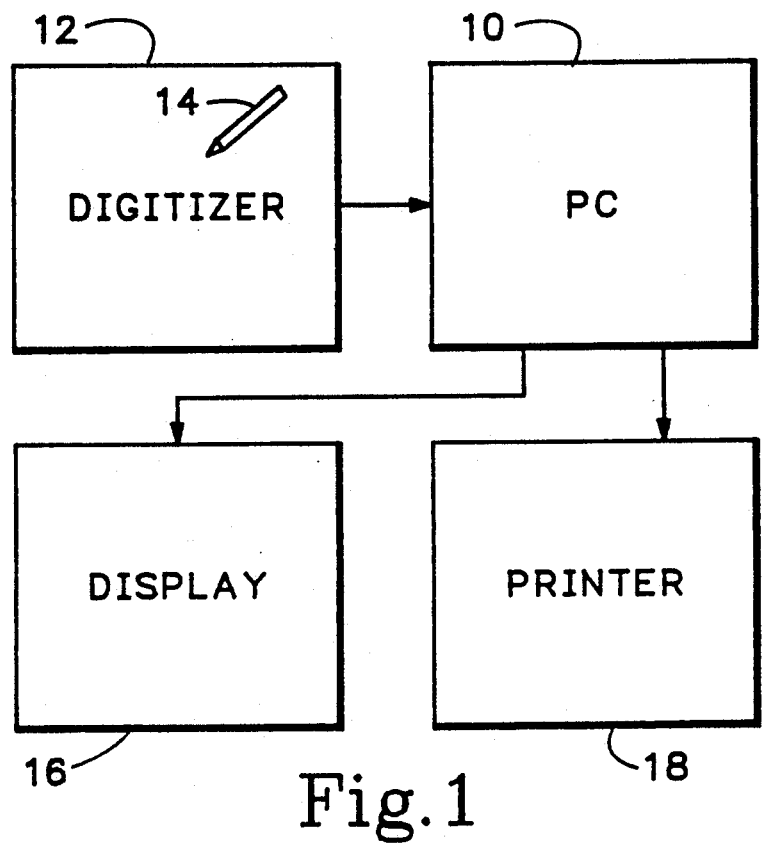
FIG. 1 is a block diagram of a PC with a pen-based script/text entry and editing system according to the invention.
Figure 7:
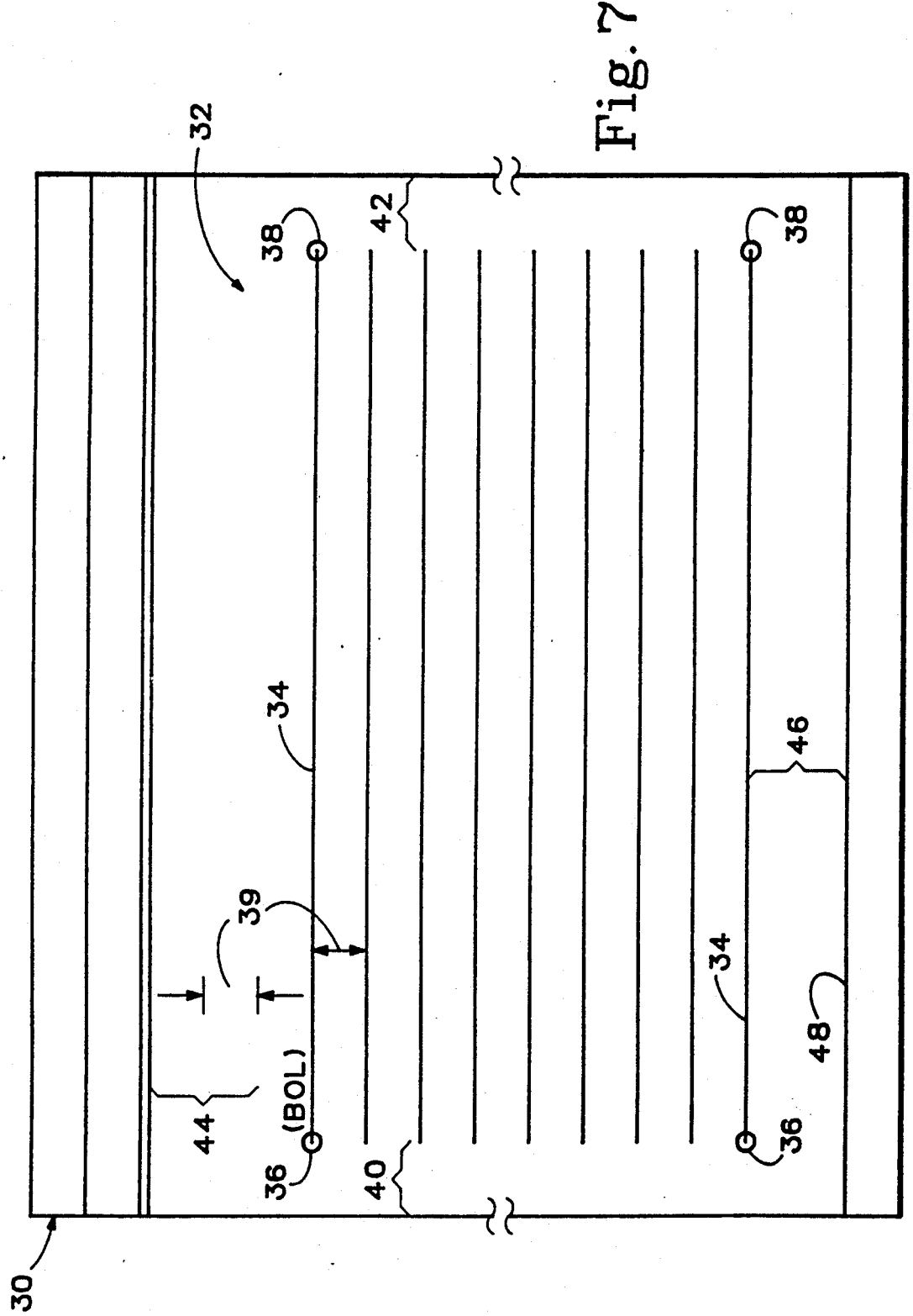
FIG. 7 is a diagram of a typical document display formatted, according to the invention
Figure 7A:
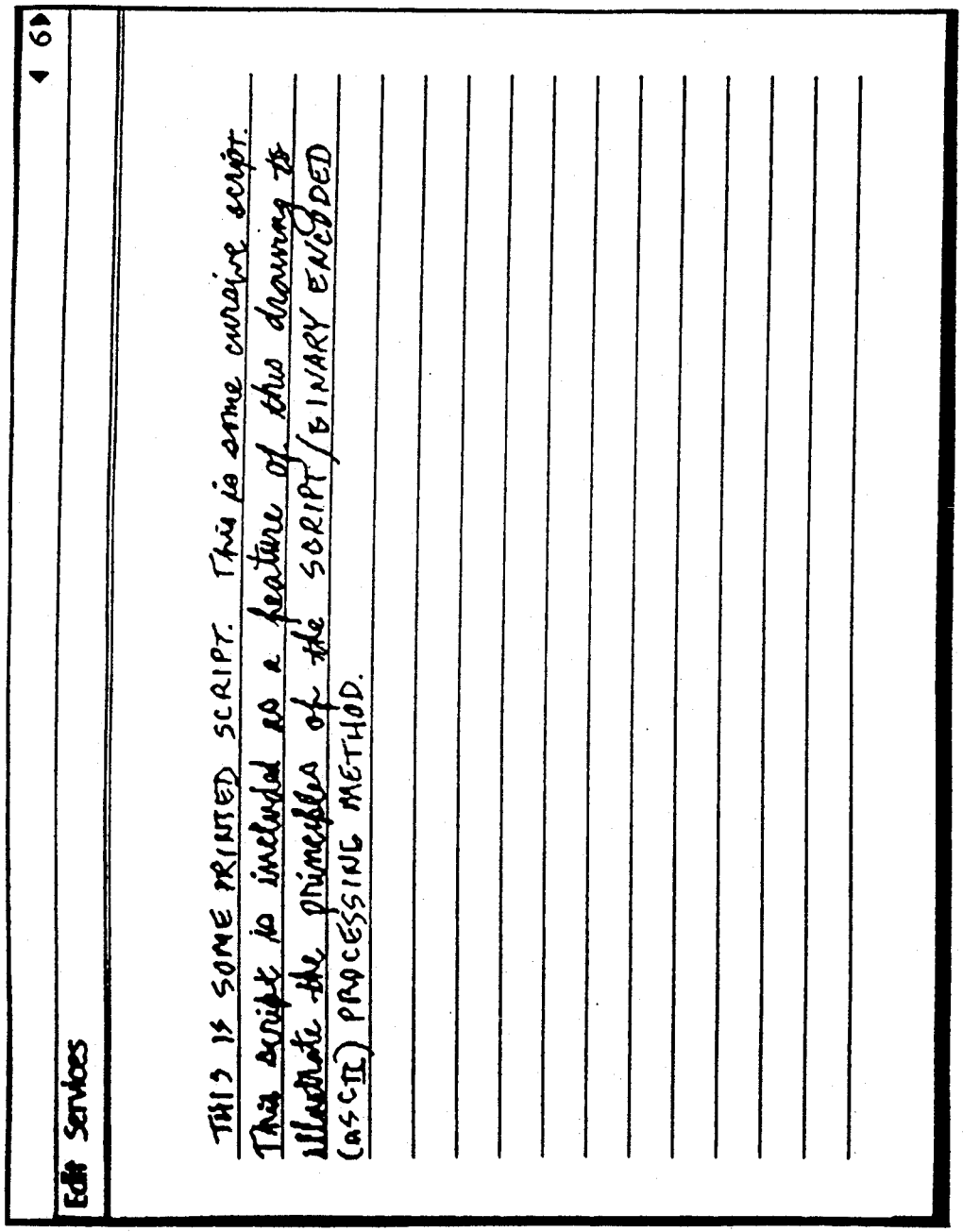
FIGS. 7A-7U are a sequential series of display screens showing a script/text document in the system of FIG. 1 as various editing functions are performed.
Figure 7B:
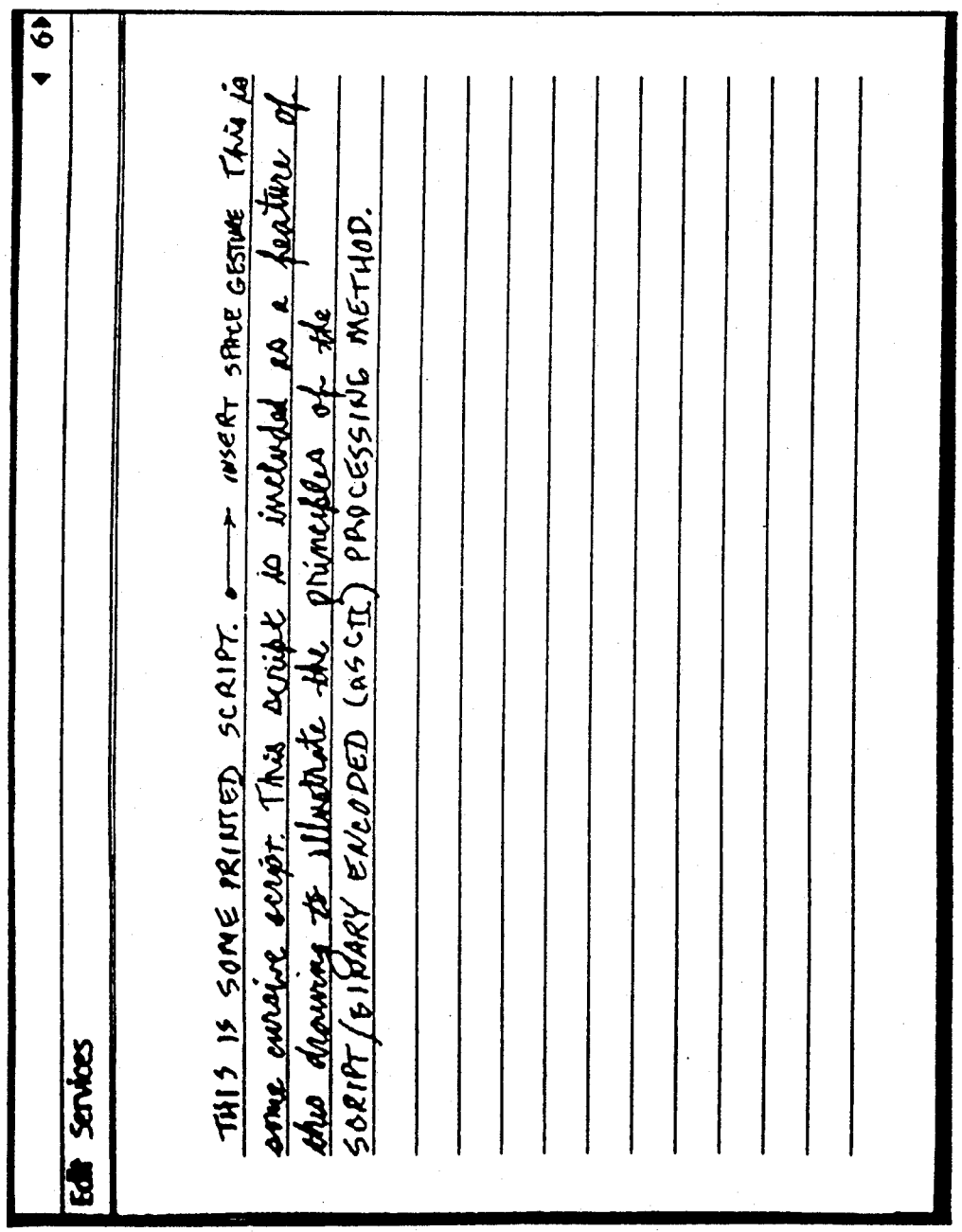
Figure 7C:
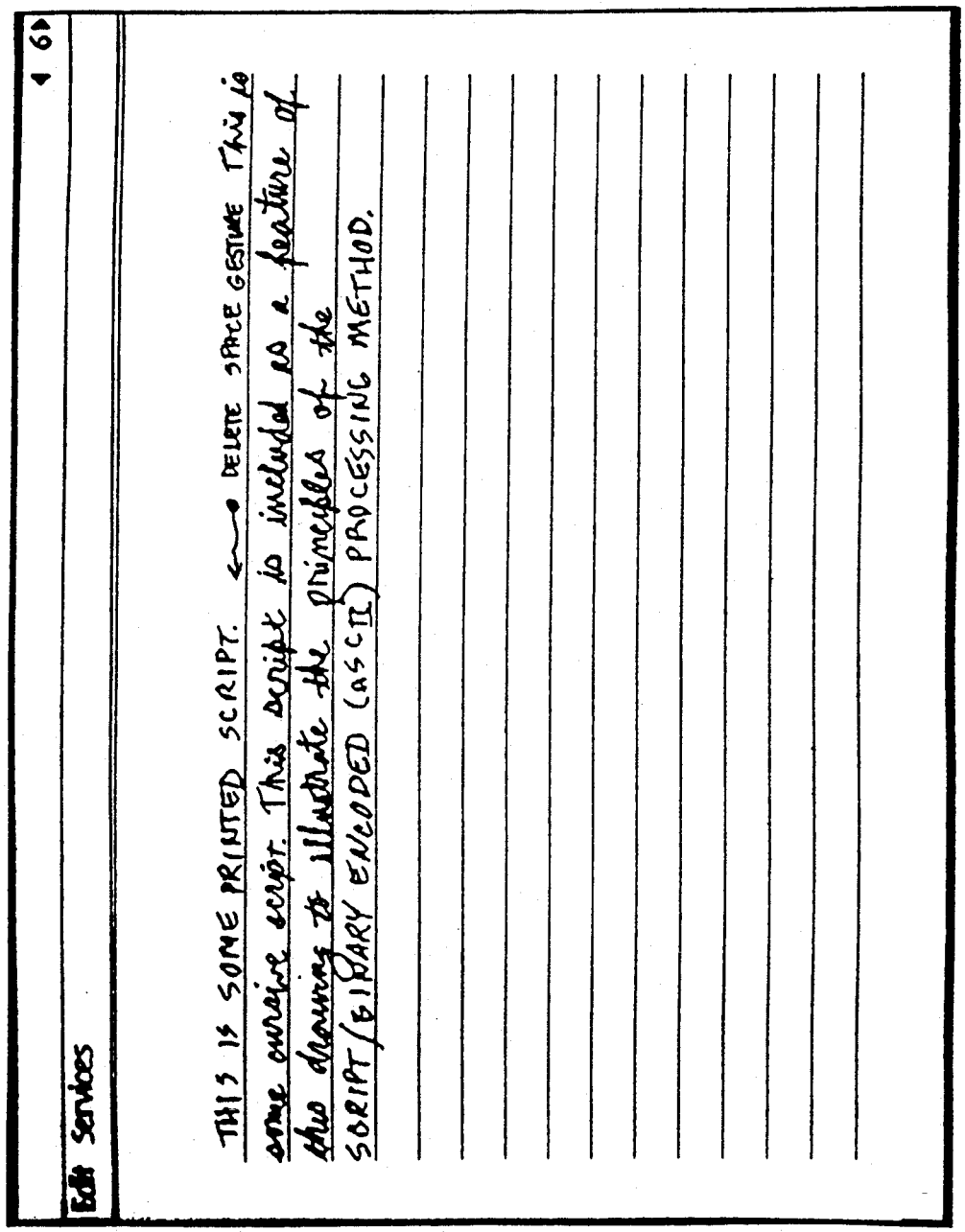

FIG. 1 shows a personal computer (PC) 10 having a graphics input device such as a digitizer 12 that is sensitive to a pen or stylus 14 that can be used to enter script and editing gestures in a document containing script and/or ASCII text. This computer has a document display screen 16 distinct from its pen sensitive digitizer and can include a printer 18 or other output device. FIGS. 7 and 7A-7U show document pages from such a screen as used in the invention.

The graphics input device is preferably but need not be capable of entering script. It can be merely a pointing device, e.g., a mouse, light pen, touch pad, keyboard cursor, etc., used to edit existing documents containing script/ASCII or to create and edit documents using a keyboard (not shown) for text entry. The presently preferred input device is a digitizer which is responsive both to stylus contact (pen down), position and stylus proximity (pen close—e.g., $\frac{1}{2}''$ or 1 cm.) such as the WACOM 50-510C digitizer and stylus, U.S. Pat. No. 4,786,765. Alternatively, a digitizer and stylus that is contact, position and pressure sensitive could be used, such as made by Summagraphics Corp., U.S. Pat. No. 4,786,764. A further alternative input device is responsive to stylus angle as well as being contact, position and pressure sensitive. In a computer having a keyboard with cursor keys, key action can be mapped to the editing gesture control functions, allowing documents containing script and/or ASCII to be edited from the keyboard as well as the graphics input device. Documents can be created using the keyboard for text entry and edited in script form.

Figure 2:
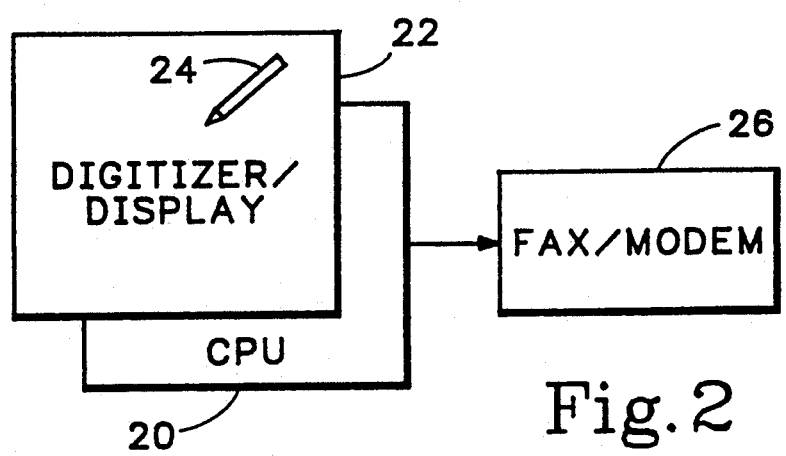
FIG. 2 is a block diagram of a free-standing pen-based computer system incorporating the present invention.

FIG. 2 shows a notebook sized computer 20 with integrated display and digitizer 2 that is responsive to a pen (stylus) 24, and an output device shown in this instance as a FAX/Modem 26.

Other hardware that can be used include:

A FAX machine with integrated display and digitizer that is connected to a computer and responsive to a pen (stylus);

A Whiteboard/Blackboard type of display having an integrated digitizer that is responsive to a pen (stylus) and connected to a computer; or A pen sensitive digitizer and light transmissive display panel (e.g., LCD) connected to a computer and positioned as an overlay on an overhead projector. A similar device is marketed that allows pen-type input but drives the overhead projector rather than being light transmissive; this too could employ the present invention.

Preferred Software Environment

Figure 3:
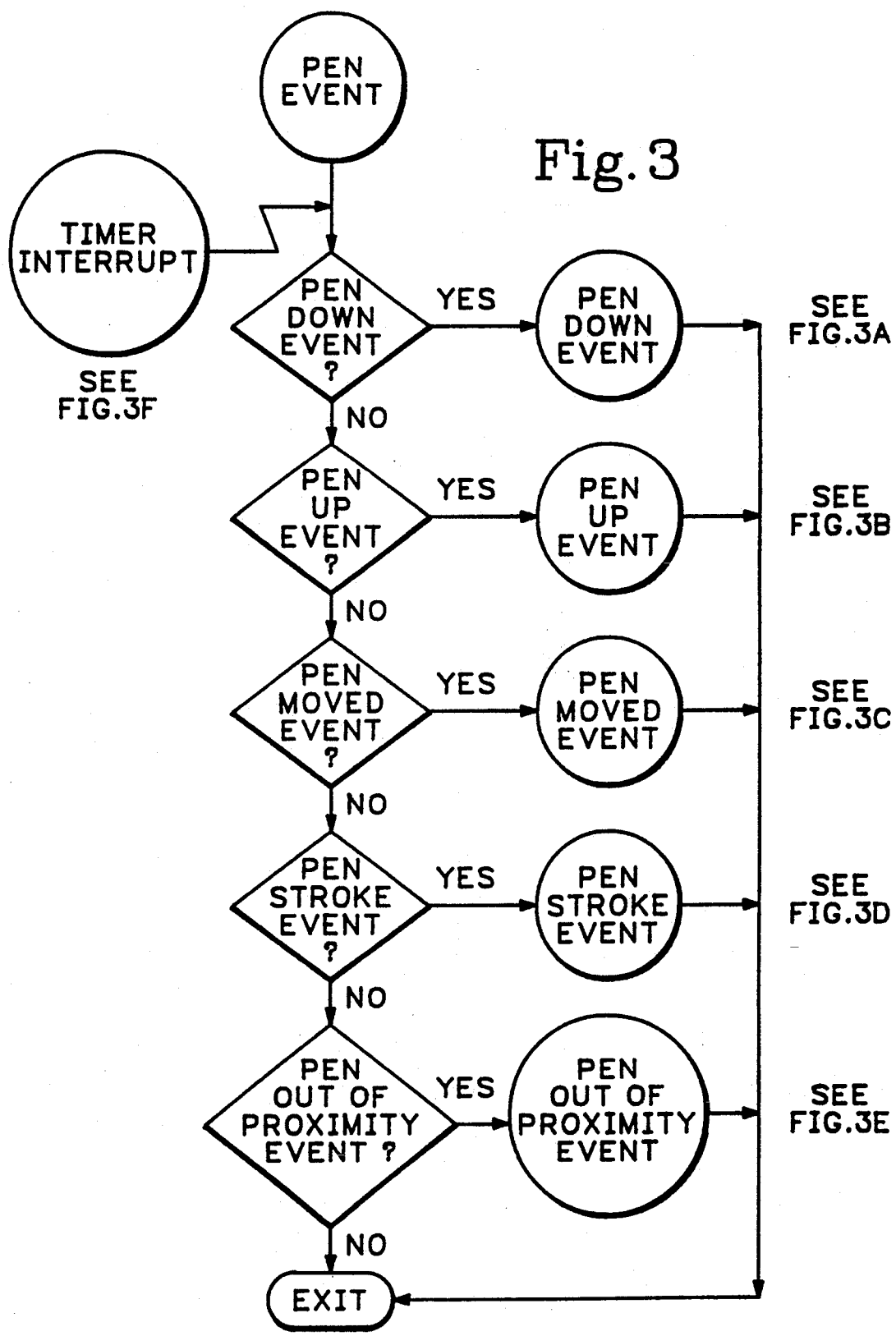
Figure 3A:
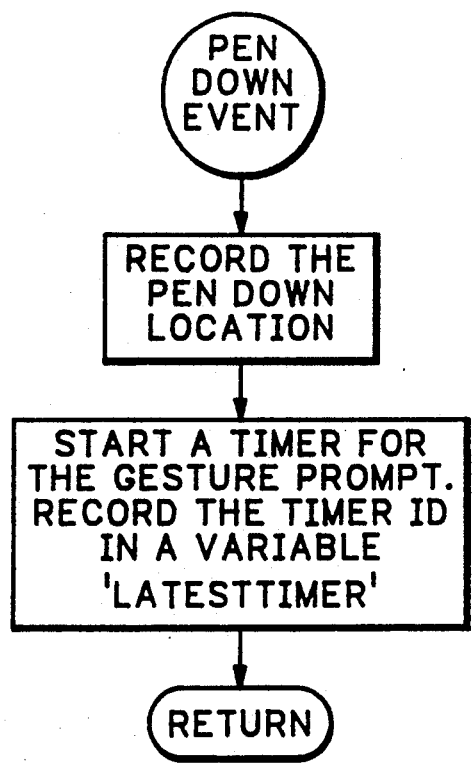
Figure 3B:
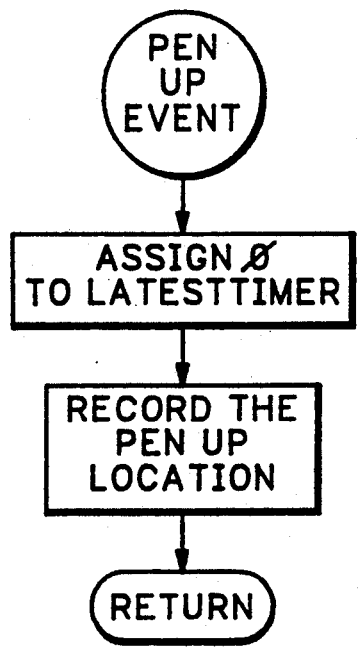
Figure 3D:
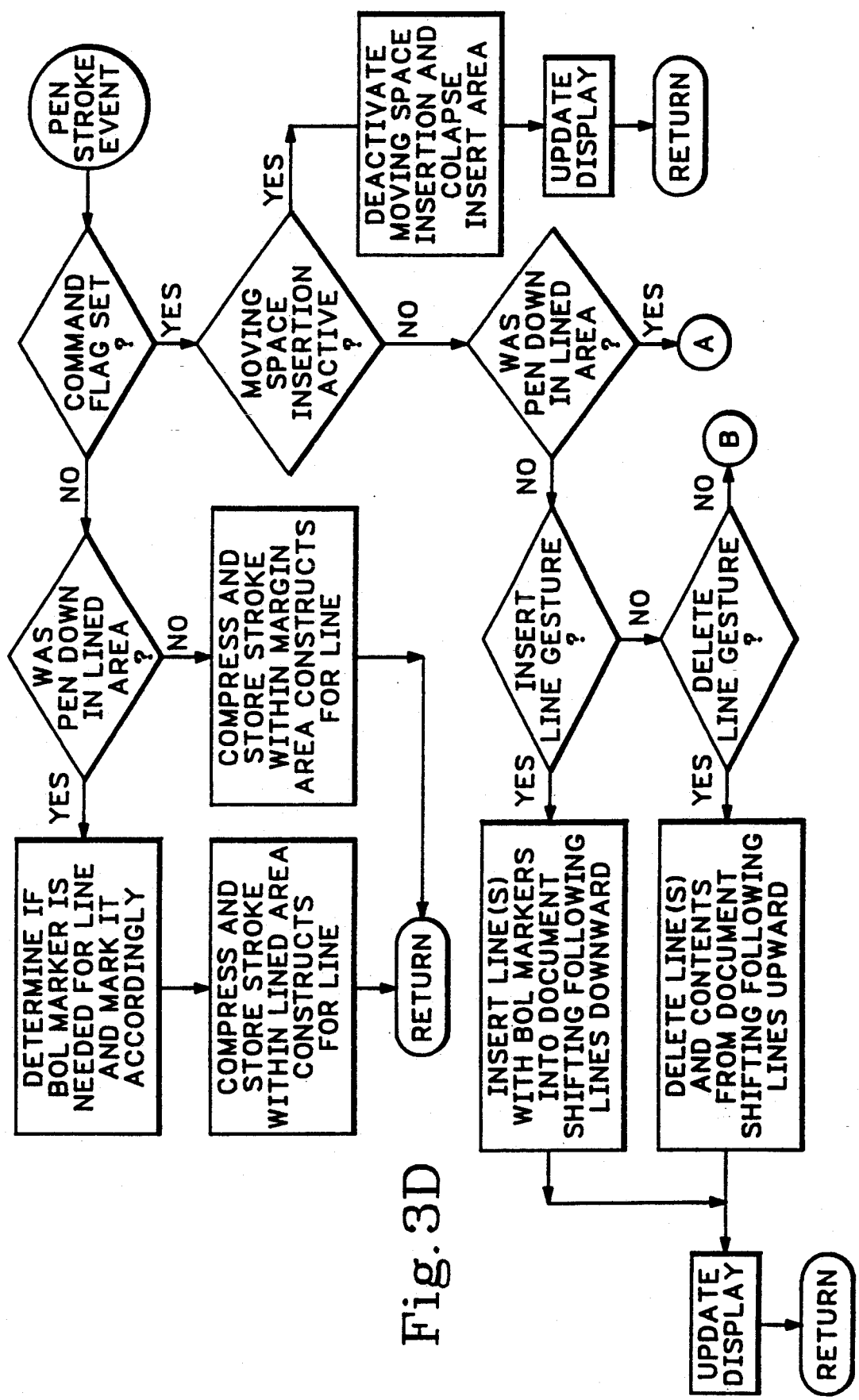
Figure 3D:
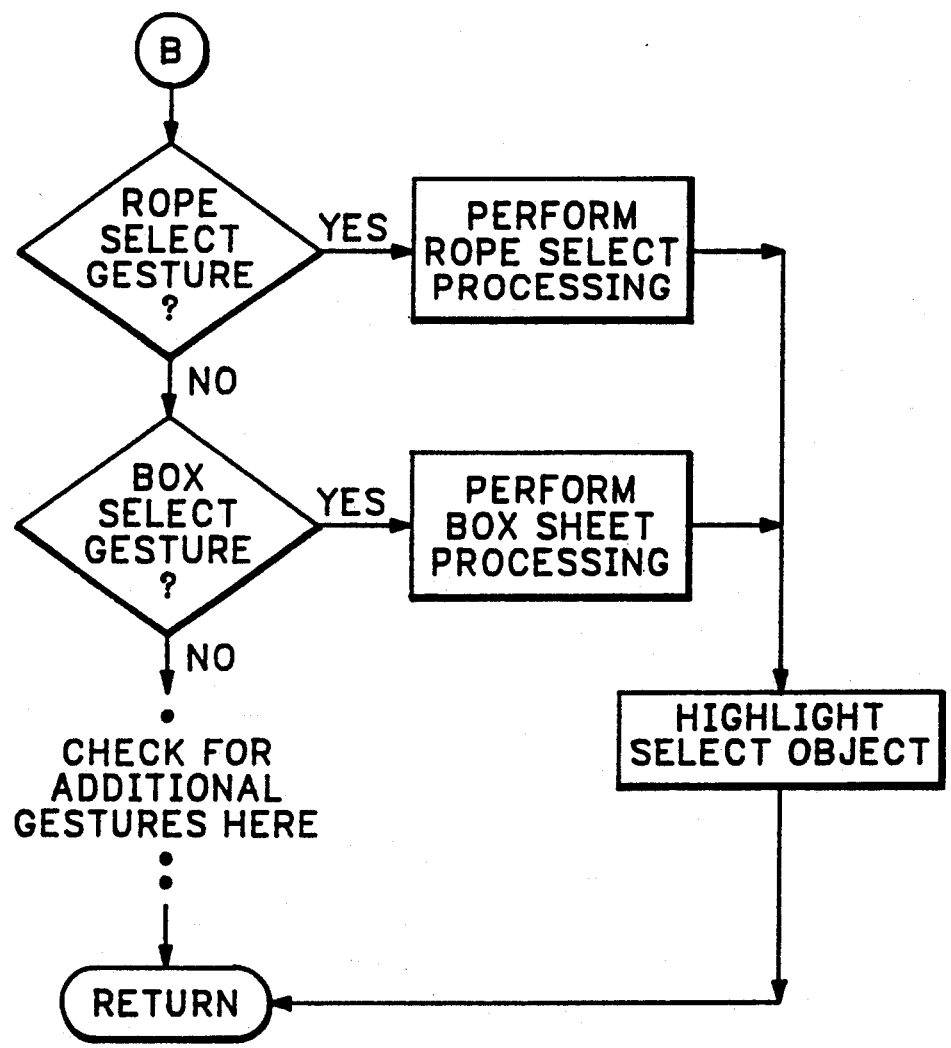
Figure 3D:
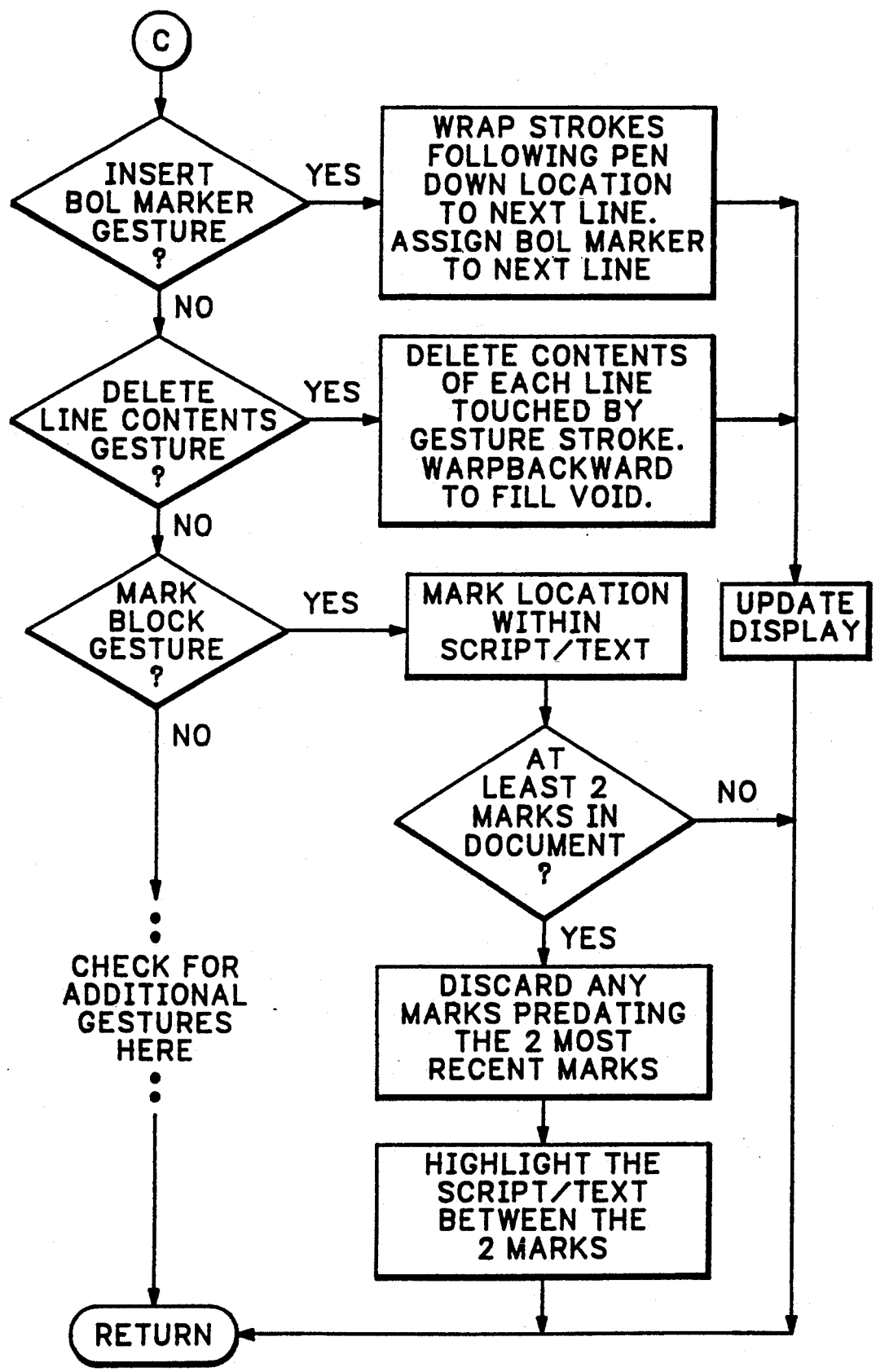
Figures 3E, 3F:
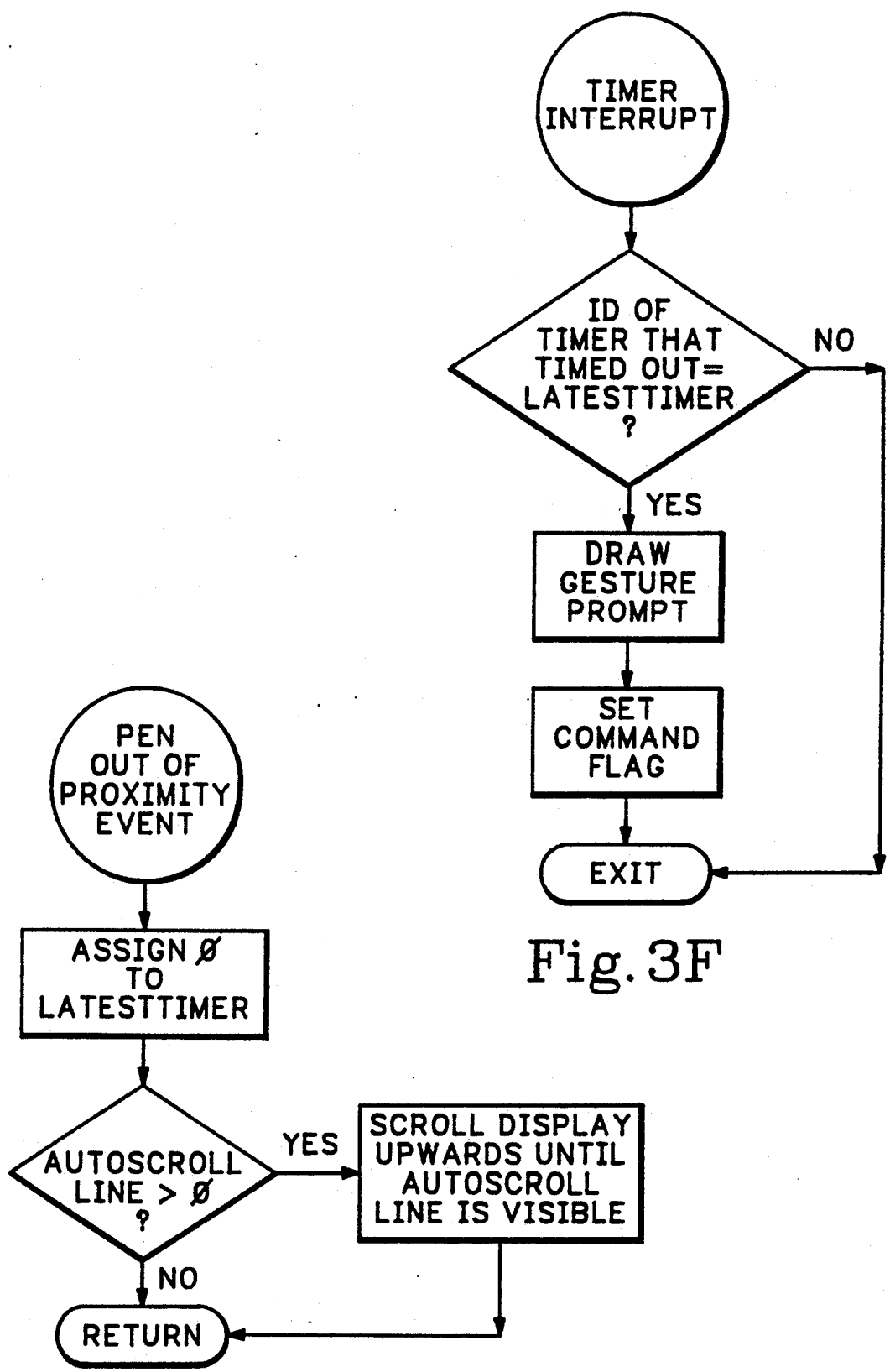

The presently preferred software for carrying out the method of the invention is shown in FIGS. 3-3F and further described below.

This software can be implemented in a number of alternative software environments. The invention has been implemented in C language on a 386-based personal computer running GO Corporation's PenPoint Operating System, and is transferrable to Microsoft's Pen Windows Operating System.

It can also be implemented on any other operating system that can provide information on pen (stylus) activity, including an operating system such as MSDOS or OS/2, that provides graphics input device and/or keyboard feedback. The invention can also be used in a computer that has no operating system but has the ability to access and control the hardware components attached to a computer system via software commands. This can include sensing stylus position on a digitizer, capturing keystrokes on a keyboard, or outputting graphic images onto a display.

Script/Text Document and Page Attributes

FIG. 7 shows a document display screen 30. A script/text document 32 in accordance with the invention comprises multiple pages for entry and editing of script/ASCII text with or without embedded drawings, as shown in FIGS. 7A-7U. The user is able to "screen" page, "paper" page or scroll through the document. The user can also write a page number within a translation area to directly reference that page. A "Find" menu option can search the document for a specific ASCII string (in the future "fuzzy fit" script string searches can also be provided).

A script/text document could also be a single page, with margin-less input or lined area comprising one or more lines. This "document" might serve as a component in a larger application.

As shown in FIG. 7, a page of document 32 typically contains a group of ruled lines 34 defining line spaces 39 that allow script/ASCII text entry and editing, above each line. The lines each have beginning and ending points 36, 38 defining line length. The lines as a group define a lined area. Preferably visible to the user, the processor can include an option to hide the lines while retaining their attributes.

Portions of the page that are not ruled are considered to be margin or drawing areas, although it is permissible to imbed drawings within lines of text. The drawing areas include left and right margins 40, 42 and top and bottom margins 44, 46. The top and bottom margins as shown include two unruled line spaces each. The user can change the size and position of the text and drawing areas including the number of line spaces, if any, used as top and bottom margins.

Within the text (ruled) areas, word wrapping can occur. A user is free to write or draw anywhere on a page but should keep in mind that large drawings (i.e., drawings with a height of two or more lines) in the lined area might be broken up during word wrap, and text in a drawing area cannot word wrap. Pages are separated by non-hard page breaks 48 which allow word wrapping between adjoining pages.

The line spaces and their respective contents are maintained as units in a tree-type data structure that allows traversal to extract the units serially for presentation in the document display. Other data structures could be used but this one is advantageous for supporting outlining.

Automatic control code insertion allows the user to write on a script/text document as would normally be done on a piece of paper, with the processor taking care of the line-by-line formatting. This is accomplished by the processor watching where, when, and how the user places his strokes. For instance, if a user writes on a line, skips a line, and then writes on the following line, then it can be assumed that the user wants the blank (skipped) line to remain blank. Editing features such as word wrapping would not overwrite the blank line. This feature and its use with static (scanned/FAXED) images is described in more detail in the section entitled Beginning of Line Designation.

A menu or gesture-selectable script processing feature, position control, allows the user to continuously write within a certain area on the display without having to perform "explicit" actions (e.g., scrolling) to position the input area. The input area will be positioned for the user by automatic scrolling. (Note that scrolling up (manual or automatic) at the end of the document causes blank lines to be appended to the document). Automatic scrolling will typically be triggered by pen out of proximity.

Some varieties of the feature are, once the boundaries of a user-specified screen area have been exceeded, pen out of proximity will cause the document to scroll so that the input area again resides within the screen area boundaries. Another version has pen out of proximity within the document causing scrolling equivalent to the number of lines used (blank lines written on) since the last pen out of proximity. An analogous gesture can also be provided that performs the same function as pen out of proximity, for use with graphic input devices that are not proximity-sensitive.

A preferred set of basic editing gestures and their functions are described in the section below entitled Gesture Based Editing and demonstrated in an operational processor in Example 3 and FIGS. 7A-7U. The next section describes the processor software diagrammed in FIGS. 3 and 3A through 3F.

Description of Event-Driven Process

FIG. 3 shows the main process of the present invention. The various pen or stylus digitizer events that drive the application are described as follows:

Pen Down: Event is generated when the stylus contacts the digitizing surface.

Pen Up: Event is generated when the stylus loses contact with the digitizing surface.

Pen Move: Event is generated when the stylus moves while in contact with the digitizing surface.

Pen Stroke: Event is generated when user completes a stroke with the stylus along the digitizing surface.

Pen Out of Proximity: Event generated when the stylus, already out of contact with the digitizing surface, leaves proximity (i.e., the sensing range of the digitizer). The stylus is in proximity when it is within a distance approximately one half inch of the digitizing surface. This distance can be varied.

FIGS. 3A-3E flow chart the process substeps initiated by each event. At any time during the process of FIG. 3, the timer subprocess of FIG. 3F can assert an interrupt to initiate a gesture command sequence.

Referring to FIG. 3A, the Pen Down event causes recordal of the pen down location and starts a timer for detecting a gesture prompt. The timer identity is recorded and, referring to FIG. 3F, if this timer times out before another timer is set then the system generates a gesture prompt at the pen down location. Then the subprocess returns to the main process and awaits the next event.

In the case of a Pen Up event, the subprocess of FIG. 3B sets the latest timer to zero (which invalidates the gesture timing process of FIG. 3F), records the pen up location, and returns to the main process.

The Pen Moved event initiates the subprocess of FIG. 3C, to determine whether line space needs to be opened and, if so, to open space, wrap downstream line space contents to subsequent lines, update the display, and return to the main process. If the pen has moved by more than a predetermined amount (i.e., changed location), the latest timer is set to zero, which invalidates the gesture prompt timer of FIG. 3F.

The Pen Stroke event initiates the subprocess of FIG. 3D. This subprocess causes the pen stroke to be interpreted either case a writing stroke, in which as script strokes are processed and displayed (ink is dribbled), or as a gesture, which in turn is interpreted and a corresponding command function is executed, as described below. Each branch in the subprocess concludes by updating the display and returning to the main process.

The Pen Out of Proximity event causes the subprocess of FIG. 3E to reset the latest timer to zero and then initiates a scrolling function.

Further details of the software implementation will be understood and programmable by persons skilled in programming pen-based systems by reference to the procedures diagrammed in FIGS. 3A-3F. The basic editing gestures are shown in FIGS. 4A-4H and their respective functions are described below. It will also be appreciated that these procedures can be varied, for example, to add gestures (see FIGS. 3D(b) and 3D(c), or to substitute different forms of events suited to different kinds of pen-based input devices (e.g., Pen Vertical instead of Pen Out of Proximity).

Beginning of Line Designation

Text, script and script/text documents consist of words, physical lines (where words reside), and blank space. The script/text processor currently formats all documents using only Beginning Of Line (BOL) markers. BOL markers are inserted automatically whenever the user's script entry implies that a new line of script has been started.

What the BO marker does is protect the text and/or script on the line where it resides from being shifted to a new horizontal position during word wrap reflow of the document. That is, words pushed from a preceding line will not wrap onto the beginning of the line containing a BOL marker. Instead, the entire latter line is pushed down and a whole new line is opened to receive the pushed-down words from the preceding line. In the case of blank lines, BOL markers are used to assure that the line will remain blank during word wrap reflow.

Ordinarily, these markers are not visible but optionally may be displayed.

Figure 4:
FIGS. 4 and 4A-4H are diagrams of gestures used in the invention for editing script and/or text in the editing mode of FIG. 3.
Figure 4A:
Figure 4B:
Figure 4C:
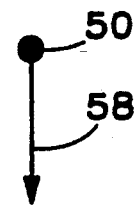

A user can also explicitly insert a BOL marker (see FIG. 4C and associated description). Unlike a carriage-return/line-feed symbol which the user must explicitly insert in conventional ASCII text processing, however, the BOL marker is ordinarily inferred from text position and is automatically input. This is important for a pen-based system so that the handwriting user need not insert control characters.

How words are arranged on lines and how lines of script are arranged on a page by a user has significant meaning. Without factoring in when and how the following words came to be in their current position, we can determine whether to insert a BOL marker at the beginning of each line of text (or script) data in the following example document:

| Line | |
|---|---|
| 1 | This is an example document which has a |
| 2 | total of nine lines. |
| 3 | |
| 4 | A list can help one remember: |
| 5 | --do this |
| 6 | --then this |
| 7 | |
| 8 | Signed, |
| 9 | Signature |

Line 1: Insert BOL marker because this is the first line in the document.

Line 2: Do not insert BOL marker because no space was available at the end of the preceding line for the first word on this line.

Lines 3,7: Insert BOL marker because lines are blank and are followed by non-blank lines.

Line 4: Insert BOL marker because this is the first line following a blank line.

Lines 5,6: Insert BOL marker because preceding line does not contain text (has blank space) for a statistically significant distance prior to the right margin.

Lines 8,9: Insert BOL marker because text is substantially indented.

The example document could have been a scanned or FAXed document that was converted to script/text processor document format before being "statically" formatted by the processor. It could have also been a document that was dynamically formatted as the user entered script and/or text. Situations like the following might then have occurred: Line 2, having been left blank while the text on the following lines was entered, had a BOL marker inserted. The user then decided to enter text on line 2. Having done so, line 2 would have its BOL marker removed for the same reason that a BOL marker was not inserted in the first example. Now if the user wanted a BOL marker to be inserted at the beginning of line 2, the insert BOL gesture could be used at the end of line 1 (see FIG. 4C). Because this would be an explicit insertion of the BOL marker, automatic line formatting would not remove the BOL marker—the user would have the option of removing it with the delete space/BOL marker gesture (see FIG. 4B)

Any time the user touches the pen to the document portion of the screen, ink will be available for writing/drawing. If a character/word translation process is enabled and the user writes in the text area, translation of script to ASCII text will occur in the background.

The translated characters will replace the script and can be edited in the same way as the script. Editing features for script/ASCII text and drawings are available to the user through gestures, icons, and menu choices.

Text Processing in Script/Text Document

For illustration, let us assume that user wants to write a mixed script/ASCII document using the processor of the invention. Starting with a blank piece of "paper," as shown in FIG. 7, a user will typically construct a script-/ASCII document by entering the script text (cursive or printed) and having it translated to ASCII in the background. Another way is if the user manually edits a pre-existing ASCII document by insertion of script. Edits can be made to either the script or ASCII text as further described below.

In order to be able to perform word-oriented editing operations on both script and ASCII text with a single gesture set, the script and ASCII portions of a document both need to be represented as a series of words. In both handwritten and printed ASCII documents, words are separated by a larger amount of space than that which separates the characters within a word. The larger amount of space between words is the basis upon which the processor decides where a word begins.

The script/text processor could decide how much space to look for between script words by watching how the user spaces words as writing occurs, basically learning what type of spacing to expect, but a simpler approach is used effectively in the present invention.

The present method provides the user with a default word spacing value (which can be determined by watching the user write a line (e.g., the first line) of text.) This value specifies a default break point gap (BPG) or spacing which defines a space between words of script, and thereby defines "words," per se. Unlike the space in typed text (e.g., produced by an ASCII space-bar character) the break point gap is defined by the physical word spacing in script, which is variable in length. The processor enables the user to adjust the word spacing value (i.e., the processor's BPG) to his personal script word spacing (i.e., to the user's own BPG).

The processor orders strokes/ASCII character images within a line by their left-most point (pixel) position. Accordingly, the word spacing value (BPG) specifies the amount of space that must exist between the left-most point (pixel) of a stroke or ASCII character image and the right-most point of all the preceding strokes and/or ASCII character images on the line in order for the stroke/ASCII character being examined to be recognized as the first stroke/ASCII character of a word (see example in FIG. 5A).

The user can increase this value if it is found that partial words are being recognized as words. Or the user can decrease this value if it is found that multiple words are being recognized as a single word. This approach has been found to be highly reliable once the user finds a good personal word spacing value. Keep in mind that the word spacing value is used for recognizing where a word begins (and thus where the preceding word must have ended). The spacing that the user gives words while writing is maintained although inter-word space compaction or expansion could be applied to position words on a line.

Word spacing within ASCII text is far more consistent than within script. The word spacing is usually different from that of script, depending upon differences in the relative size of the script and ASCII text. The processor maintains a separate word spacing value for ASCII text. This value is essentially determined by looking at the ASCII character size values resulting from the font+point size selection. The use of multiple font+point sizes in a document will require that a word spacing value exist for each font plus point size combination. Within a string of text of a particular font plus point size, only the appropriate word spacing value will be used to determine word boundaries. As script is translated into ASCII, the processor assigns a word spacing that is appropriate for the font plus point size. This does not restrict the user from inserting additional space between words by using the space insertion gesture, nor does it restrict the user from removing space between words by using the space deletion (erasure) gesture. Space inserted between script or ASCII words can only help the word recognition process, whereas space deletion can hinder the process.

When an ASCII document is downloaded into the processor, it must be converted to the processor's internal document format in order for it to be manipulated using the edit gestures. Paragraph boundaries are easily determined in ASCII documents because they are typically demarcated by explicitly-used carriage-return line-feed characters. Word boundaries are also easily determined in ASCII documents because the ASCII space character is used to separate words.

When a scanned or FAX document is downloaded into the processor, it must also be converted to the processor's internal document format. The techniques used to determine word boundaries described above are also used to determine word boundaries once line boundaries have been recognized within the input document.

EXAMPLE 1

Figure 5A:
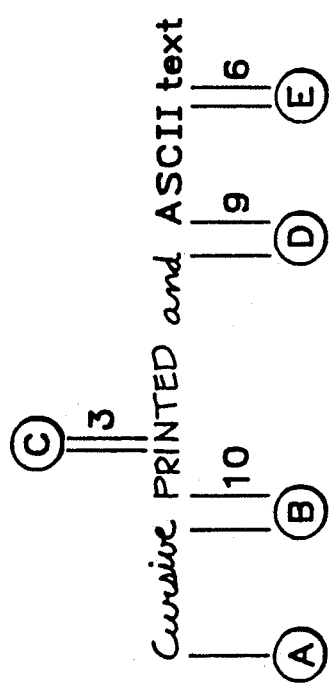

Assuming the following BPG values: script word spacing value: 9 units; ASCII word spacing value: 6 units. FIG. 5A shows a line of cursive and printed script and ASCII text created by the user in which the processor recognizes word boundaries using the following criteria:

(A) First stroke/ASCII character image is always recognized as the beginning of a word.

(B) 10 units exist between left-most point of "P" and right-most point of all preceding strokes/ASCII character images on the line. Since 10 is greater than or equal to the script word spacing value, "P" is recognized as the beginning of a word.

(C) Not enough blank space for "N" to be recognized as the first letter in a word.

(D) Whether script or ASCII word spacing value is used for comparison depends on the ratio of the ASCII character image dimensions when compared to the script dimensions.

(E) 6 units exist between left-most point of the ASCII character image "t" and the right-most point of all preceding strokes/ASCII character images on the line. Since 6 is greater than or equal to the ASCII word spacing value, "t" is recognized as the beginning of a word. Note: Proportionally spaced ASCII characters would require a word spacing value specific to each adjacent ASCII character pair.

The next three sections describe a preferred implementation of this aspect of the invention in further detail.

Gesture-Based Editing

A context-sensitive gesture set is provided for editing text and drawings. The user is free to write or draw anywhere on a page, but should keep in mind that large drawings in a text (ruled) area might be broken up during word wrap and text in a drawing area cannot word wrap.

Gestures are pen movements used to tell the processor control program to do something. This invention uses a two-part gesture. The first part initiates gesture control; the second part is the gesture itself. The processor allows the user to perform a pen action within the document to indicate that a control gesture is going to be made that should not be interpreted as an additional text/drawing stroke. The pen action stimulates feedback by causing display of a gesture prompt. The three primary ways (although there are many more) to get a gesture prompt are: (1) touch the tip of the pen (stylus) to the digitizer surface and hold it in this position for a split second; (2) tap the digitizer surface with the tip of the pen and then touch the tip of the pen to the digitizer surface at approximately the same position as the tap; or (3) in a system in which pen angle is sensed, a particular pen position (e.g., vertical) can be used to initiate a gesture prompt. Note that a specific pen action need not be tied to a specific gesture prompt. The user can be provided with a way of mapping pen actions to gesture prompts (and thus gesture classes). This would, for instance, allow the user to use the most efficient and/or comfortable pen actions to perform the gesturing tasks currently at hand. The user could then remap the pen actions to a different gesture class and proceed to use those same pen actions to efficiently and/or comfortably do something else.

When one of the above actions occurs, a visible gesture prompt symbol will be presented to the user. The gesture prompt symbol can take a form associated with the class of gestures that it represents. For action (1) above, the preferred prompt is a filled circle 50 at the pen down location as shown in FIGS. 4-4I. Action (2) can be used to get a selection gesture prompt in the form of a vertical bar 52 (FIG. 4I). So, in addition to being context sensitive, gestures are "prompt sensitive." The particular shape of the prompt displayed to the user can be varied (see FIG. 4I) and it is not essential to display a prompt symbol although very much preferred.

After seeing the prompt, the user moves the pen in a selected direction 51 (FIG. 4) to invoke a desired function. For the prompts and associated gestures described within this patent application, the tip of the pen is held to the digitizer surface beginning with the prompt and continuing through the gesture. For other prompts and gesture classes, the pen may not need to remain in contact with the digitizer surface. For instance, an "object drawing" prompt could be followed by the entry of multiple line segments, with the gesture recognition algorithm examining each line segment until a particular geometric shape (e.g., square, triangle, circle, etc.) was recognized. At that point in time, the user would be presented with a high quality representation of the recognized shape and the gesture would be complete (unless the object drawing prompt was used to enter a mode (drawing mode) that must be explicitly exited using another gesture).

For many gestures, gesture recognition can occur before the gesture is completely drawn. The gestures described in this application were chosen for many reasons, one being that they can be recognized as they are being made. This allows gesture feedback to be provided to the user at the earliest possible time. When the user makes a gesture, immediate feedback that corresponds to the type of gesture being made will be provided.

Figure 7D:
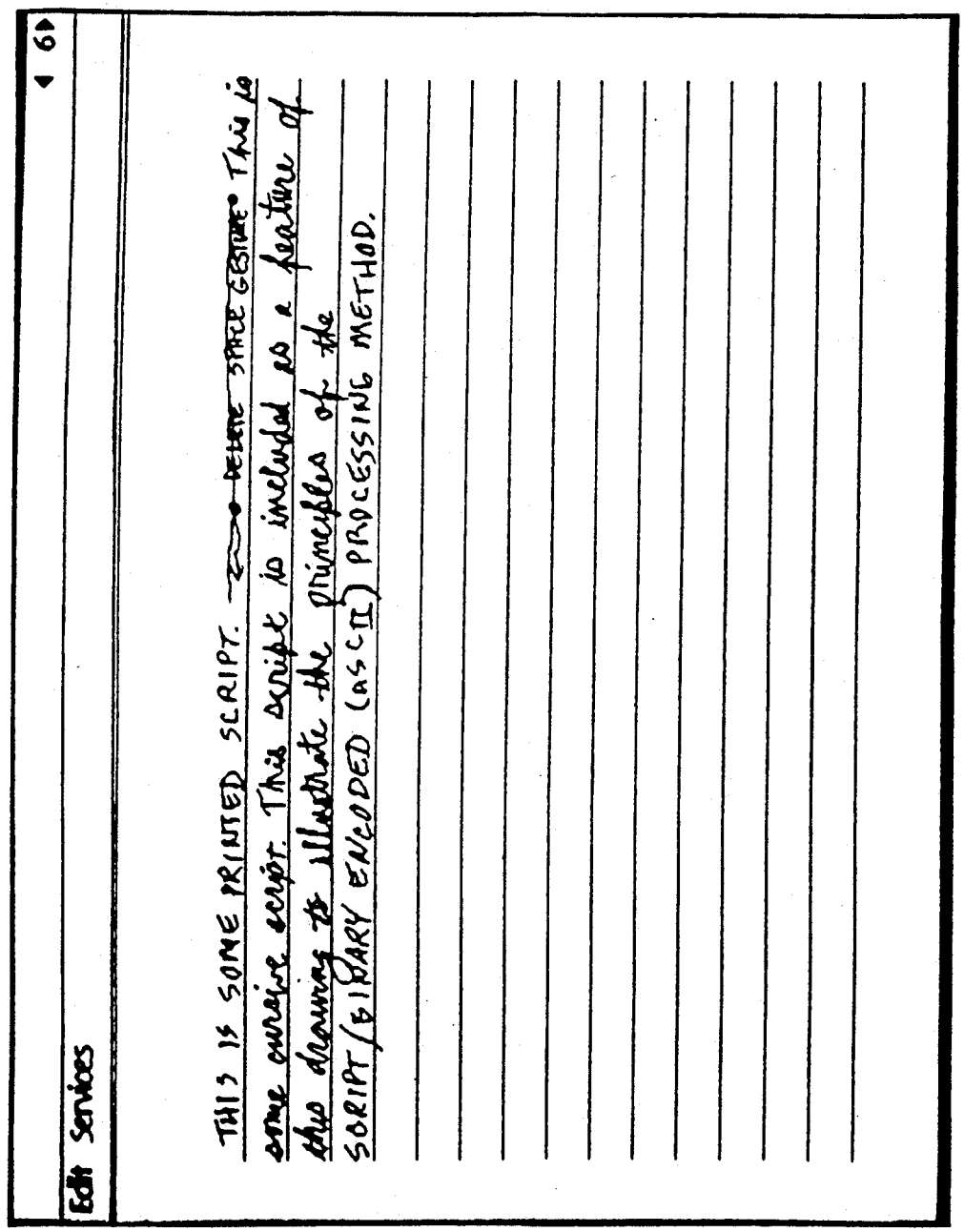
Figure 7E:
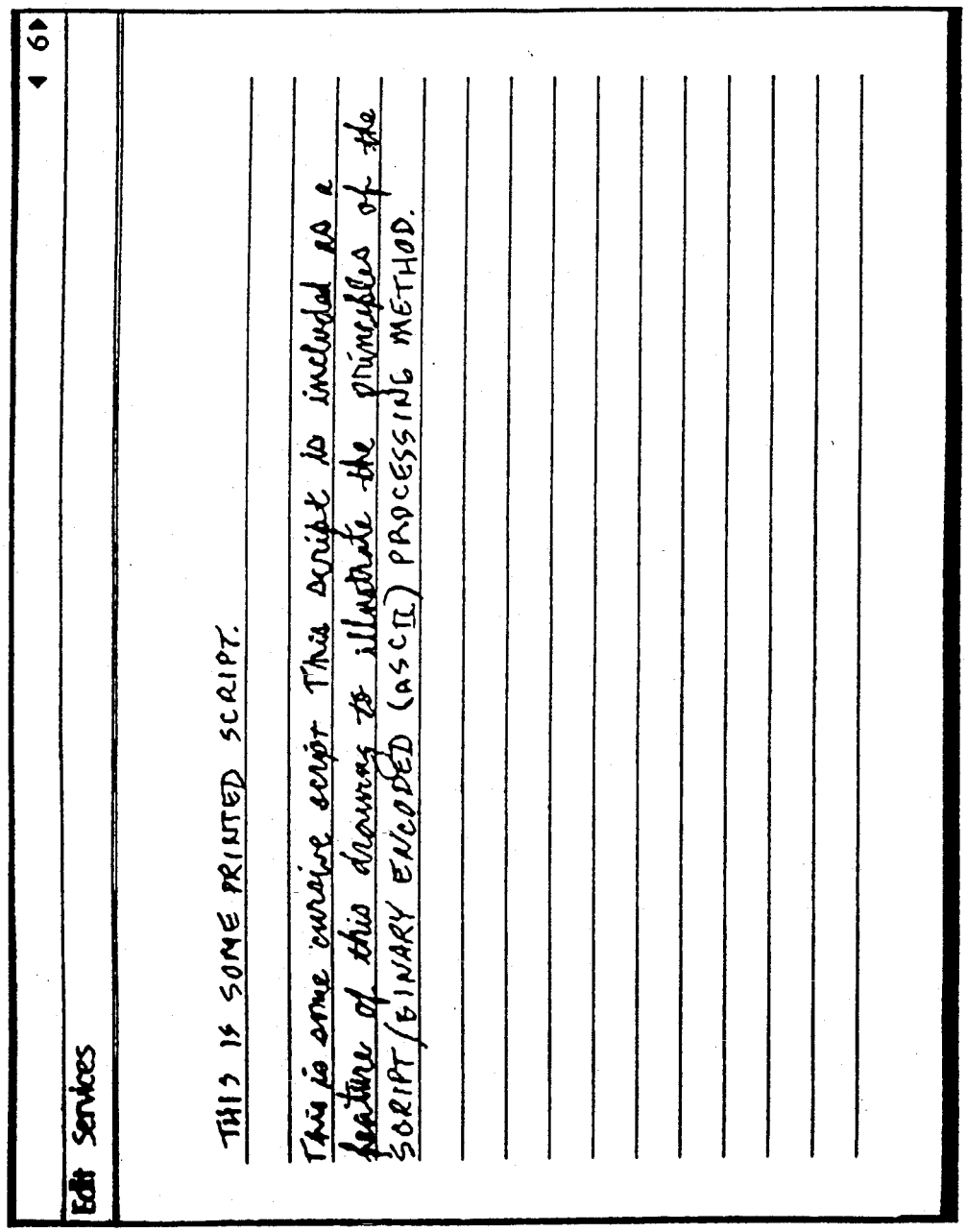
Figure 7F:
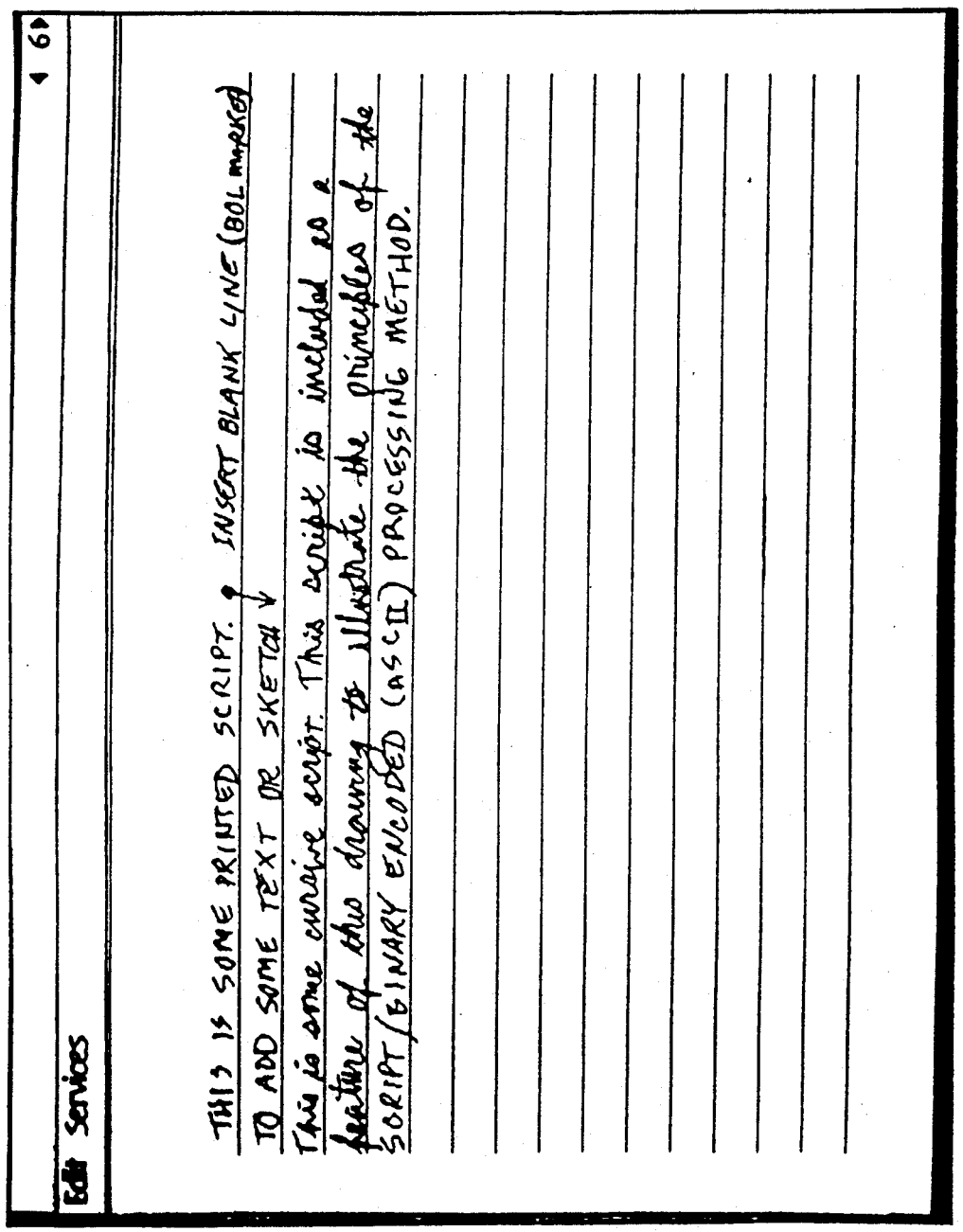
Figure 7G:
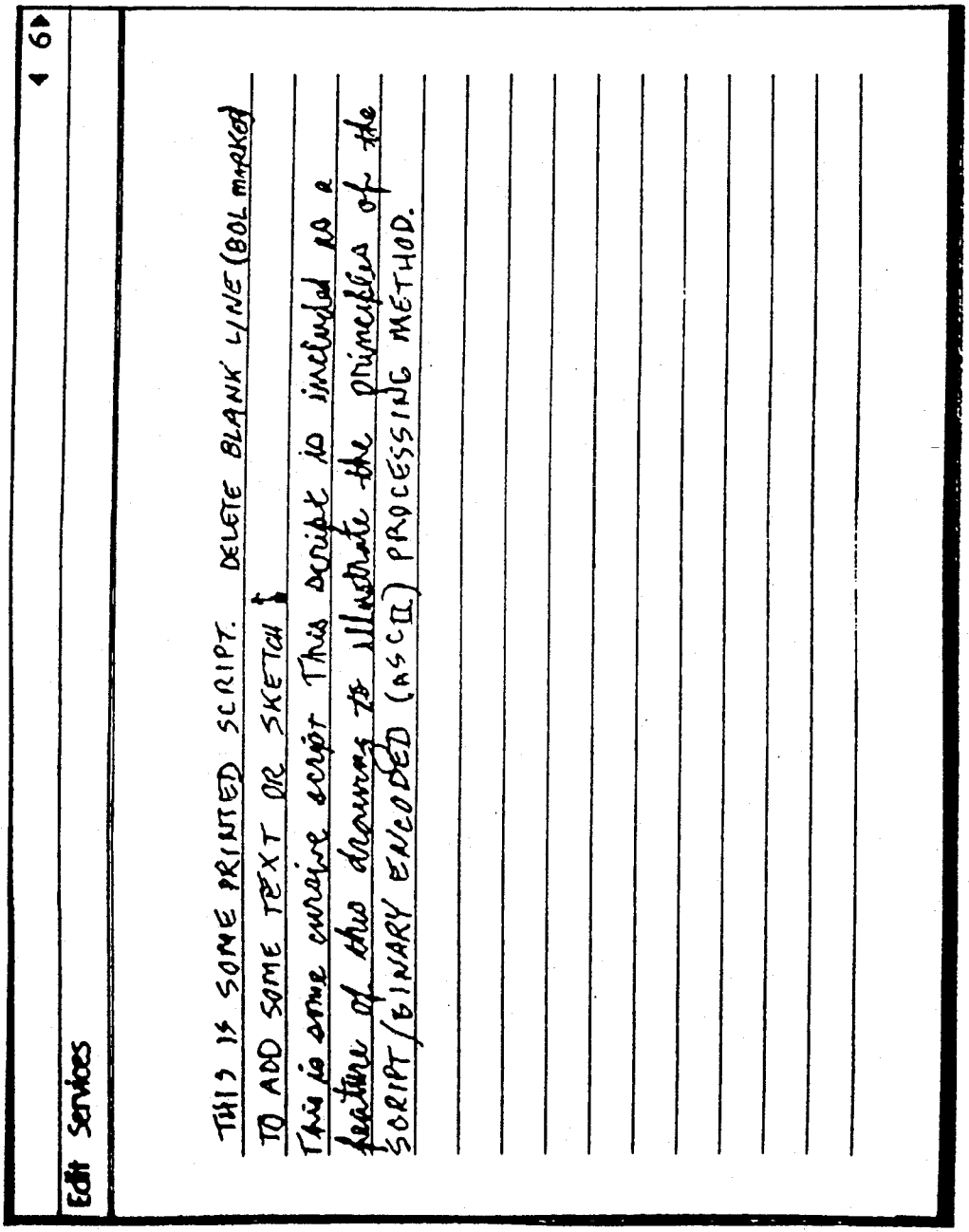
Figure 7H:
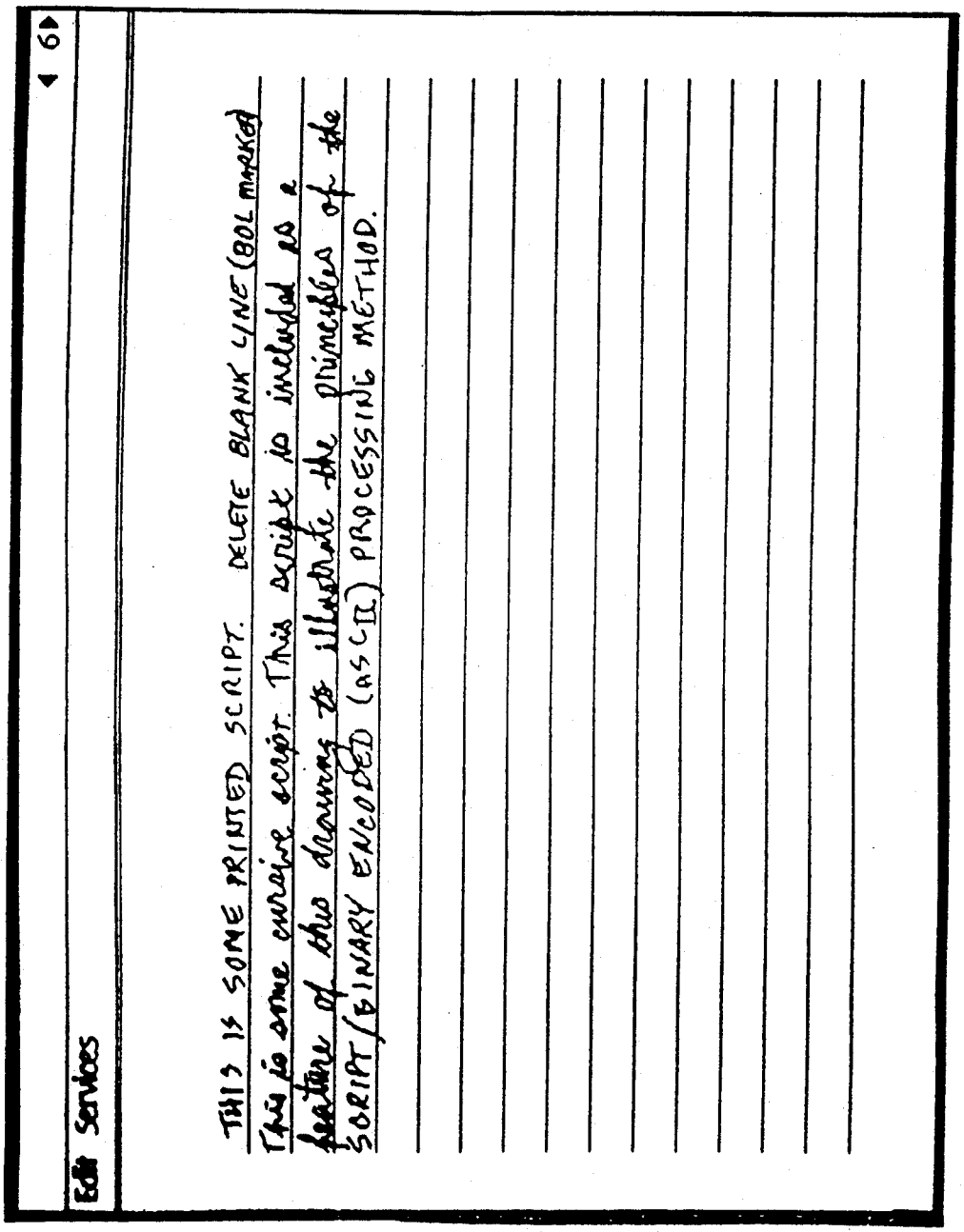
Figure 7J:
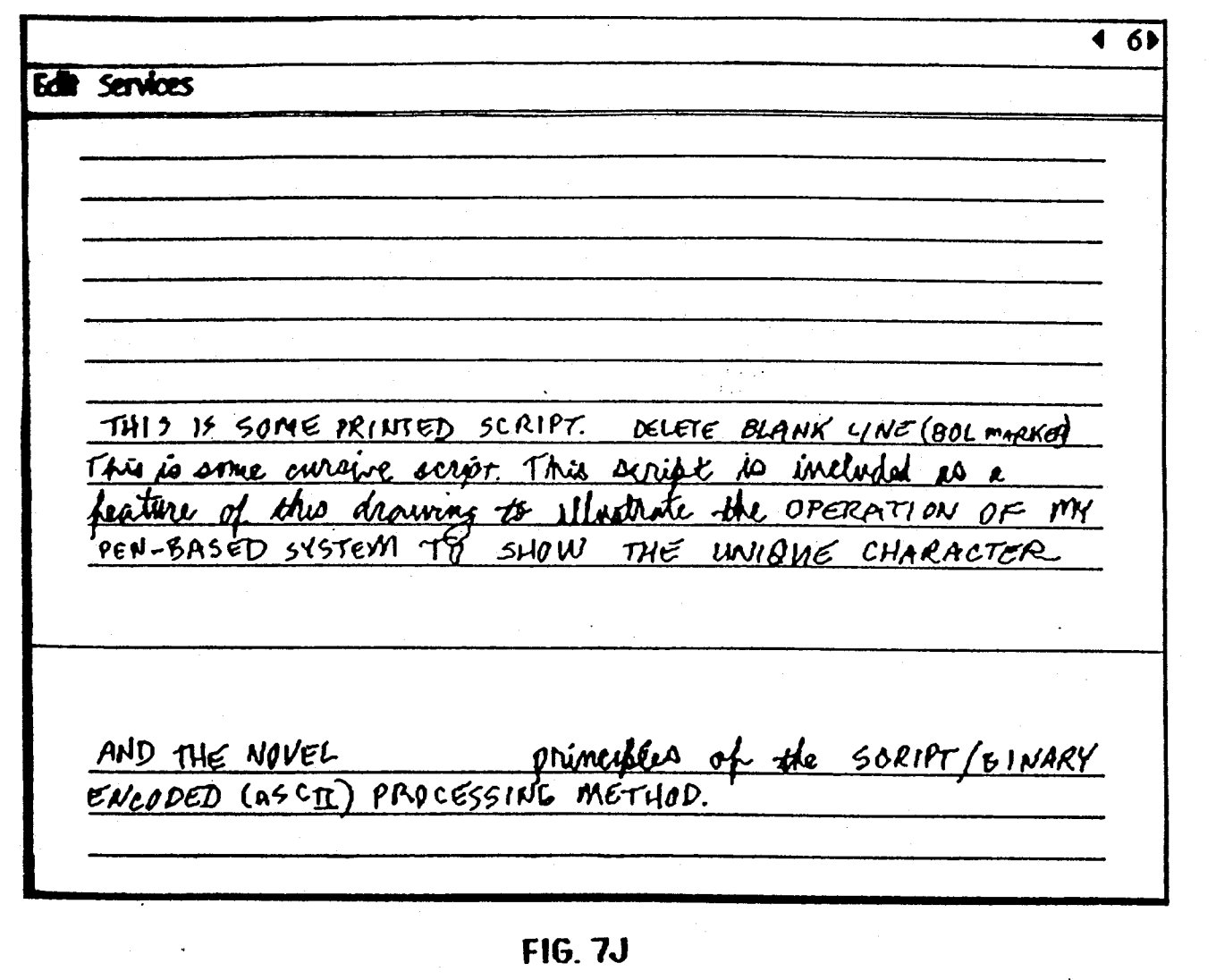
Figure 7K:
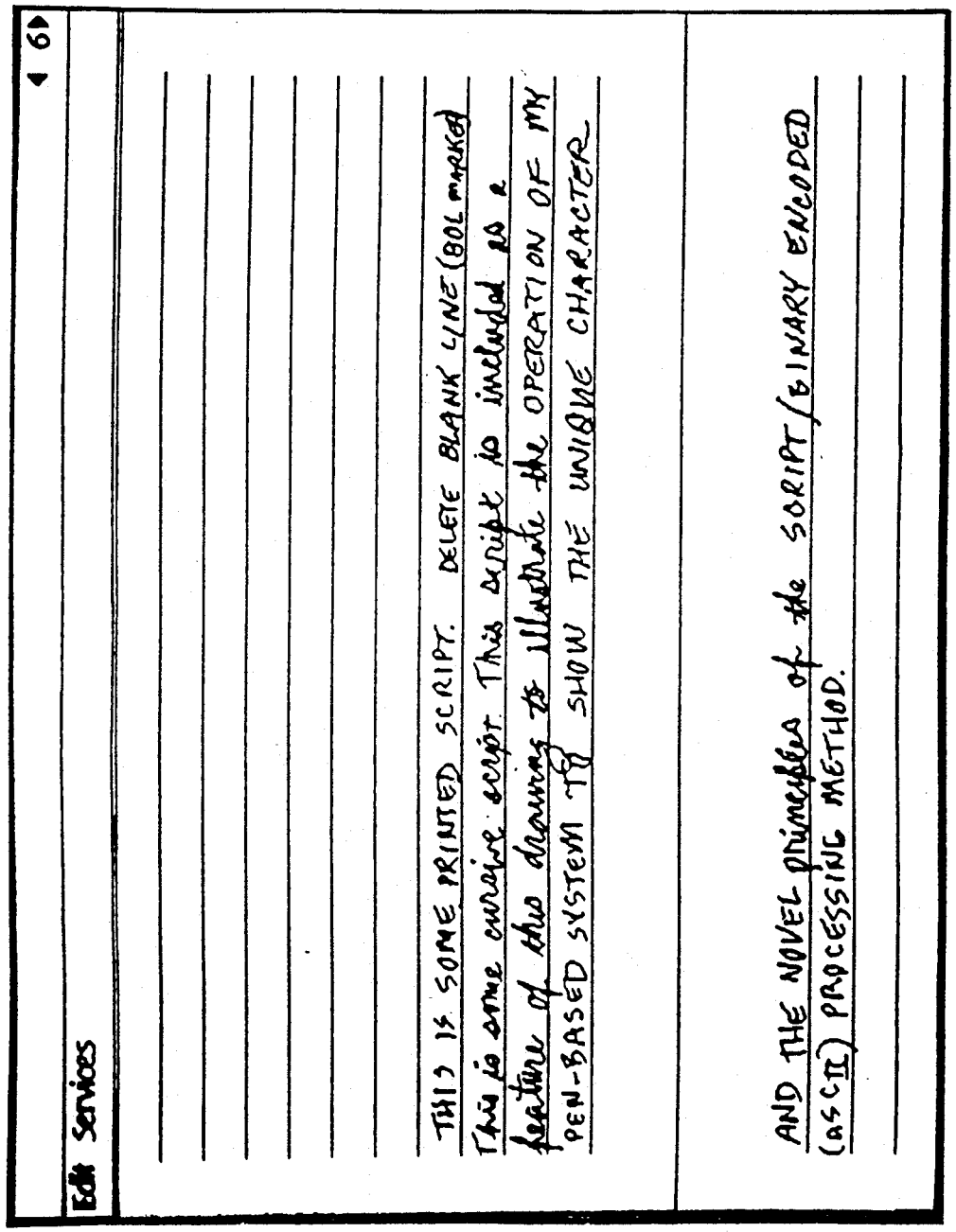
Figure 7L:
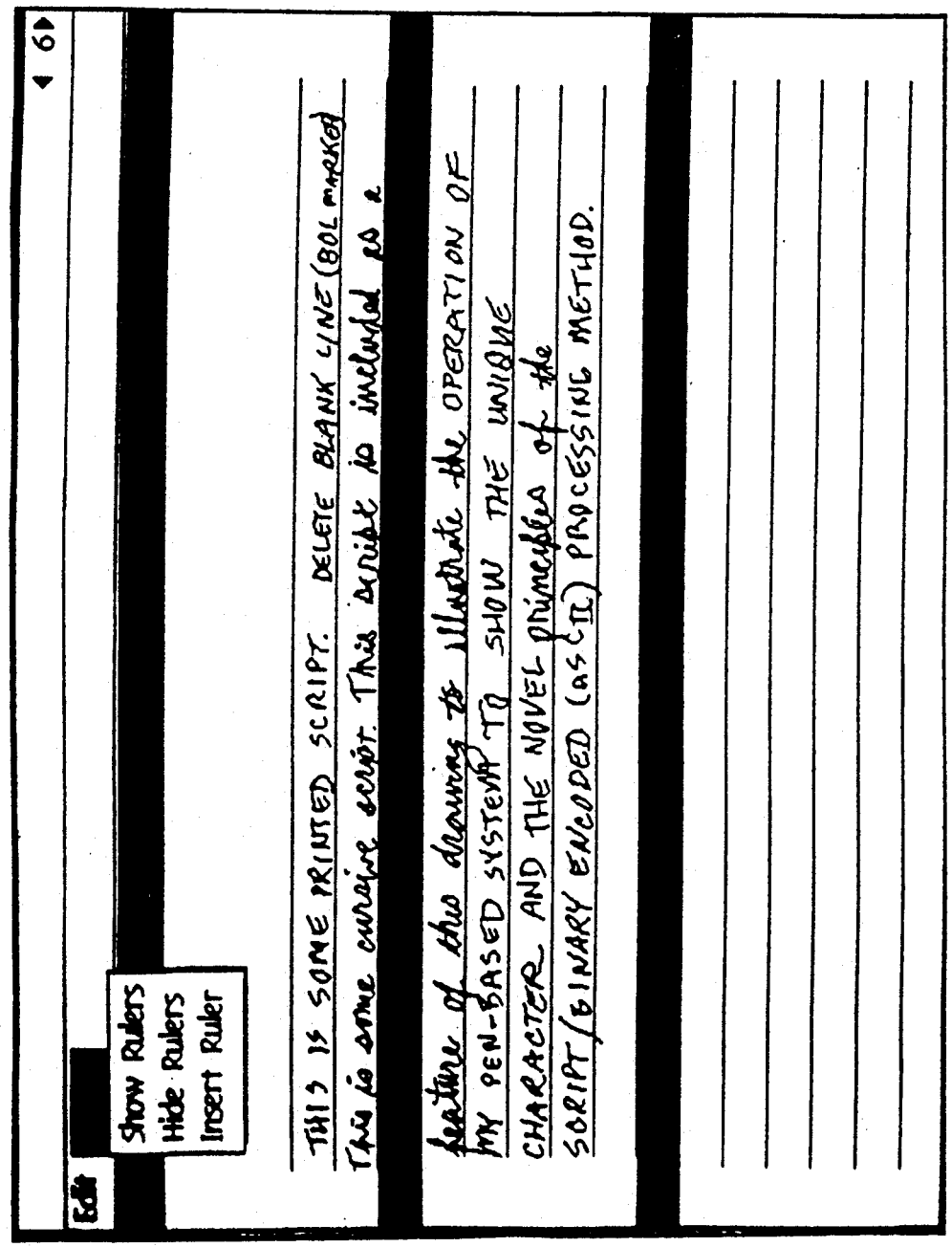
Figure 7M:
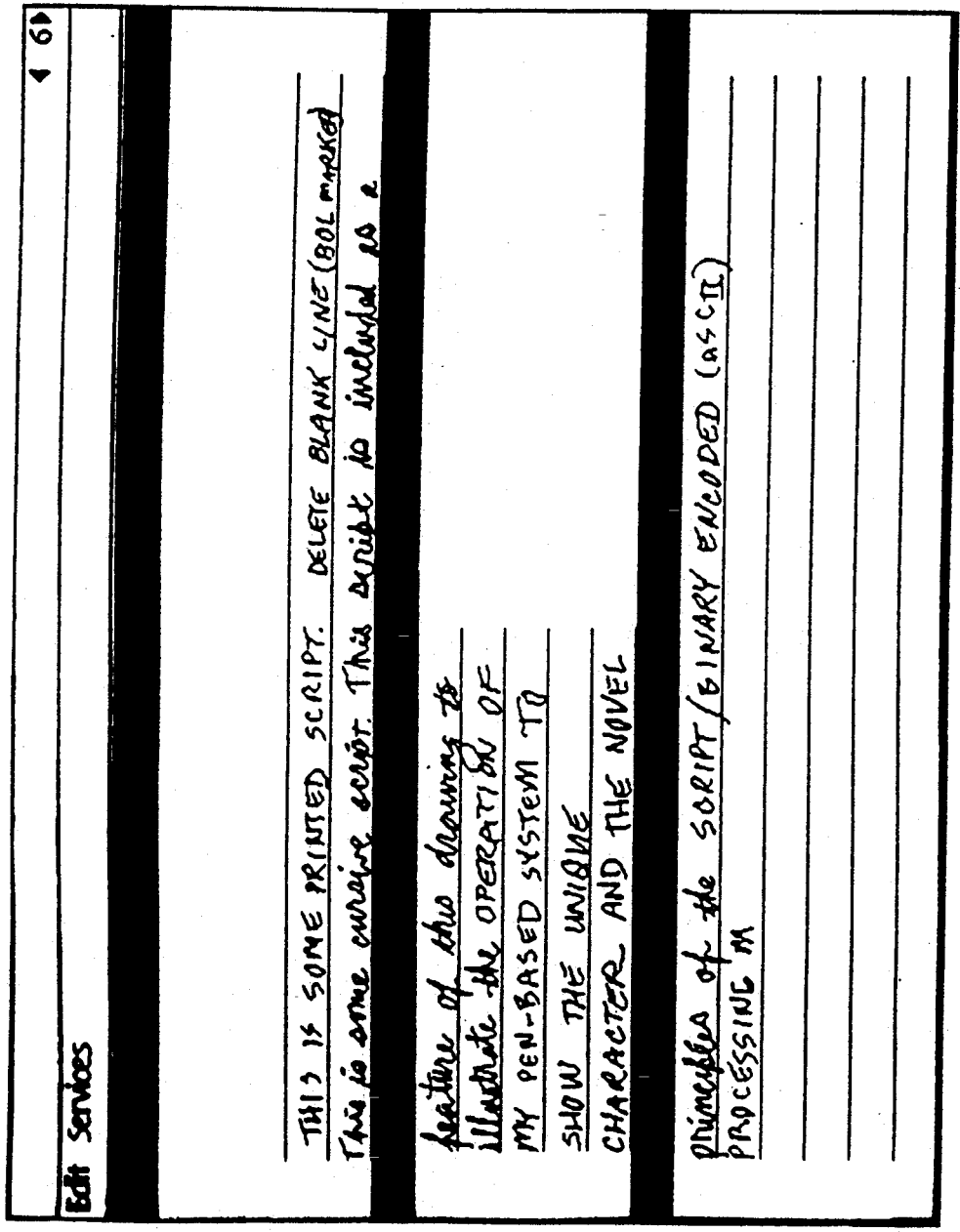
Figure 7N:
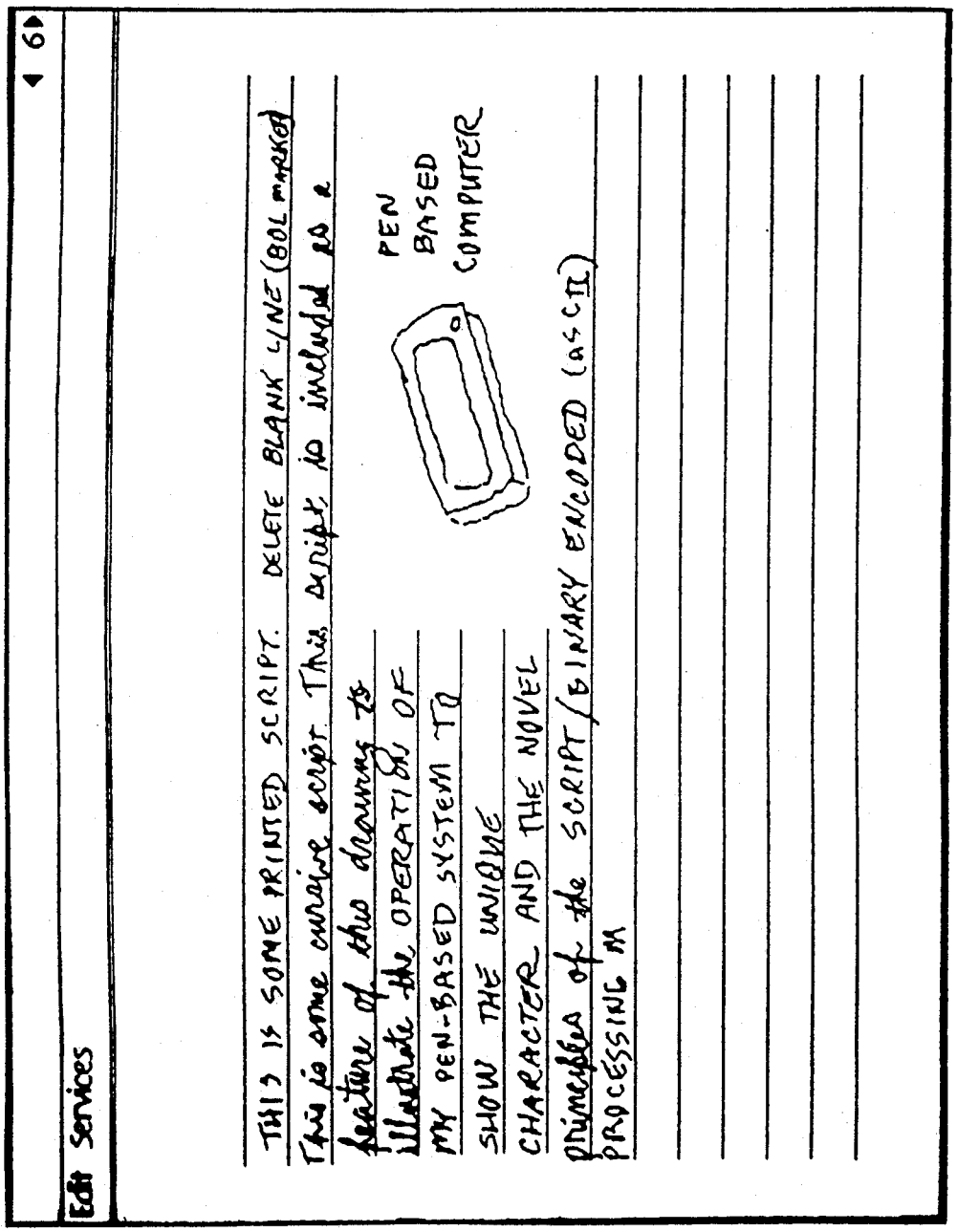
Figure 70:
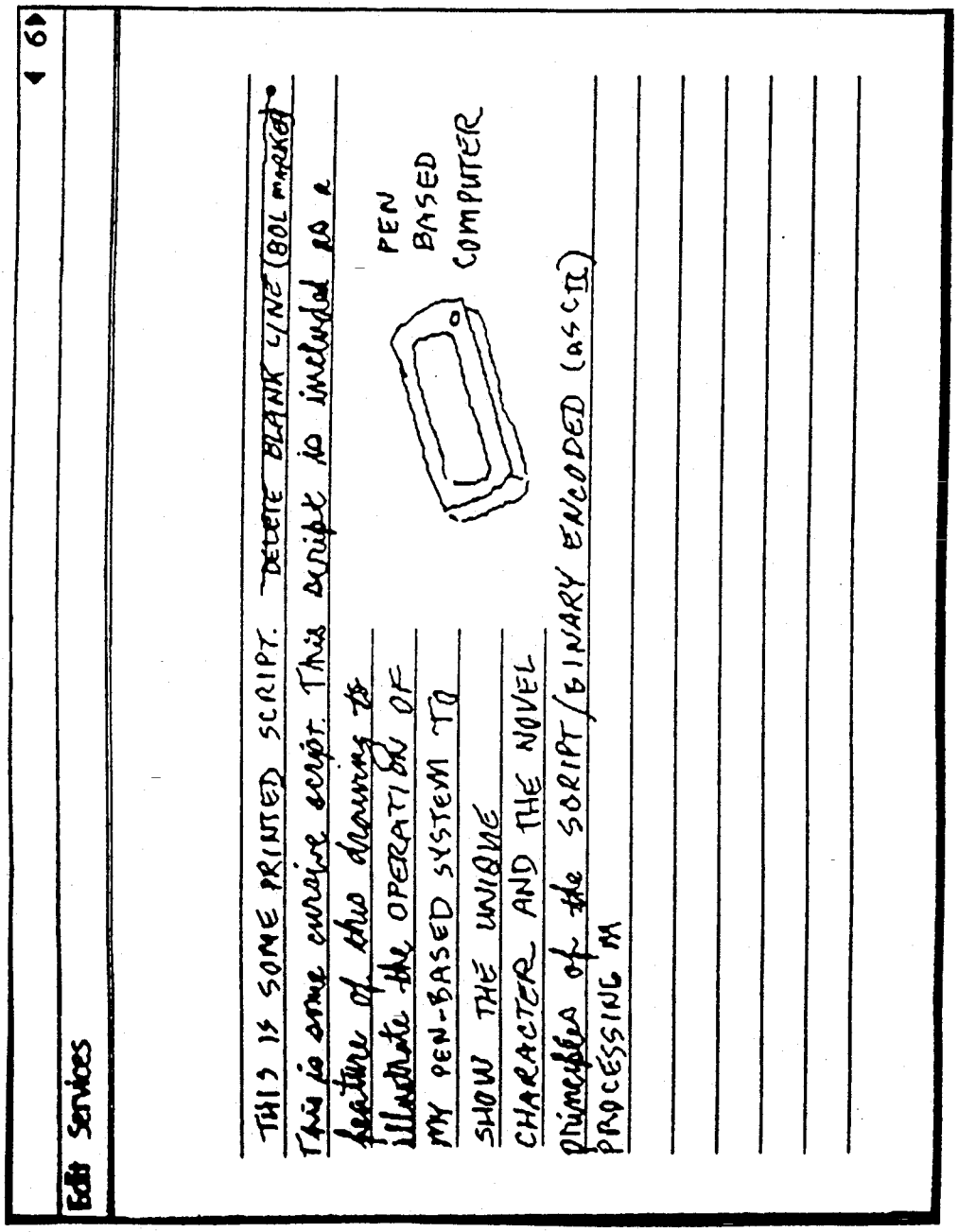
Figure 7P:
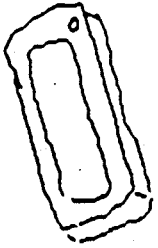

For example, a selection gesture can cause the selected line space and strokes/words to be highlighted in some way, such as by drawing a transitory line that follows the gesture as shown in FIG. 7D, or by inverse video or bolding the selected line space and script or text. With sufficient computing speed, the selected command function can be executed as the gesture is being made. For instance, a line insertion gesture could cause blank lines to be inserted and displayed as the user makes the gesture. This sort of feedback is highly desired by the user.

Following is a description of the preferred gesture set as shown in FIGS. 4A-4H and the control and edit functions for each gesture.

Insert Space Gesture 54 (FIG. 4A)

This gesture inserts (opens up) an amount of space on the gesture line equivalent to the length of the gesture stroke. Words pushed off the end of the line wrap to the next line.

Delete Space Gesture 56 (FIG. 4B)

This gesture deletes (collapse) space/strokes underneath the gesture stroke. Words from following lines may wrap back to the gesture line if it is permissible to remove words from the following lines (i.e., no intervening BOL marker). If this gesture follows all strokes on a line, words will be allowed to wrap back to the gesture line from the following line even if they previously were disabled from doing so by a Beginning of Line marker.

Insert Beginning of Line (BOL) Marker Gesture 58 (FIG. 4C)

All strokes (words) following this gesture are wrapped forward to the next line. No words from preceding lines will be allowed to wrap onto this "protected" line unless the Beginning of Line marker is removed. The number of markers inserted depends on the distance of the gesture stroke. Multiple BOL markers will appear to the user as blank lines.

Figure 4D:
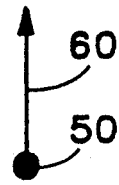

Delete Line Contents Gesture 60 (FIG. 4D)

This gesture deletes the text (ruled) area contents of each line touched by the gesture stroke.

Figure 4E:

Mark Block Gesture 62 (FIG. 4E)

Two separate gestures are required after the gesture prompt to mark a block of text. The first gesture marks the beginning/end of the block and the second gesture marks the end/beginning of the block. The mark block gesture line must stay within the confines of the ruled line lest it be recognized as an Insert BOL marker gesture. Ink dribbling, paging, scrolling, etc. can occur between the beginning and end mark gestures.

Figure 4F:
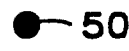

Insert/Collapse Moving Space Gesture (FIG. 4F)

The insert moving space gesture consists of lifting the pen out of contact with the digitizer surface without moving it laterally, after the gesture prompt. This gesture is used to open up an indefinite or moving amount of space within a line of script or text so the user can insert additional script or text. About 1.5 inches (6 cm.) of space will be opened immediately to the right of the pen down position initially upon recognition of the gesture. After the space opens, the user lowers the pen and begins writing. As the user writes, additional space will automatically be provided in order to accommodate continuing strokes. This method can be called "auto-insertion." Any words pushed off the end of the initial pen-down line by the auto-insertion will be wrapped to the following line. Repeating this gesture (i.e., prompt plus lift pen) collapses the moving space.

Note that actions resulting from the foregoing gestures, when located in the lined area of the document display, will in no way affect drawings in the unlined drawing areas surrounding or adjoining the gesture-modified text. The gesture set is context-sensitive, however, so that the same gesture can be used in the unlined areas to perform either different editing functions or similar functions only in the drawing area, i.e., without affecting contents of adjoining lined area.

Figure 7Q:
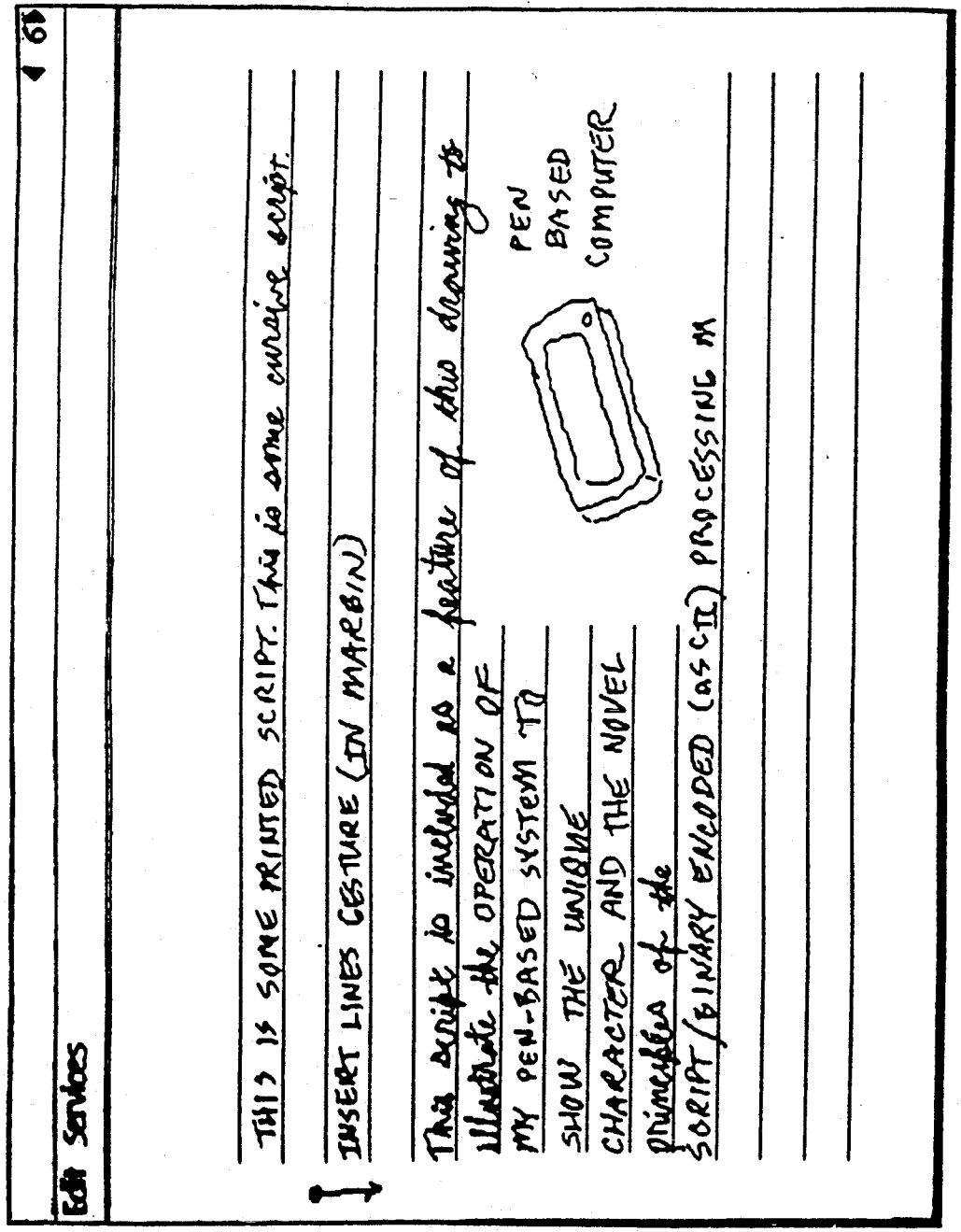
Figure 7R:
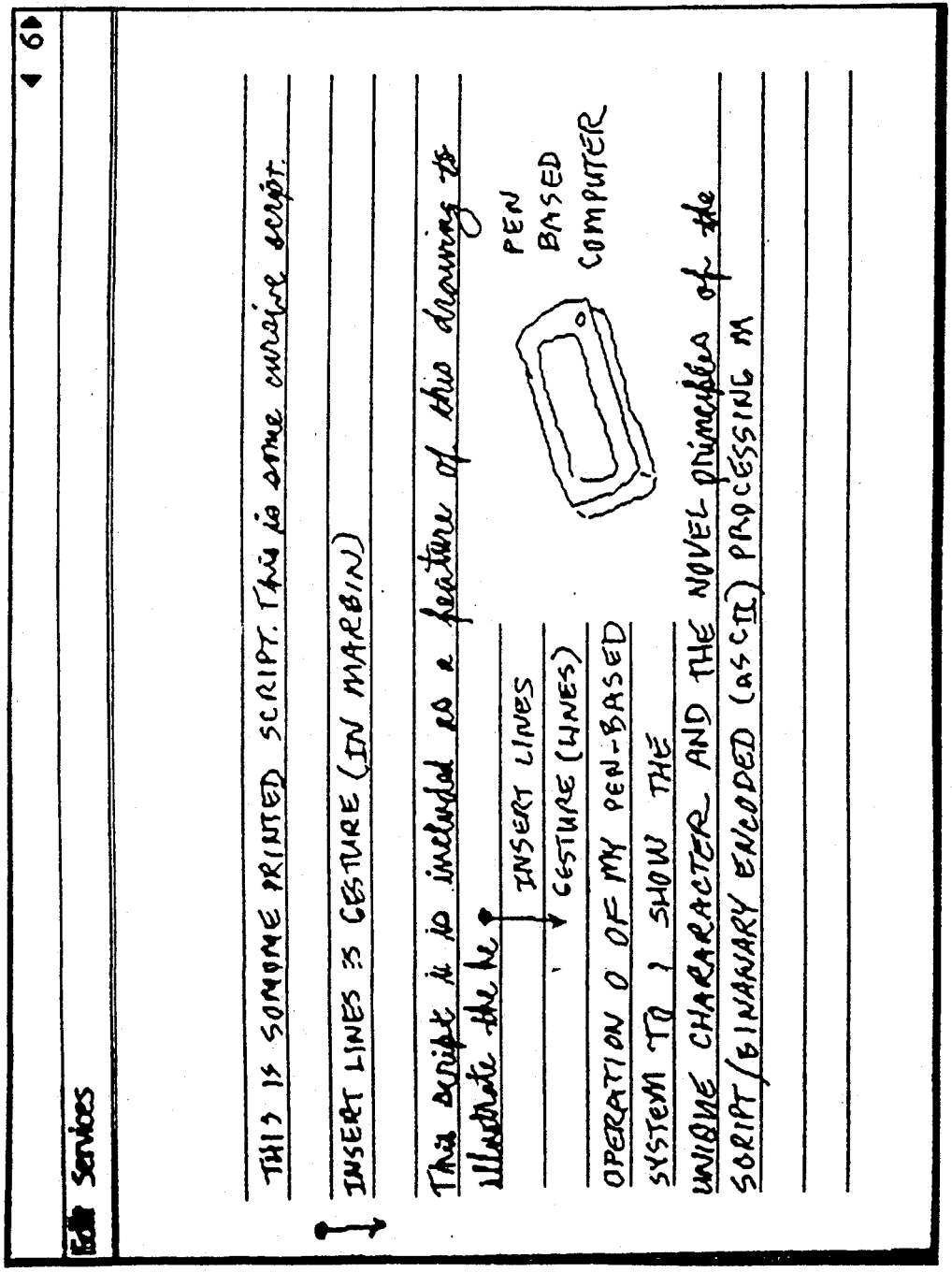

Line Insertion Gesture (see FIG. 7Q)

The Line Insertion Gesture is like the Insert BOL gesture 58 (FIG. 4C) but is located in the unlined margin alongside a line. A whole line (text area+drawing area) or multiple lines will be inserted in the lined area laterally adjoining the gesture location shifting all lines below it downward within the document. This will cause the last line on each affected document page to be shifted over the bottom and top margins (if any) to the first line of the next document page. The inserted line takes on the characteristics (ruled area margins, etc.) of the line/ruler that precedes it. Multiple lines can be inserted by extending the distance that the gesture covers.

Figure 7S:
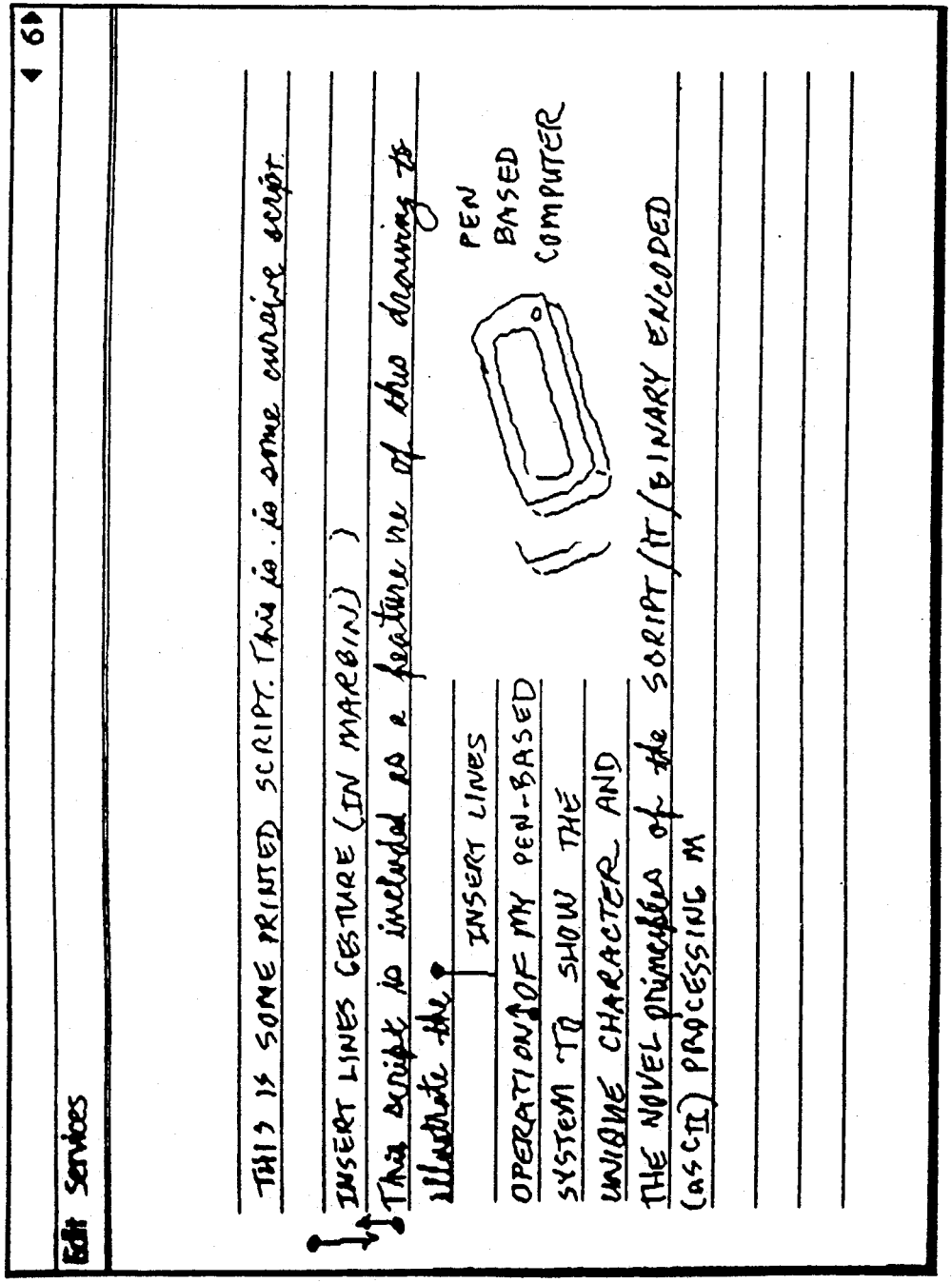

Line Deletion Gesture (see FIG. 7S)

This gesture is like gesture 60 (FIG. 4D) but performed in the margin. A whole line will be deleted from the document, shifting all lines below it upward within the document. This will cause the first line on each succeeding document page to be shifted up over the top and bottom margins (if any) to the last line on the preceding document page. Multiple lines can be deleted by extending the distance that the gesture stroke covers. This gesture can also be used to delete the contents of a top/bottom margin line, although the margin line itself will not be deleted. The gesture can be used to delete a ruler, causing the lines following the deleted ruler to be formatted according to the ruler preceding the deleted ruler.

Figure 4G:

Stretching Box Gesture 64 (FIG. 4G)

The Stretching Box Select gesture (which might also or alternatively be represented by an icon) selects all drawing area strokes touched/enclosed by the rectangular area. Cannot cross into text area.

Figure 4H:

Rope Select Gesture 66 (FIG. 4H)

The Rope Select gesture (might also be represented by icon) selects all drawing area strokes touched/enclosed by roped area.

Prompt-Specific Gesture Sets

Multiple unique gesture prompts allow for the classification of gestures. Each specific gesture motion can be associated with one or more prompts (pen actions). In FIG. 4I, two unique prompt images are shown, each with a set of gesture pen motions. Note that the first five gestures in each set is unique in function although the gestures are identical motions. The last three gestures in each set are similar in both motion and function.

Another interesting aspect of the gesture set shown in FIG. 4I is that, with the exception of Pen Up and Mark Block, all of the gesture motions can be recognized as specific gestures (given the context in which they are currently supported) even before the gesture is completed! This allows dynamic feedback to be provided to the user as the user performs the gesture (e.g., showing increasing amounts of whitespace and word wrapping as the user inserts space). The current implementation of the software waits for the user to complete gestures before acting upon them. Future versions will utilize multi-tasking to provide dynamic feedback that is highly responsive to the pen.

Selected Strokes

A variety of functions can be applied to selected strokes in text or drawing area. These functions are available through menu selection: delete, cut, copy, paste, highlight (bold, outline, etc.), translate (from script into ASCII), evaluate (math expressions), etc. In addition, selected strokes can be dragged by touching the pen to the selected strokes and dragging. Strokes can be selected by invoking the I-beam gesture prompt 52 (FIG. I) and dragging it through the stroke(s) to be selected.

Figure 8:
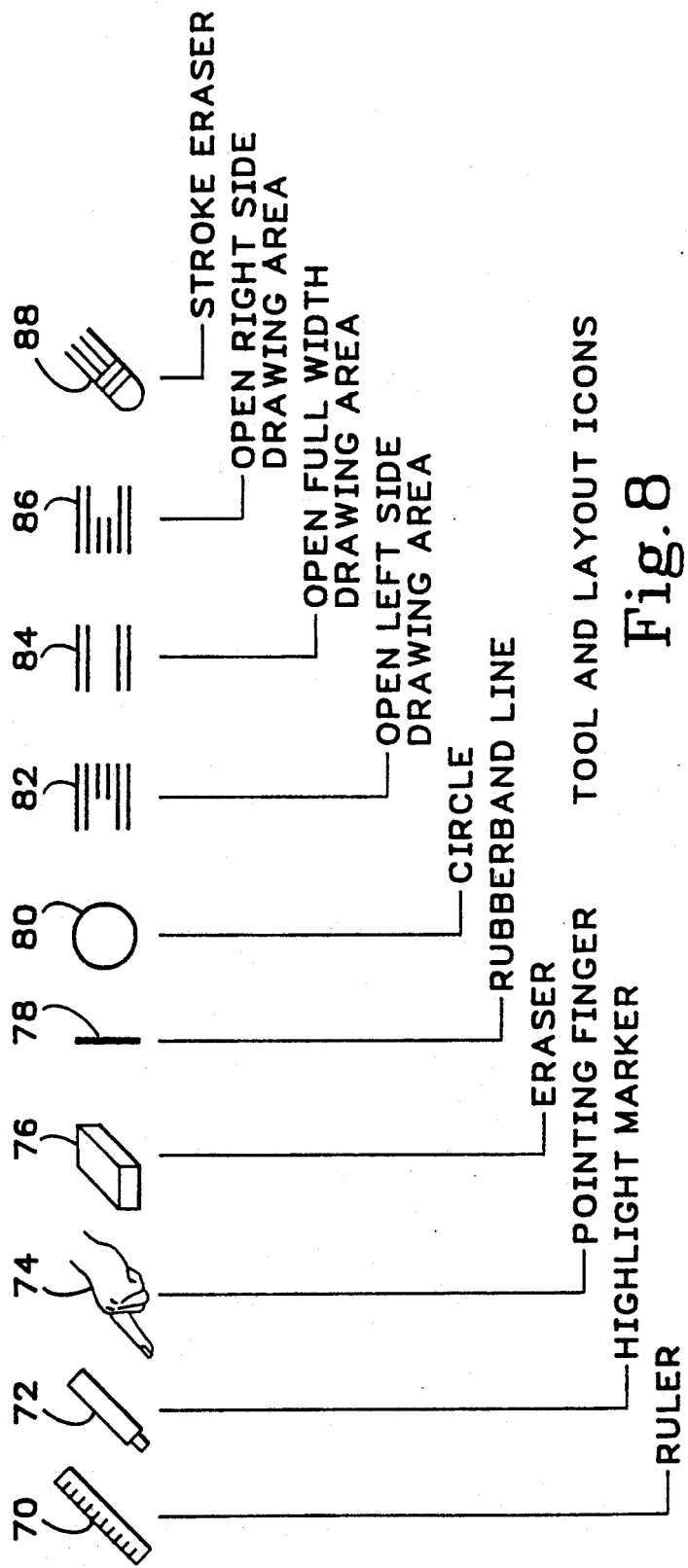
FIG. 8 is a preferred set of command icons and corresponding functions used in the present invention.

Additional editing tools can be provided and represented by suitable icons. All tools are picked up, used one or more times, and then returned to their original places. A preferred set of tools and examples of corresponding icons are shown in FIG. 8.

Ruler 70

The user picks up the ruler icon in order to insert a ruler. A ruler will be inserted at the pen down position within the document.

Highlight 72

The highlight marker is used to highlight strokes. The highlight remains on the strokes until it is explicitly removed by the user through repeat (inverse) highlighting or SELECT, choose new highlight. Multiple highlight markers or a single "multicolored" highlight marker may exist to accommodate different highlighting needs.

Pointing Finger 74

The pointing finger is used to select text. It can be used in place of the drag select gesture if desired. It is different from the drag select gesture in that it allows the user to select more than one piece of text.

Eraser 76

The eraser erases pixels within text or drawing areas without collapsing blank space. The eraser can come in different sizes to erase pixel swaths of different widths.

Rubberband Line 78

The rubberband line is provided so that the user can draw straight lines within the text or drawing area without the use of a template or straightedge.

Circle

The circle allows the user to draw variable sized circles within the text or drawing area without the use of a template.

Open Drawing Space Left 82, Full-Width 84 and Right 86

These icons are invoked to change line lengths to increase the available unlined drawing space in an adjoining margin, or to extend the drawing space all the way across the page.

Stroke Eraser 88

The stroke eraser will erase only the pixels of strokes, not affecting any ASCII text. This is quite useful when annotating documents that exist primarily in an ASCII text form.

Conversion of Strokes to Internal Stroke Format

Following is a description, with reference to FIGS. 6A–6D, of how strokes go from being input glyphs to residing within the software system as meaningful data in accordance with another aspect.

Figure 6A:
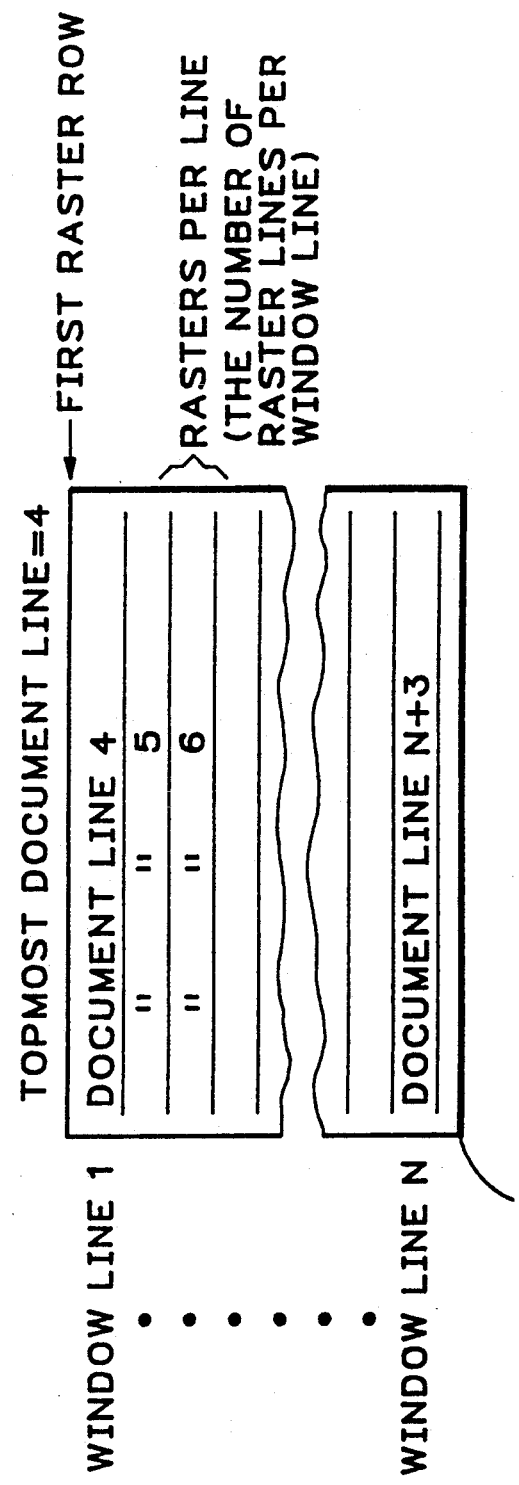

For simplicity, the following description assumes that lines are stored at screen (raster) resolution. As shown in FIG. 6A, the document exists in a window (a bit-mapped display area having its origin in the lower left corner) having a series of logical lines, the first line being numbered 1 and succeeding lines having increasing line numbers (through line N). The document is displayed with lower document line numbers (e.g., lines 4, 5, 6) appearing at the top of the window and document line numbers increasing as document lines are displayed toward the bottom of the window (e.g., line N+3). At any point in time the window represents a viewport onto a certain number of document lines. The exact location of the viewport onto the document is maintained by keeping track of the first (topmost) document line (e.g., line 4) that will be viewable in the window.

When a stroke is stored into the document, the document line into which the stroke will be rooted must be determined. The process requires a few steps:

The first step is to determine which window line the stroke belongs to. A number of methods exist for mapping a stroke to a certain window line (e.g., center of gravity) but because it works pretty well let us assume that a stroke belongs to the line in which the pen tip first touched the digitizer. The window line is then determined using the following equation:

$$WLN = ((FRR - PDYV)/RRPL) + 1$$

in which:
- WLN = Window Line Number;
- FRR = First Raster Row;
- PDYV = Pen Down Y Value; and
- RRPL = Raster Rows Per Line.

Now that the window line number has been determined, the document line that the stroke belongs to can be determined by the following equation:

$$DL = (TDL + WL) - 1$$

in which:
- DL = Document Line;
- TDL = Topmost Document Line; and
- WL = Window Line Once the document line is determined, the document line needs to be retrieved from the document line database.

With the document line in hand, the relative position of the stroke within the line must be determined. Due to the nature of the stroke compression method used to store strokes (it stores points within a stroke relative to the first point of the stroke), only the first point of a stroke needs to be assigned a position within the document line. The position will be relative to the line's left margin for the X-axis and relative to the bottom-most "raster" row owned by the document line for the Y-axis. This position can be identified by relative coordinates X' and Y'. The actual X and Y values used to anchor the stroke within a document line are determined using the following equations:

$X$: window $X$ coordinate for first point in stroke $Y$: window $Y$ coordinate for first point in stroke $X' = X - $ left margin window $X$ coordinate for the document line $Y' = Y - ((FRR + 1) - (WL*RPL))$ in which:
- FRR = First Raster Row;
- WL = Window Line; and
- RRPL = Raster Rows Per Line Now that the coordinates used to anchor a stroke within a document line have been determined, the next step is to compress the remaining points of the stroke. Any compression algorithm used must retain the point-to-point directional information inherent in strokes if those strokes are to be translated into ASCII text or used to characterize handwriting at some point in the future.

The basic assumption behind the processor compression algorithm is that strokes have momentum—a stroke is more likely to continue moving in a specific direction than it is likely to move in a dramatically different direction. This allows compression of a stroke by representing point increments within the stroke with predefined values that reveal any change in direction. For instance, the binary value 1 would mean: continue forward one point in the current direction. The binary value 00 would mean: move forward and to the left of the current direction by one point, causing the current direction to be redefined by the new direction. The binary value 01 would mean: move forward and to the right of the current direction by one point, causing the current direction to be redefined by the new direction. Visually it might look like FIG. 6B.

EXAMPLE 1

The arrows in FIG. 6B represent the current direction after the point at each arrow position has been encoded. The initial direction from starting point "x" is encoded per the binary values shown in FIG. 6C. The actual encoding of the circle shown would be a concatenation of the following binary directional data:

01011 Point count in stroke less 1 (Note: This is the

-continued

| | |
|---|---|
| | binary length of the stroke; it can be up to, e.g., 32 data points) |
| 000 | Direction from starting point "x" to point 2 (Note: the starting point is recorded as an X-Y coordinate. This is the "root" point of the stroke. This direction is the current direction at point 2.) |
| 01 | Direction change needed to get to point 3 (Note: 01 shows a change to the right; 00 would be to left.) |
| 1 | Continue in current direction to get to point 4 |
| 01 | Direction change needed to get to point 5 |
| 01 | Direction change needed to get to point 6 |
| | Continue in current direction to get to point 7 |
| 01 | Direction change needed to get to point 8 |
| 01 | Direction change needed to get to point 9 |
| 1 | Continue in current direction to get to point 10 |
| 01 | Direction change needed to get to point 11 |
| 01 | Direction change needed to get to point 12 |
| 25 bits | |

This algorithm requires that all points in a stroke be adjacent. There can be no gaps or adjacent points having the same coordinates (duplicate points). In order to assure that there are no gaps, a line drawing algorithm is employed to fill any gaps in a stroke (typically due to moving the pen too fast) with a straight line before any attempt is made to compress the stroke. To remove duplicate points, which typically result from digitizing at high resolution and translating to a lower resolution, any duplicate points exceeding one are discarded at each position.

In order for this type of compression to be most efficient, the digitized strokes need to be smoothed. For instance, extraneous points, which result from digitizing at high resolution and translating to a lower resolution, need to be removed before the compression algorithm is applied. These extraneous points can be detected by searching through each stroke for formations that give the appearance of an "L" (two lines meeting at right angles. This search uses the matrix shown in FIG. 6D.

An "L" formation in FIG. 6D would be any series of points that fall into a 1, 2, 3 sequence. As a stroke is compressed, each point of the stroke (actually each point that is retained after the "L" formation lookahead) takes its turn in the "1" position. If the following 2 points make an "L" formation, then one of them must be discarded. The point to be discarded is determined by examining the position of a 3rd point following the point in the "1" position. This third point is not shown in FIG. 6D but could appear anywhere within the matrix (except in the "3" position because duplicate points have been removed) or a surrounding ring of points around the matrix. Of the points in the "2" and "3" positions, the one farthest from the third point (i.e., the point requiring the largest change in X and Y coordinate values to reach the third point) is discarded.

The compression algorithm as described requires that strokes exceeding 32 points (only 5 bits in point count) be broken into a series of "ministrokes." It also requires strokes having too radical a change of direction for direction change encoding to be broken into ministrokes, as in the case of a script "M." The resulting ministrokes are compression encoded as described above. Alternatively (or also), the stroke length could be set at 64 points (6 bits) or more for higher resolution digitizers. These encoded ministrokes are then concatenated to form the whole stroke, the last point of each ministroke being the 'start point' of a succeeding ministroke.

A variation on this stroke compression method allows for compression of strokes having less momentum (i.e., many closely spaced direction changes). An expanded set of encoding values is employed:

EXAMPLE 2

| | |
|---|---|
| 1: | Move forward one point in the current direction |
| 000: | Move 1 point counterclockwise from the current direction and forward. The new direction becomes the current direction. |
| 001: | Move 2 points counterclockwise from the current direction and forward. The new direction becomes the current direction. |
| 010: | Move 1 point clockwise from the current direction and forward. The new direction become the current direction. |
| 011: | Move 2 points clockwise from the current direction and forward. The new direction becomes the current direction. |

After bridging gaps within a stroke, removing duplicate points and discarding extraneous "L" pattern points, the circle used in the first compression example would be compressed and encoded as follows:

| | |
|---|---|
| 01011 | Point count in stroke less 1 |
| 000 | Direction from starting point to point 2 |
| 010 | Change direction to right to get to point 3 |
| 1 | Continue in current direction to find point 4 |
| 010 | Change direction to right and down to get to point 5 |
| 010 | Change direction to down to get to point 6 |
| 1 | Continue in current direction to get to point 7 |
| 010 | Change direction left and down to get to point 8 |
| 010 | Change direction to left to get to point 9 |
| 1 | Continue in current direction to point 10 |
| 010 | Change direction to up and left to get to point 11 |
| 010 | Change direction to up to get to point 12 |
| 32 bits | |

As can be seen, the first compression method compresses the example stroke much more than the second compression method. This will not always be the case. Certain strokes will be compressed more using the second method rather than the first, for instance a stroke that varies more widely in direction than the example stroke. The point is that the program can analyze the stroke characteristics before applying a certain compression method to the entire stroke or a ministroke constituting a portion of the entire stroke.

What have been described are single pass methods for compressing strokes. A second compression pass can be applied to the compressed strokes, thus obtaining greater compression at the cost of additional compute time. In the examples shown, the repeating patterns of directional change can be compressed, using any of a variety of known pattern compression techniques. The program would determine whether any additional compression passes would be warranted.

Returning to the original task of describing how strokes are processed and stored in the software system, let us review what has been covered:

Mapping a stroke on the screen to a document line;
Determining the line relative coordinates of the stroke within the document line; and
Compressing the stroke.

What remains is a description of the approach used to store strokes within the document line data structure.

A document line consists of two distinct writing areas—the lined area and the unlined or margin areas. Within the margin areas, word wrapping is not supported; as such, strokes need merely be appended to a growing list of strokes associated with the document line. That is, the strokes are ordered by time.

Strokes within the lined area are stored differently due to the word wrapping nature of the lined area. See the discussion below on *Break Point Gap Analysis: The Leftmost Positioning Method* for details of the stroke ordering and storage.

Representation of ASCII Characters in a Format Compatible with Strokes

Binary encoded characters (e.g. ASCII characters) by definition are graphically defined elsewhere. There is no need for the processor to duplicate this information by storing it in a compressed stroke or bitmap format within the data structures comprising a line. The pieces of information that the processor needs in order for it to represent ASCII characters in a format compatible with strokes are:

The ASCII character code;
The position of the ASCII character within the document window;
Font and point size information.

The position of the ASCII character is determined by the processor using standard text spacing algorithms for downloaded ASCII text. For ASCII text that resulted from the translation of script, the processor replaces the script with ASCII text as the translation takes place. This typically results in a shrinkage of the script since the ASCII text characters will usually be smaller than the script characters and the user normally requests that consistent and standard spacing exist between characters within a word and between words within a sentence.

The position of the ASCII character, its font, and its point size are used to determine the character's starting point (origin), left-most point, and right-most point positions relative to the lined area beginning point along the left margin. This is the same sort of information that is maintained for strokes, ASCII characters, and bit-mapped images Because strokes are ordered by left-most point position, ASCII characters can be interleaved with strokes within the processor data structures, allowing for the consistent application of editing functions to the mixed data types. The processor must be aware of the distinction between data types is when it must display the data. The stroke visual data will be derived from the compressed strokes and the ASCII character image will be extracted from a table addressed by ASCII character code.

Figure 9:
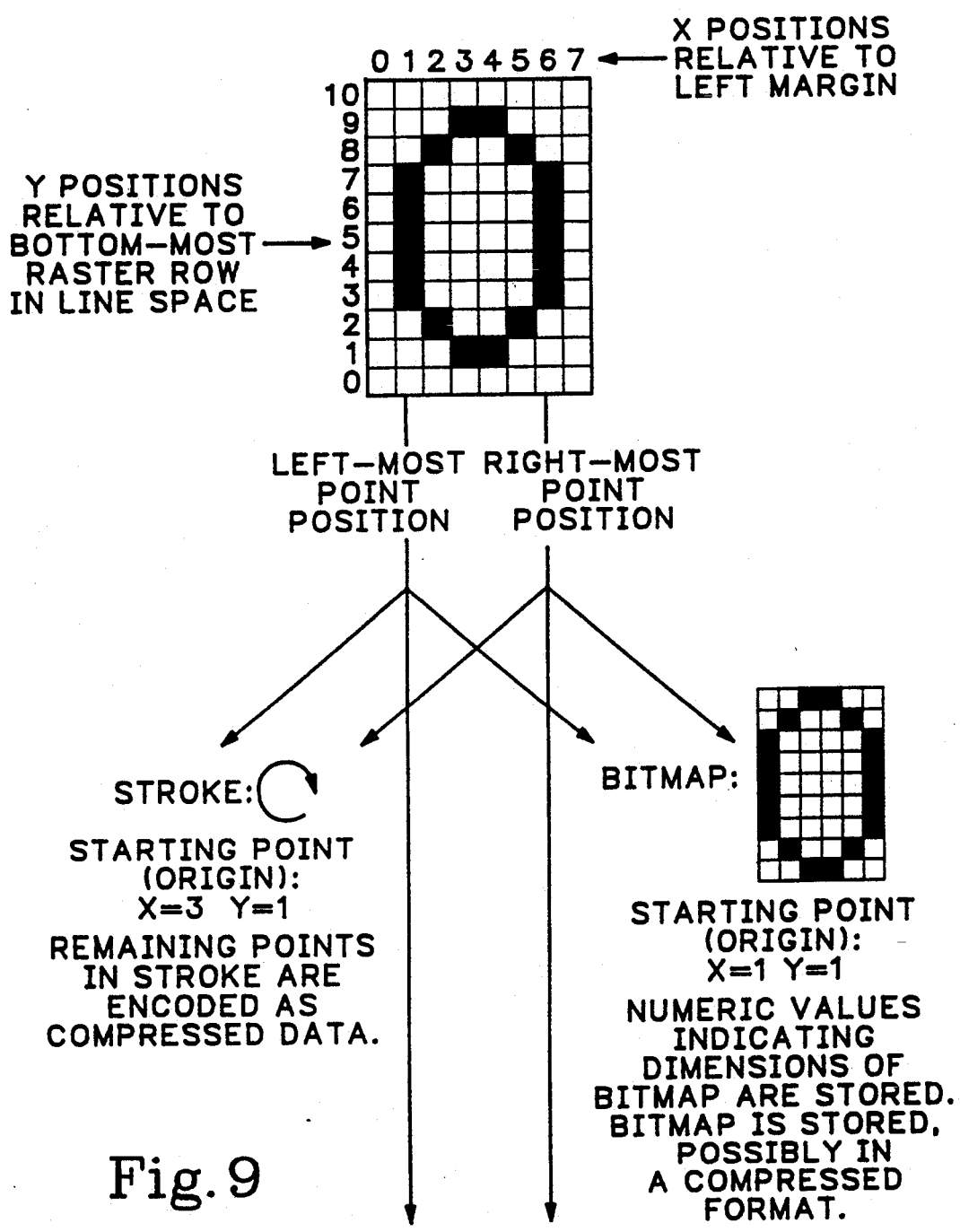
FIG. 9 is a diagram of a method for encoding script and ASCII text in internal document format according to the invention.
Figure 11A:
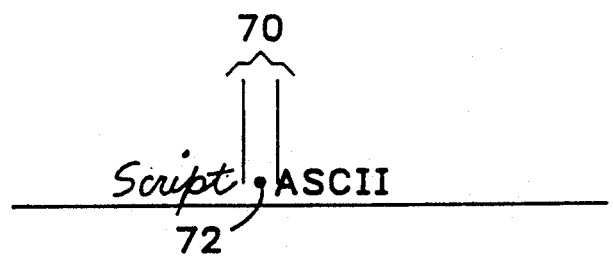
FIG. 11A-11E are diagrams illustrating the opening, use, and closing of moving space.
Figure 11B:
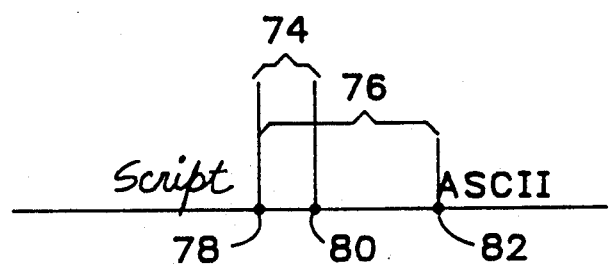
Figure 11C:
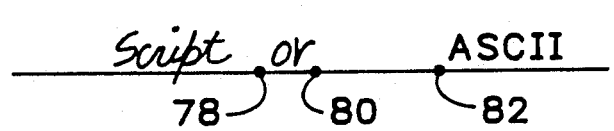
Figure 11D:
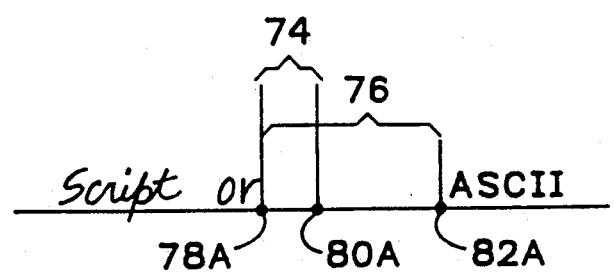
Figure 11E:
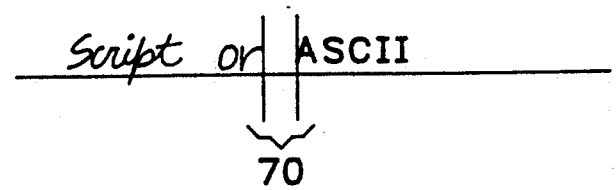

FIG. 9 shows that an "o" could exist in a pen-based system according to the invention as a stroke, an ASCII character, or a bitmap. At the simplest level, data within the system exists as a series of glyphs, each having a starting point (origin), a left-most point position, and a right-most point position. The starting point (origin) is used to position the glyph within the line space. Since the left-most and right-most point positions are encoded relative to the starting point position, they are automatically moved whenever the starting point position is moved, i.e., the stroke/character is shifted left/right. The left-most and right-most point positions are used to determine the breakpoints within a line (the word boundaries) as described above. The only time that the processor is (and needs to be) aware of the specific type of glyph (stroke, ASCII, or bitmap) is when it stores the glyph, when it determines word boundaries, and when it displays the glyph. At these times, glyph-specific data is required. Note in FIG. 9 that the starting point is not really glyph-specific even though it varies with glyph type. It still represents the anchor position for all glyphs and among all glyph types it is the point that moves.

In FIG. 9, all glyph types have the same left-most and right-most point positions (1 and 6 respectively). For purposes of determining word boundaries and word wrapping, these are the important variables.

Break Point Gap Analysis: The Left-most Positioning Method

In both hand printed and typed (or computer processed) documents, words are separated by a larger amount of space than that which separates characters within a word. The larger amount of spacing between words is the basis on which the invention determines word breaks, and accordingly, word wrap.

The invention employs a novel method for determining stroke-character word breaks. This method is referred to as the Left-most Positioning Method (LPM). LPM orders stroke images within a given line according to their left-most point position. Once a text line has been detected, LPM relies exclusively on a single axis for acquiring stroke positioning data. Therefore, strokes are ordered left to right in a stroke database. The time order of strokes entered can be maintained by time-stamping the strokes.

The Break Point Gap (BPG) value is predetermined at the outset of stroke position data capture. The BPG is calculated as a predetermined two dimensional area of points (a parallelogram such as a rectangle). For highly slanted text, a user-modifiable angle for the parallelogram can be determined from the user's writing.

As stroke data is captured, LPM relies on the BPG value for determining a word break. LPM performs a comparison between the (white space) value of the space between the right-most point position of the preceding stroke data, and the left-most point position of the current stroke data, with the BPG value. If the white space value is greater than or equal to the BPG value, then the LPM has detected a word break. Accordingly, LPM inserts a break point marker B (see FIG. 5B) at a location adjacent to the left-most point of the current stroke data.

Word Wrapping: Employing the Break Point Marker

Word wrapping is the process of filling lines of text/-script and moving text that overflows the line space contents automatically to the succeeding line space. Word wrap is not mandatory until a text/script manipulation event occurs. When the system detects a text/-script manipulation event, then word wrapping is invoked.

The word wrapping detection method involves "reflowing" the text/script across line breaks. This is preferably done by comparing locations of break point markers (B in FIG. 5) with line delimiters (beginning and ending points 36, 38). If a stroke is detected as crossing the address of a line delimiter (or margin boundary), a word wrap is required. To wrap, the system parses backward searching for the last break point marker. Upon finding said marker, the system moves all text immediately following the marker to the succeeding line, and recursively applies the check for a margin boundary violation and again wraps the text/script until all text/script has been reflowed within the lines such that no strokes violate a margin boundary.

An alternative implementation would function as follows: Stroke data would continue to be added to the database, while the system compares the amount of data captured with the amount of line space allocated. As soon as stroke data is captured which, if placed on the current line, would exceed the margin boundary, a word wrap would be required. The actual wrapping would be triggered by some event or action that indicated the user had finished writing on the line. To wrap, the system would employ the recursive process described above.

WrapGap Analysis: The WrapGap Monitoring Method

Another of the many problems addressed by the invention involves maintenance of designated space between words. When editing script text, a means is required for adding and/or deleting white space to accommodate additional stroke data (more handscribed text).

To facilitate managing the white space between words, a variable called WrapGap is maintained that records the amount of white space between the left-most point of the first stroke of a word on a line and the right-most point of all strokes composing words on the preceding line, whenever the current line is viewed as an extension of the preceding line (i.e., no intervening BOL). By default, each line is assigned a WrapGap value that is equal to the BPG value. When word wrapping forward occurs, the WrapGap value shown graphically in FIG. 5B indicates the amount of space that must exist between the right-most point of the first word wrapping to a line and the left-most point of the first word currently on that line. The WrapGap must then be changed to reflect the spacing between the left-most point of the left-most wrapped word on a line and the right-most point of its former neighboring word on the preceding line. When the user deletes space or strokes, causing words to wrap backwards, the Wrap-Gap value indicates the amount of space that must exist between the right-most point of the last word on the line where words will be wrapped back to and the left-most point of the first word that will wrap back to that line. The WrapGap must then be changed to reflect the amount of space between the right-most point of the last word wrapped back to a line, and the left-most point of the newly positioned first word on the succeeding line (where the words wrapped from originally).

Another common case in which this feature is apparent is when changing line lengths (side margin widths). This case is shown in FIG. 5B, in which a line of script is shortened in successive steps and then returned to its original length. There are two additional cases where the WrapGap value can be modified.

Whenever a word wraps, a new WrapGap value for the line is computed. In the first case, a word may wrap because a significant amount of space is allocated preceding the word. Subsequently, a new word may be added on the preceding line within the previously allocated white space. Therefore, the actual (desired) space or gap between the word beginning on the subsequent line and the word on the preceding line, has changed. This value is no longer the original value allocated between the last right-most point position of a preceding word and the left-most point position of the wrapped word. Rather, it should now be the value between the right-most point position of the added word and the left-most point position of the wrapped word. In this way, if a margin is subsequently increased, and/or some other editing function forces the wrapped word to return to the preceding line, or the added word to wrap onto the subsequent line, the actual space between the added word and the originally wrapped word will be properly maintained because the WrapGap value has been updated to reflect the modification. The user will have the option of disabling this WrapGap adjustment feature.

Another case for WrapGap value modification occurs when the user employs a "delete-space" gesture (refer to the discussion on "Gesture-Based Editing" below) following all strokes on a line space. With this gesture, the user causes words from the next line space to wrap back to the current line space. If there is a "Beginning of Line" (BOL) marker on the next line space, it will be removed. The system then determines whether the space consumed by the first word on the next line plus the break point gap (BPG) value represents an amount of space less than or equal to the open space available at the end of the line where the gesture was made. If so, then the system detects that at least one word can be wrapped-back and, therefore, proceeds to reduce the WrapGap for that word only enough (if at all) to ensure that such word will wrap backwards (e.g., return to the preceding line space.)

A variation on this method would use the pen-up X-coordinate position of the Delete-Space gesture as the target position (or location) to which the left-most point of the first wrapped-back word should be "anchored." In such case, the WrapGap value for the first word to be wrapped back could be ignored. Only the space consumed by the strokes at the first word would be considered in determining whether the word can be wrapped back. If the word will fit within the space existing between the pen-up location and the right margin, the WrapGap value for the first word effectively becomes equivalent to the space existing between the right-most point of all strokes on the wrap-back line and the pen-up location.

EXAMPLE 3

FIGS. 7A through 7U show a series of screen displays for an operative example of the invention as implemented in a computer system arranged as in FIG. 1 with a stylus and contact and proximity-sensitive digitizer as the graphics input device. The document display is shown on a conventional graphics CRT monitor and the computer is a conventional Intel 386-based personal computer. The following figures show a basic subset of the operations that can be performed on a document display in accordance with the invention. This example shows the interactive manipulation of printed script, cursive script and small sketches within the lined area of the document display, and of drawings and script within the unlined or drawing areas and margins of the display. Although not shown in this example, ASCII text placed in the lined area will be handled and will behave during manipulation in essentially the same manner as script, and can be considered as represented in this example by the printed script.

FIG. 7A is a view of an initial screen display in which printed and cursive script have been manually entered by writing on the digitizer with a stylus. The document display 30 itself includes a top display margin, bounded by a pair of closely-spaced lines, containing title and command or menu lines. All actions in these areas are treated as commands and do not result in the entry of script. Besides, or instead of menu titles "edit" and "services," the command line can include icons (not shown). Below the double line is the display document itself, which is organized in pages.

As shown in FIG. 7 and 7A, the default structure of each page of the display has a series of parallel horizontal lines 34, each having vertically aligned beginning points 36 and end points 38. The lines themselves each define line spaces 39 of equal vertical width. The beginning and end points of the lines are spaced inward from the sides of the display to define the lengths of the lines (which can be varied) and width of left and right margins 40, 42 (which are likewise variable). The first line is spaced three line spaces below the top of the document display space defined by the double line. The spacing of the first line below the double line is sufficient to provide a single line space above the first line into which script or text can be entered and two additional linespace widths to serve as a top margin 44. A bottom margin 46 having a width of two line spaces is also provided. The top and bottom margins 44, 46 are treated as unlined space in the same manner as the left and right margins 40, 42. The top, bottom and left and right margins define an unlined drawing area which surrounds the lined script area. The margin areas can be slightly shaded to help distinguish them from the script lines.

Referring to FIG. 7B, the "insert space" gesture command has been performed in the first line of the script, immediately after the printed script. This was done by placing the cursor between the printed script and the first word of the cursive script, holding the stylus momentarily in one place in contact with the digitizer surface; then moving the stylus tip rightward to an end point spaced inward from the ending point of the line, and lifting the stylus. This action has opened a length of line space defined by the length of the gesture in the first line. The computer document display has also responded to this action by pushing the script to the right of the insert point of the gesture toward the right in the first line, wrapping down into the second line and rightward in each successive line. After completion and execution of the insert space gesture, the user drew/wrote a large dot with a rightward-directed arrow, followed by the words "Insert Space Gesture" in printed script, into the space that had been opened by the gesture.

FIG. 7C shows editing of the text inserted in FIG. 7B. This is done by performing a "delete space" gesture, commencing after the word "insert" in FIG. 7B and extending leftward to the beginning of the arrow shown in FIG. 7B. This was followed by an "insert space" gesture to reopen space that the "delete space" gesture consumed. Then, a leftward-directed arrow was drawn in place of the rightward-directed arrow and the word "delete" was written where "insert" previously appeared.

Operation of the delete space gesture is further illustrated in FIG. 7D. When this gesture, or any gesture is performed, placing and momentarily holding the stylus in place on the digitizer causes the display to show a filled circle at the pen down location (after "gesture" in line 1). The filled circle serves as a "gesture prompt" to provide feedback to the user that the input device is now operative in the gesture mode. As soon as this gesture prompt is displayed, the user then drags the stylus leftward along the line space to be closed. The version of software operated in the present example actually draws a line through the space to be closed (and across the text to be deleted). This illustrates the principle of the two-part gesture prompt/gesture command structure, but display of the gesture is not essential. Alternatively, the command can be executed as the gesture is being made, as soon as the gesture's direction is determined. After executing the delete space gesture, the system closed the line space between the gesture prompt and the end point of the gesture, obliterating the text contained in the line space between such points. A variation on the Delete Space gesture has the strokes following the gesture on the line (if any) being left-justified at the pen up position for the gesture. Another variation has the strokes following the gesture on the line (if any) being left-justified at the left-most point position of any deleted strokes (i.e., the following strokes take the place of the deleted strokes). These variations enable easy maintenance of word spacing.

FIG. 7E shows the operation of the "insert BOL marker" gesture and its corresponding editing function. This editing gesture and function was performed after the word "script" in line 1. It has the effect of adding a beginning of line (BOL) marker at the insert location, that is, at the location where a gesture prompt appears upon commencement of the gesture, and then moving the affected text to the beginning (left margin) of the next line. Actually, all text on the line following the gesture prompt position is wrapped forward to the next line, that line then being prefixed with a beginning of line (BOL) marker. As the user continues to move the stylus downward across additional lines, the affected text moves with the stylus, leaving BOL-marked blank lines to fill the gap created by moving the text downward within the document. This can be seen by comparing FIGS. 7D and 7E.

FIG. 7F shows the same line, after doing a sketch of the gesture and a brief description of the gesture's function.

FIG. 7G illustrates what will be done to close the added line. As the edited display of FIG. 7G states, the user executes a delete line contents gesture by placing the stylus on the point of the digitizer corresponding to a point on the second line of the display and, after receiving the gesture prompt, moves the stylus upward toward the first line.

FIG. 7H shows the screen display after execution of the delete line contents function. The third line of script is moved up into the second line, obliterating the script contents of the second line, and is followed by an upward shift of the contents of each subsequent line space. This editing function can be used on multiple lines of text.

As mentioned above, the document display preferably includes multiple pages. The pages are not isolated from one another, however, but permit script to be moved freely back and forth across page break boundaries. This is shown in FIG. 7I. To illustrate the point, the previously-entered script has been shifted downward (using the insert blank line function) to the bottom of the first page. Then, an insert moving space gesture was carried out in the third line of script immediately preceding the word "principles" to cause the last few words of script to word wrap off the end of the last line of the first page. In word wrapping, these words were pushed over the bottom margin, page break and top margin onto the first line of page 2 of the document display.

FIG. 7J shows the effect of entering additional script commencing at the point of the insert moving space gesture in the third line of script on page 1. The user has entered additional printed script, much as one would do in editing a document. Rather than filling a space of fixed length, however, using the insert moving space function causes space continually to be added to the lines ahead of the user's entry of script. Thus, the user has entered nearly two lines of script, extending over the page break onto the first line of page 2. Note that a length of open line space remains immediately preceding the word "principles," which space is the moving space defined by this function. Thus, the moving space as well as the text downstream from it is wrapped not only around ends of lines but across page breaks and margins. In doing so, the contents of the margins (none shown) are unaffected.

FIG. 7K shows closure or collapsing of the moving space, accomplished in the current implementation by attempting any gesture, including another insert moving space gesture.

When a moving space is collapsed, the spacing between the left-most point of the strokes following the moving space and the right-most point of the added strokes will be the space that existed between the initial strokes that were separated by the moving space. This means that if the space is opened within a word the open moving space will be collapsed to a smaller whitespace gap than if the space had been opened between words.

A variation on the moving space concept has the moving space sensitive to proximity. After moving space has been opened with the Insert Moving Space gesture, the moving space would collapse on pen-out-of-proximity and reopen on pen-in-proximity. This would allow the user to make multiple edits using moving space without having to explicitly open and close the moving space. When the moving space reopens, the position of the moving space within the text would reflect the position of the stylus in proximity. In this way the user could move the stylus around to preview various insert positions within words or lines. When pen down occurs, the moving space would shift according to the user's entered strokes. The Collapse Moving Space gesture (same as Insert Moving Space gesture) would end this process.

Another variation on the moving space gesture has the action of moving the pen to a vertical orientation causing a Moving Space Gesture prompt. The prompt would be an open space that would move with the pen (pen-in-proximity but not touching) as the user previewed moving space insertion positions within text. (The user need not hold the pen vertical once the prompt appears.) Pen-down would be the gesture that actually created a moving space. Until pen-down, insert positions would be previewed at varying degrees of resolution. Fast pen movement would preview insert positions between words and slow pen movement (over words) would preview insert positions within words. Returning the pen to the vertical position (after having been not vertical) would cause the moving space to be collapsed. If the pen tip had not been within (over) the moving space when the pen was positioned vertically then a new moving space would preview at the pen position.

As mentioned above, drawings can also be included in unlined areas of the document display and are not affected by editing functions performed on the contents of the lined area. To illustrate this point, FIG. 7L shows the previously-entered script moved back to the top of page 1. The "services" menu item has been invoked, followed by selection of the "insert ruler" command. FIG. 7L shows use of this command to cause two rulers to be drawn across the document display at about mid-screen. The rulers are shown as black horizontal bands across the document display. The final version of the product will have rulers containing graphics depicting the current margin settings. The top ruler is always present (although it may be hidden) and contains margin settings which can be set by the user wider or narrower than the default margins. The lower two rulers are placed by the user at locations designated by contacting the stylus to the digitizer at user-selected points.

Next, referring to FIG. 7M, using the stylus, the user selects a new line length within the area defined vertically between the lower two rulers. In the present software version, the user affirmatively selects the line length by drawing a gesture on the ruler from the left or beginning point of the line to a desired end point of the line. This procedure could be reversed, to define the margin or drawing area width between the rulers. Alternatively, an icon representative of this function could be provided which the user selects and simply draws a line vertically from top to bottom at a desired location along the lines to define the height and width of the lined space (or conversely the unlined space). This approach would automatically insert and position rulers where the user starts and stops the vertical line.

Reinvoking the "services" menu and selecting "hide rulers," leaves the document display of FIG. 7N. To illustrate subsequent points, the user has drawn a diagram of a pen-based computer in the unlined drawing area and has labeled the diagram "pen-based computer."

FIG. 7O shows the document display of FIG. 7N as the user makes a delete space gesture across some of the script in the second line of the display.

FIG. 7P shows the display after execution of the delete space function. This causes the contents of subsequent lines to word wrap or reflow upward to fill in the space occupied by the deleted line space contents. Note that reflow of the line contents has no effect at all on the drawing and script labeling within the unlined drawing area. As mentioned above, the gesture commands are context sensitive, dependent on where they are located, and will cause different things to happen if located in the unlined area than if located in the lined area.

FIG. 7Q shows an "insert lines" gesture performed in the left margin, and its effect which was to add three lines following line 2 of the document of FIG. 7P. Comparing FIG. 7Q with FIG. 7P, it should be noted that this command actually added more lines between the previously existing lines, rather than merely shifting the contents of lines 3, 4 and 5 downward. The result of this function was to shift the contents of both the lined area and unlined area below line 2 downward as a unit.

FIG. 7R contrasts the two functions performed by the insert lines gesture dependent upon where such gesture is performed. In FIG. 7R, the user has performed the insert lines (actually "insert BOL marker") gesture within the script in one of the lines alongside the drawing. The function corresponding to this gesture command is, as described above, to push the line space contents downstream of the pen down location of the gesture onto subsequent lines without moving or otherwise affecting the drawing. Note also that, during word wrapping, the software compares the length of words to the amount of space available in each line to determine whether there is sufficient space for the word. Thus, the word "character" in FIG. 7Q was too long to fit on the preceding line containing the word "unique." Similarly, in FIG. 7R, the word "unique" was too long to fit in the remaining space of the preceding line.

FIG. 7S shows the context sensitive nature of the delete lines gesture. This gesture was performed in both the lined area on the line preceding the word "operation" as indicated by the sketched arrow at that location, and in the unlined left margin at the location indicated by the upward-directed arrow in the margin. The delete lines gesture performed in the lined area shifted the script contents upward by one line, obliterating the words "gesture (lines)" and the downstream script or line contents reflowed upward to fill in the space left by the obliterated line contents. The delete lines gesture performed in the margin shifted all of the lines and the unlined drawing area upward by one line without any reflow of the document. If there had been any contents in the deleted line, these would have been deleted.

Figure 7T:
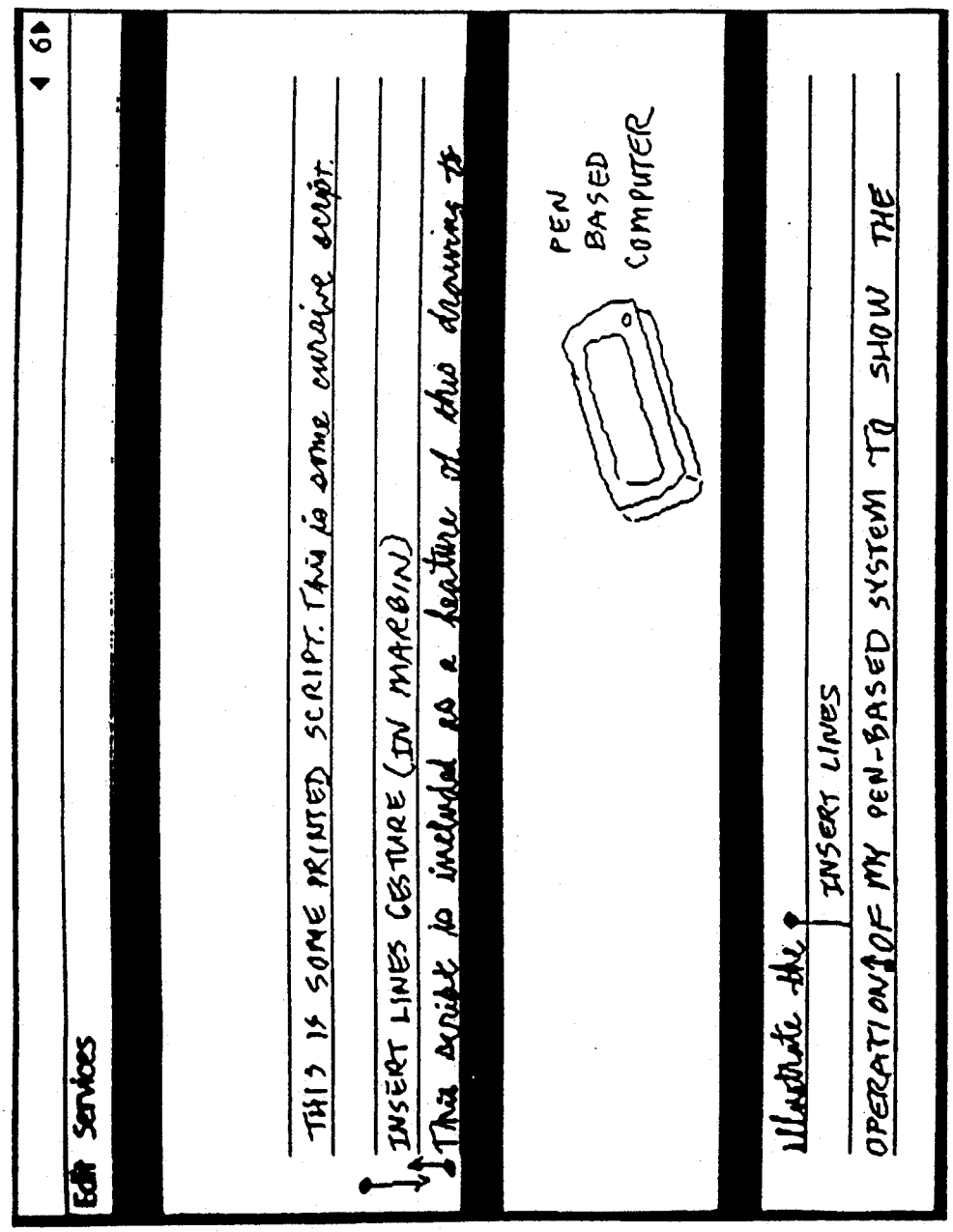
Figure 7U:
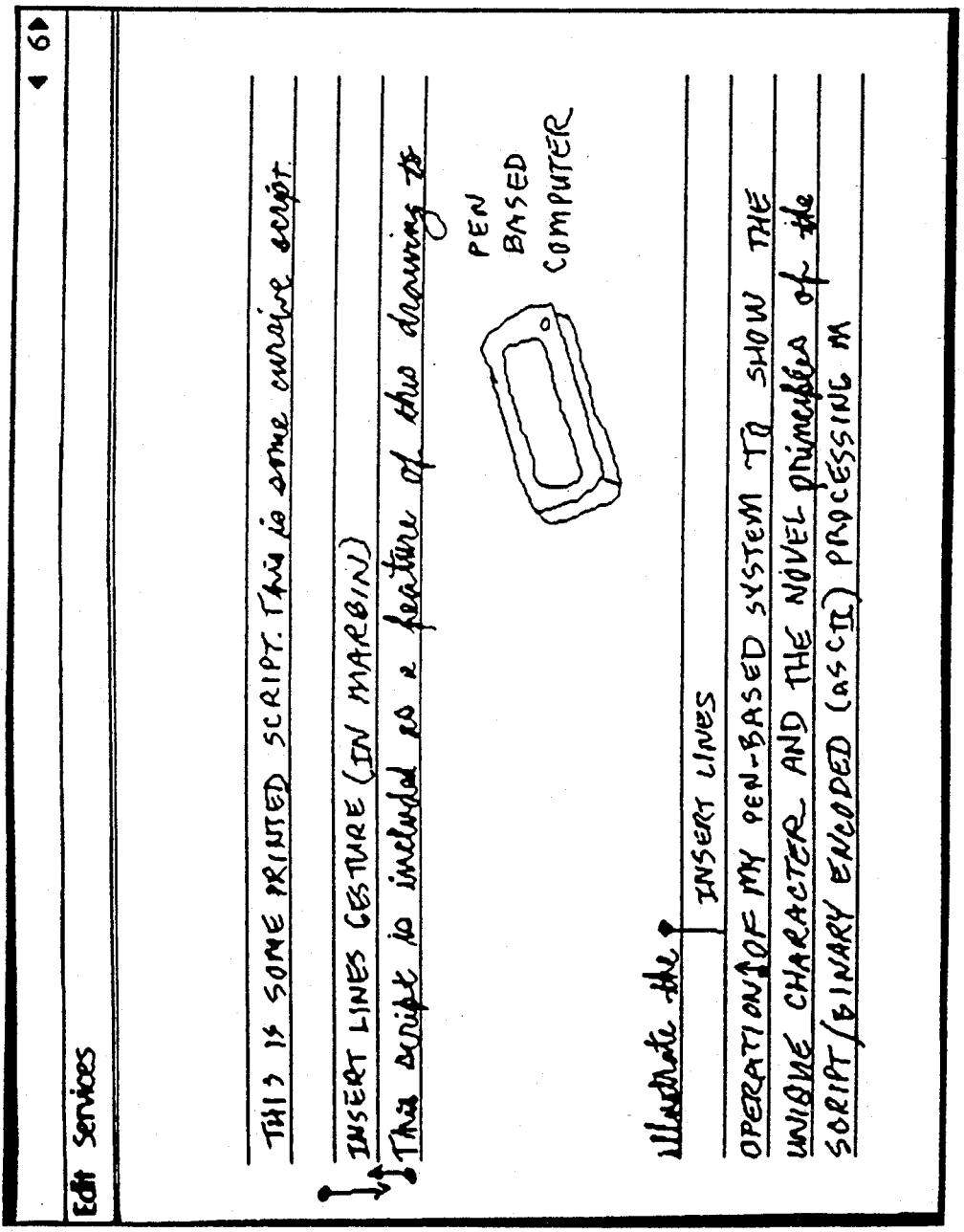

FIG. 7T shows the display after reinvoking the services menu, showing the rulers where they had previously been placed and collapsing the lines alongside the drawing area (that had previously been designated) to a length essentially equal to zero (actually one pixel in length with the beginning and end points of each line set equal). This function could also be incorporated into an icon. Upon removal of the rulers, the document appears as shown in FIG. 7U. Note that when the lines alongside the unlined drawing area were shortened, the contents of the line spaces wrapped downward to the first and subsequent lines below the drawing space. If space or script were added to the lines immediately preceding the drawing, for example, by using an insert moving space gesture, words from these lines would wrap across the drawing area to the lines below.

The foregoing summarizes the principal features of the gesture sets and their corresponding editing functions. As demonstrated above, these gestures can be used in various combinations to achieve different editing results. Other gestures and their corresponding functions are likewise operative in a consistent manner although not demonstrated in the foregoing example.

Fast Data Entry Using a Pen

The following describes how to provide pen-based computers with a method for fast and accurate text entry. Currently, pen-based computers allow the user to print characters and words which are then recognized by the computer. Some pen-based systems allow the user to hunt for characters on the image of a keyboard displayed on the screen. Neither of these methods is particularly fast or accurate—a printed character can be mis-recognized or a word can be misspelled. The method next described can be used with any computer that employs a pointing device. The pointing device is used to choose among a set of characters presented to the user.

Figure 10:
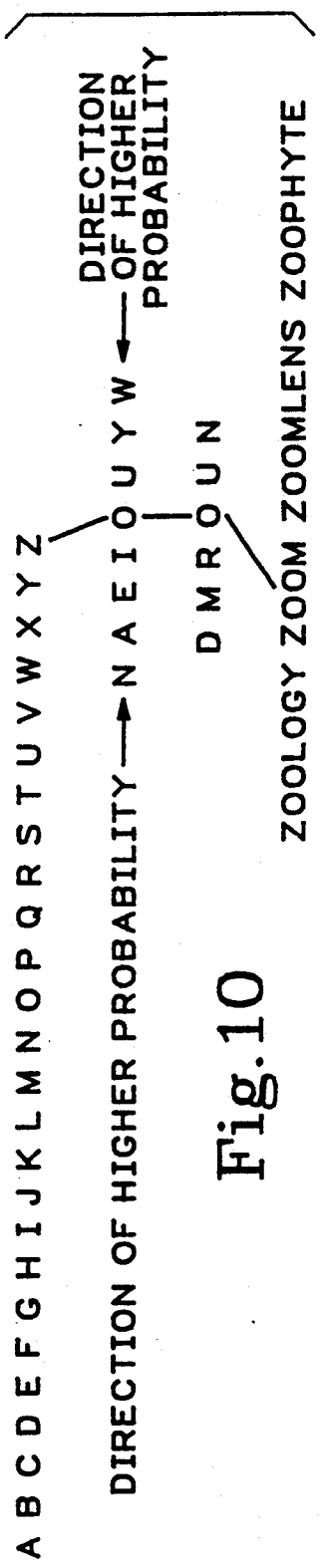
FIG. 10 is a diagram showing a method of text entry in a pen-based computer system.

The basic idea revolves around the fact that as each letter of a word is specified, the possible range of succeeding letters is narrowed in a manner determined probabilistically in the user's language (e.g., written English). Following an initial letter selection by the user, the most probable next character is presented to the user at a position closer to the pointing device than other characters available for constructing words. This allows the user to move the pointing device the shortest distance in order to specify the characters of a word. It also assures that the user ends up with a correctly spelled word because only those character sequences that spell words are presented to the user. An example is shown in FIG. 10. The initial range of characters is presented to the user in alphabetical order.

The user wants to spell "zoom" so "z" is touched with the pen, at which time the characters "n a e i o u y w" were presented, representing the most probable letters following an initial "z" in English words. These characters are arranged so that the most probable choices are closest to the initial "z." The user then touches the letter "o," at which time the characters "d m r o u n" are presented. Again these characters are arranged so that the most probable choices are closest to the last choice, "o." The user then touches the letter "o" in the latest set of characters and is presented with "zoology zoom zoomlens zoophyte." Rather than another set of characters, the user is provided with the entire set of words that exist containing the character sequence that has been specified so far. The user has already specified the word "zoo" by touching characters, but since the word "zoom" was desired, the user completes the word by touching the word "zoom." Since the pen has been touching the "paper" for the entire duration of the word specification, the user merely lifts the pen in order for the word to be appended to the line of text that he is creating. The user can now repeat the process to find (get) another word. If, during the word specification process, the user finds that he made a mistake (was heading in the wrong direction due to a bad preceding character selection), he can backtrack with the pen to undo preceding character selections.

The set of words available to the user when using this data entry approach can vary. For instance, the set of words could be restricted to chemical names in certain applications. Additionally, the positioning of characters following the initial character selection could change as the system learned the user's preferences for certain words. A simple implementation of this learning might be to switch the position of each character selection with its higher probability neighbor. Then, the more often a certain character is used, the closer it is positioned to the preceding character selection. If the user wants to enter a word that is not in the current dictionary (set) of words, that word could be spelled by tapping in the proper sequence of the word's characters on the initial alphabet line.

Having described and illustrated the principles of the invention in a preferred embodiment thereof, it should be apparent that the invention can be modified in arrangement and detail without departing from such principles.

I claim all modifications and variation coming within the spirit and scope of the following claims.

1. A pen-based computer method for a user interactively to enter and edit script or text using a pen-type electrical input device on a dynamic document display having a series of lines defining line spaces for writing script, the method comprising:

entering script on the document display along at least one of said lines using the input device in a script entry mode;

first, gesturing using the input device in a predetermined manner at a user-determined location to indicate commencement of a control gesture mode, the computer and document display being responsive to terminate the script entry mode and enter the control gesture mode; and second, gesturing using the input device in accordance with a selected one of a predetermined set of gestures to assert a selected control function in the document at said location, the computer and document display being responsive to the selected control function to perform a corresponding function on the document display or script entered therein.

2. A method according to claim 1 in which the second gesturing step includes terminating the selected gesture, the computer and document display being responsive to terminate the control gesture mode and resume the script entry mode.

3. A method according to claim 1 in which the predetermined set of gestures includes a gesture directed along said lines for indicating insertion or deletion of space lengthwise within a line space at said location.

4. A method according to claim 3 in which the gesture has two alternative directions along the lines, including:
a first direction coinciding with a direction of script entry to which the computer and document display is responsive to open additional space along a line space,
a second direction opposite the direction of script entry to which the computer and document display is responsive to close space and delete any script or text contained in the line space.

5. A method according to claim 3 in which the gesture has a length determined by the user, to which the computer and document display is responsive to open or close a corresponding length of space.

6. A method according to claim 1 in which the predetermined set of gestures includes a gesture directed across said lines for indicating insertion or deletion of a line space at said location.

7. A method according to claim 6 in which the gesture has two alternative directions across the lines, including:
a first direction coinciding with a line-to-line direction of script entry to which the computer and document display is responsive to open an additional line space, and
a second direction opposite the direction of script entry to which the computer and document display is responsive to close a line space and obliterate any script or text contained therein.

8. A method according to claim 6 in which the gesture has a length determined by the user, to which the computer and document display is responsive to open or close a corresponding amount of line spaces.

9. A method according to claim 1 in which the input device includes a stylus and a stylus-sensitive writing surface and the predetermined set of gestures includes a gesture of moving the stylus out of contact with the writing surface after the first gesturing step, to which the computer and document display is responsive to open at said location an amount of added space which moves lengthwise along the as the user enters script in the added line space.

10. A method according to claim 9 in which the input device is proximity responsive and the predetermined set of gestures includes a gesture, made by the user while entering script into said added space, of moving the stylus out of proximity of the writing surface, to which the computer and document display is responsive to scroll the document display to present a next succeeding line space for entry of script.

11. A method according to claim 9 in which the lines each have a beginning point and an ending point and, as the user enters script in a first line space, any subsequent script is pushed ahead of the added space and wrapped into a next succeeding line space.

12. A method according to claim 1 in which the input device includes a stylus and a stylus-sensitive writing surface and the first gesturing step includes touching the stylus momentarily to said writing surface and said second gesture includes moving the stylus in a selected direction in two distinct motions separated by a brief delay, the computer and document display being responsive to said momentary touch and delay to terminate the script entry mode and commence the control gesture mode and subsequently being responsive to the second gesturing step to perform said corresponding function.

13. A method according to claim 1 in which the input device includes a stylus and a writing surface which includes means for sensing stylus orientation and the first gesturing step includes positioning the stylus in a predetermined orientation relative to said writing surface and said second gesture includes moving the stylus in a selected direction, the computer and document display being responsive to said predetermined orientation of the stylus to terminate the script entry mode and commence the control gesture mode and subsequently being responsive to the second gesturing step to perform said corresponding function.

14. A context-sensitive method according to claim 1 including:
forming the lines in a parallel set with each line having a beginning point and an ending point on the document display so that the parallel set of lines collectively defines a lined area bounded by an unlined margin area; and
selecting between the lined area and unlined margin area for the location of the first gesturing step;
the computer and document display being responsive to the second gesturing step according to said selected location to assert a selected control function in the document to perform one of said corresponding functions within the lined area or a second function within one of the lined area and unlined area depending on the nature of the selected control function.

15. A method according to claim 14 in which the predetermined set of gestures includes a gesture directed across said lines for indicating insertion or deletion of a line space at said location, the first function responsive to performing the gesture in the lined area being to shift line space contents downward or upward within the line spaces and the second function responsive to performing the gesture in an unlined area alongside the lined area being to insert or delete lines and line spaces.

16. A method according to claim 14 including:
entering script or a drawing in the unlined area; and
editing script or text in an adjoining portion of the lined area in such a way that some of the script or text is moved;
the computer and document display being responsive to move the edited script or text in the area while retaining the script or drawing in the lined area unchanged by the editing step.

17. A method according to claim 1 in which the computer and document display are responsive to the first gesturing step to display a gesture prompt to the user to indicate entry of the control gesture mode.

18. A method according to claim 1 in which the predetermined gesture set and corresponding functions include: Insert space; Delete space; Insert line; and Delete line.

19. A method according to claim 1 in which the lines each have a beginning point and an ending point and the predetermined set of gestures includes an Insert Moving Space gesture, to which the computer and document display is responsive to open at said location an amount of space which moves lengthwise along the line and wraps from line to line as the user enters script in the added line space.

20. A method according to claim 19 in which the input device includes a stylus and a stylus-sensitive writing surface which are sensitive to stylus orientation, the first gesturing step includes positioning the stylus in an orientation approximately normal to the writing surface, and the Insert Moving Space gesture includes the gesture of placing the stylus in contact with the writing surface after the first gesturing step, and commencing to write in the moving line space.

21. A pen-based computer method for a user interactively to enter and edit hand written script using a pen-type electrical input device on a dynamic document display, the method comprising:
    forming a series of lines, each having a beginning point and an end point, to define line spaces for writing script;
    entering a plurality of script strokes along said line spaces on the document display using the input device in a script entry mode;
    delineating separate sets of adjacent script strokes as a word extending from a first break point marker through the line space consumed by all strokes prior to a second break point marker;
    performing an editing function on the words such that one or more of the words are moved along a line to a different line space; and
    wrapping the moved words between the end and beginning points of successive line spaces.

22. A method according to claim 21 wherein the delineating step includes identifying a variable gap between strokes and comparing the gap with a predefined break point gap value.

23. A method according to claim 22 wherein the delineating step further includes a user explicitly defining the break point gap value.

24. A method according to claim 21 wherein the wrapping step further includes:
    detecting the presence of a script stroke crossing an end point of a line;
    parsing backward through the database of script strokes to locate a breakpoint marker;
    wrapping forward all script strokes succeeding said marker to the succeeding line space; and
    recursively applying the preceding steps to the remaining script strokes until all words and text fit within the designated line spaces.

25. A method according to claim 24 wherein the wrapping forward step includes maintaining the amount of white space separating the wrapped script strokes from the script strokes retained on the preceding line space.

26. A method according to claim 21 wherein the wrapping step further includes:
    detecting the presence of white space at the end of a preceding line space;
    parsing forward through the database of script strokes beginning at the next line space to locate a breakpoint marker following the last stroke that, when combined with the WrapGap for the line and the line space used by the strokes preceding it, fits into the white space at the end of the preceding line space;
    wrapping backward all script strokes preceding said marker to the preceding line space; and
    recursively applying the preceding steps to the remaining white space until all words that can be wrapped backward to fill white space have been wrapped backward.

27. A method according to claim 26 wherein the wrapping backward step includes maintaining the amount of white space separating the wrapped script strokes from the script strokes retained on the present line space.

28. A method according to claim 21 including placing a beginning of line (BOL) marker in a selected line space and, responsive to the BOL marker, preventing wrapping of the moved word into the line space containing the BOL marker.

29. A method according to claim 28 including opening a new line space preceding the line containing the BOL marker and wrapping the moved word into the new line space.

30. A method according to claim 21 including intermingling glyphs of two or more of binary encoded text, handwritten script and bitmapped images, and wrapping the intermingled glyphs in a continuous serial stream.

31. A pen-based computer method for a user interactively to enter and edit script and ASCII-like text and any series of points using a pen-type electrical input device means on a dynamic document display means, the method comprising:
    forming a series of lines, each having a beginning point and an end point, to define line spaces for writing script;
    entering data point combinations including series of adjacent script strokes along said line spaces on the document display using the input device mean in a script entry mode;
    entering one or more ASCII-like text character along said line spaces on the document display;
    delineating combinations of adjacent script strokes and SCII-like characters as words extending from a break point marker through the area consumed by all strokes and/or ASCII-like characters prior to a subsequent break point marker;
    performing an editing function on the words entered therein such that words are moved to different line spaces; and
    wrapping the moved words between the end point and beginning point of successive line spaces.

32. A method according to claim 31 wherein the word wrapping step further includes:
    detecting the presence of script strokes or ASCII test crossing an end-of-line boundary;
    parsing backward through the database of script strokes to locate a breakpoint gap marker;

wrapping forward all script strokes and ASCII text succeeding said marker to the succeeding line space; and recursively applying the preceding step to the remaining script strokes and ASCII text until all words fit within the designated line spaces.

33. A method according to claim 32 wherein the wrapping forward step includes maintaining an amount of white space separating the wrapped script strokes from the script strokes retained on the preceding line space.

34. A method according to claim 31 wherein the word wrapping step further includes:

detecting the presence of white space at the end of a preceding line space;

parsing forward through the data base of script strokes and ASCII text beginning at the next line space to locate the breakpoint gap marker following the last stroke or ASCII character that, when combined with a WrapGap value for the line and the line space used by the strokes or ASCII text preceding it, fits into the white space at the end of the preceding line space;

wrapping backward all script strokes and ASCII characters preceding said marker to the preceding line space; and recursively applying the preceding steps to the remaining white space until all script strokes and ASCII text that can be wrapped backward to fill white space have been wrapped backward.

35. A method according to claim 34 wherein the wrapping backward step includes maintaining the amount of white space separating the wrapped script strokes from the script strokes and ASCII retained on the present line space.

36. A pen-based computer method for a user interactively to enter script using a pen-type electrical input device on a dynamic document display, the method comprising:

forming a series of liens, each having a beginning point and an end point, to define lien spaces for writing script;

entering data, comprising one or more of binary encoded text, handwritten script, bitmapped images and drawing strokes, along said line spaces on the document display;

demarcating the data as a series of work-like units having a first user-determined spacing separating each unit, the first spacing being variable over a finite range greater than a predetermined minimum spacing;

positioning a selected unit at a second, variable user-determined spacing from a preceding unit greater than the first spacing; and encoding each of said first and second word spacings in terms of a relative location of each unit in association with a portion of the data defining each unit;

performing an editing function on the units such that one or more of the units are moved to a different line space; and maintaining said first and second spacing during the movement of the units.

37. A method according to claim 36 including wrapping one or more of the moved units across the end and beginning points of successive line spaces and maintaining their respective spacings.

38. A method according to claim 37 including comparing a first length define by each unit nd its respective spacing with a second length of available line space in the successive line space and wrapping the unit and its respective spacing into the successive line space if the first length does not exceed the second length.

39. A method according to claim 38 including reducing the spacing to not less than the predetermined minimum spacing if the first length exceeds the second length and if such reduction in spacing will enable wrapping of the unit and its spacing into the successive line space.

40. A method according to claim 36 including:

interpreting placement of one of the units at the second spacing from the beginning point of one of the line spaces as an indentation defining a beginning of a new line of units;

encoding a beginning of line marker in the data in the line space containing the marker;

wrapping one or more of the moved units from a preceding line space across the end and beginning points of successive line spaces; and opening a new line space between the line space containing the marker and the immediately preceding line space to receive units moved from said immediately preceding line space.

41. In a pen-based computer having a user-operable pen-type electrical input device, a dynamic document display comprising:

a dynamic display window;

a page formatted on the display window with top, bottom, left and right page boundaries;

a group of lines arranged in a parallel, spaced-apart manner on the page, each line having beginning and ending points defining a length of each line; and line space segments between the lines, each line space segment bounded widthwise by a pair of adjacent lines and lengthwise by the length of one of the lines;

the lines space segments each including a matrix of data points for receiving and displaying data therein, and being coupled in series so as to establish continuity of the line space segments from an endpoint of a first line to a beginning point of a second line;

electrical means of inputting script or bitmapped image data for display in the data points; and means responsive to a user operation of the input device for shifting a portion of the data displayed in the data points lengthwise along one of the line space segments and serially across the end point of the first line and beginning point of the second line to a serially adjoining line space segment.

42. A document display according to claim 41 in which the data points are organized into separable units having first and last points defining a length of the unit, the shifting means being operative to shift each unit as a unit, including all data points between the first and last points, across the beginning and ending points of lines to the adjoining line space segment.

43. A document display according to claim 42 including means for entering a beginning of line (BOL) marker at the beginning point of the second line, the shifting means being responsive to the BOL marker to shift the BOL marker and the data points in the line space segment at the second line to a third line.

44. A document display according to claim 42 in which the shifting means includes means for comparing the length of the unit to be shifted with the length of the adjoining line segment and, if the unit length is longer than the length of the adjoining line segment, shifting the unit of data points to a third line.

45. A document display according to claim 41 in which the page is formatted on the display window with a margin along one or more of the top, bottom, left and right page boundaries, including a margin adjoining one of the beginning and ending points of the lines having a width that can be varied inversely with the lengths of the lines, the margin defining a drawing space that is nonresponsive to said means responsive to a user action for shifting a portion of the data displayed in the data points lengthwise along one of the line space segments.

46. A pen-based computer method for a user interactively to enter and edit script or text using a pen-type electrical input device on a dynamic document display, the method comprising:
   forming a series of lines, each having a beginning point and an end point, to define line spaces for writing script;
   entering data, comprising one or more of binary encoded text, a bitmapped image handwritten script and drawing strokes, along said line spaces on the document display;
   demarcating the data as a series of glyphs having a spacing separating each unit;
   encoding the data for each glyph in a manner that enables storage, retrieval and display thereof; and
   encoding with the data for each glyph a starting point, a left-most position point and a right-most position point for the glyph.

47. A method according to claim 46 in which the glyph is an ASCII character and the data for the glyph is maintained in binary encoded ASCII format.

48. A method according to claim 46 in which the glyph is a handwritten stroke and the data for the glyph is compression encoded in a format that permits substantial replication of the stroke.

49. A pen-based computer method for a user interactively to enter and edit hand written script using a pen-type electrical input device on a dynamic document display, the method comprising:
   entering a plurality of script strokes in a series along a line on the document display using the input device in a script entry mode;
   identifying a variable gap between strokes and comparing the gap with a predefined break point gap value to locate a breakpoint marker when the gap between strokes exceeds said value;
   delineating separate sets of adjacent script strokes in said series as a series of words, each word extending from a first break point marker through all the strokes prior to a second break point marker; and
   performing an editing function on the words such that one or more of the words are manipulated as units.

* * * * *

UNITED STATES PATENT AND TRADEMARK OFFICE
CERTIFICATE OF CORRECTION

PATENT NO. : 5,231,698
DATED : July 27, 1993
INVENTOR(S) : Mitchell D. Forcier

It is certified that error appears in the above-indentified patent and that said Letters Patent is hereby corrected as shown below:

| | |
|---|---|
| Column 1 | Line 49, after "difficult" insert --to provide whole screen word --. |
| Column 6 | Line 62, change "2" to --22--; |
| Column 9 | Line 59, change "BO" to --BOL--; |
| Column 18 | Line 28, change "(WL*RPL))" to --(WL*RRPL))--; |
| Column 19 | Line 14, before "Continue" insert --1--; |
| Column 21 | Line 46, after "images" insert --.--; |
| Column 21 | Line 51, delete "is"; |
| Column 22 | Line 52, change "text" to --text/script--; |
| Column 31 | Line 62, before "as" insert --line--; |
| Column 31 | Line 63, delete "line"; |
| Column 34 | Line 48, change "mean" to --means--; |
| Column 34 | Line 51, change "character" to --characters--; |
| Column 34 | Line 54, change "SCII-like" to --ASCII-like--; |

UNITED STATES PATENT AND TRADEMARK OFFICE
CERTIFICATE OF CORRECTION

PATENT NO. : 5,231,698
DATED : July 27, 1993
INVENTOR(S) : Mitchell D. Forcier

It is certified that error appears in the above-indentified patent and that said Letters Patent is hereby corrected as shown below:

| | |
|---|---|
| Column 34 | Line 63, change "test" to --text--; |
| Column 35 | Line 34, after "ASCII" insert --text--; |
| Column 35 | Line 40, change "liens" to --lines--; |
| Column 35 | Line 41, change "lien" to --line--; |
| Column 35 | Line 47, change "work-like" to --word-like--; |
| Column 35 | Line 68, change "define" to --defined--; |
| Column 35 | Line 68, change "nd" to --and--; |
| Column 36 | Line 39, change "lines" to --line--; |
| Column 36 | Line 45, change "of" to --for--. |

Signed and Sealed this

Third Day of May, 1994

Attest:

BRUCE LEHMAN

*Attesting Officer*  *Commissioner of Patents and Trademarks*